US012665664B2

(12) United States Patent
Palermo et al.

(10) Patent No.: US 12,665,664 B2
(45) Date of Patent: Jun. 23, 2026

(54) SYSTEMS, APPARATUS, ARTICLES OF MANUFACTURE, AND METHODS FOR PRIVATE NETWORK MOBILITY MANAGEMENT

(71) Applicant: Intel Corporation, Santa Clara, CA (US)

(72) Inventors: Stephen Palermo, Chandler, AZ (US); Roya Doostnejad, Los Altos, CA (US); Valerie Parker, Portland, OR (US); Soo Jin Tan, Shanghai (CN); Zhimin Yuan, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/343,586

(22) Filed: Jun. 28, 2023

(65) Prior Publication Data

US 2023/0421253 A1 Dec. 28, 2023

(30) Foreign Application Priority Data

Jun. 28, 2022 (WO) ................ PCT/CN2022/101946

(51) Int. Cl.
*H04B 7/185* (2006.01)
*H04W 84/18* (2009.01)

(52) U.S. Cl.
CPC ........ *H04B 7/18591* (2013.01); *H04W 84/18* (2013.01)

(58) Field of Classification Search
CPC ........................... H04B 7/18591; H04W 84/18
See application file for complete search history.

(56) References Cited

U.S. PATENT DOCUMENTS

2016/0335584 A1* 11/2016 Woicekowski ..............................
................................................. G06Q 10/063112
2017/0086103 A1* 3/2017 Neves ..................... H04W 4/44
(Continued)

OTHER PUBLICATIONS

Park et al., "On-Demand Networking for Ubiquitous Connectivity and Network Resilience: A Network-in-a-Box Solution", arXiv: 2110.01726v1, 2021, https://doi.org/10.48550/arXiv.2110.01726 (Year: 2021).*

(Continued)

*Primary Examiner* — Shah M Rahman
(74) *Attorney, Agent, or Firm* — Hanley, Flight & Zimmerman, LLC

(57) ABSTRACT

Methods, apparatus, systems, and articles of manufacture are disclosed for private network mobility management. An example private network in a box includes interface circuitry to communicate with multi-access terrestrial network (TN) nodes and non-terrestrial network (NTN) nodes, machine readable instructions, and programmable circuitry. The example programmable circuitry is to generate a first mesh associated with a geographical area of the private network and a second mesh associated with the geographical area. The example programmable circuitry is also to initiate at least one of the multi-access TN nodes in alignment with the first mesh and at least one of the NTN nodes in alignment with the second mesh. Additionally, the example programmable circuitry is to facilitate communication associated with at least one user equipment within at least one of the first mesh or the second mesh using the private network.

20 Claims, 29 Drawing Sheets

(56) References Cited

U.S. PATENT DOCUMENTS

| | | | | |
|---|---|---|---|---|
| 2018/0213033 A1* | 7/2018 | Subbian | .............. | H04L 67/1091 |
| 2018/0343567 A1* | 11/2018 | Ashrafi | ................... | H04L 67/10 |
| 2021/0092781 A1* | 3/2021 | Lauridsen | ............. | H04W 24/02 |
| 2021/0211975 A1* | 7/2021 | Prabhakar | ............. | H04W 48/16 |
| 2022/0029700 A1* | 1/2022 | Cui | .................... | H04B 7/18563 |
| 2022/0078692 A1* | 3/2022 | Stojanovski | .......... | H04W 60/00 |
| 2022/0247678 A1* | 8/2022 | Atwal | ................ | H04B 7/18519 |
| 2022/0338279 A1* | 10/2022 | Sahin | ................... | H04W 76/12 |
| 2025/0168682 A1* | 5/2025 | Guan | ..................... | G06N 20/00 |

OTHER PUBLICATIONS

Ray et al. "A Vision on 6G-Enabled NIB: Requirements, Technologies, Deployments, and Prospects", IEEE Wireless Communications ( vol. 28, Issue: 4, Aug. 2021), pp. 120-127 (Year: 2021).*

SHARETECHNOTE, "5G/NR—RRC Overview," ShareTechnote, https://www.sharetechnote.com/html/5G/5G_RRC_Inactive.html, retrieved on Jun. 15, 2023, 17 pages.

FPINNOVATIONS, "Private LTE network for forest operations: A portable and easy-to-deploy solution," FPInnovations, Jan. 20, 2021, https://web.fpinnovations.ca/private-lte-network-for-forest-operations-a-portable-and-easy-to-deploy-solution/, retrieved on Jun. 15, 2023, 10 pages.

Hughes, "Private Wireless Network with Low Earth Orbit (LEO) Services," Hughes Network Systems, LLC, https://www.hughes.com/resources/private-wireless-network-low-earth-orbit-leo-services, retrieved on Jun. 15, 2023, 4 pages.

Soseman, "The Experimental Private 5G Network-in-a-Box," The Broadcast Bridge, Dec. 23, 2022, https://www.thebroadcastbridge.com/content/entry/19044/experimental-private-5g-network-in-a-box, retrieved on Jun. 15, 2023, 8 pages.

ETSI, Technical Specification: 5G; NR; Radio Resource Control (RRC); Protocol specification (3GPP TS 38.331 version 17.0.0 Release 17) ETSI TS 138 331 V17.0.0, May 2022, 1197 pages.

Di et al., "Ultra-dense LEO: Integrating Terrestrial-Satellite Networks into 5G and Beyond for Data Offloading," in IEEE Transactions on Wireless Communications, vol. 18, No. 1, pp. 47-62, Jan. 2019, 32 pages.

Lisi et al., "Multi-Connectivity in 5G terrestrial-Satellite Networks: the 5G-ALLSTAR Solution," retrieved from arXiv.org at <https://arxiv.org/pdf/2004.00368v1>, accessed on Feb. 16, 2026, 9 pages.

* cited by examiner

Example UE States for Private Network Mobility Management for Precise Positioning 5) UE State = RRC-CONNECTED w/ reference signal Scheduled on strongest aperiodic beam in UE Channel B/W, UE Location Precise<<1m<<1s 4) UE State = RRC-CONNECTED w/ reference signal Scheduled periodic, UE Location Precise<1m<1s 3) UE State = RRC-CONNECTED, UE Location = within CELL 2) UE State = RRC-INACTIVE [RAN Notification Area], UE Location = within RAN 1) UE State = IDLE, UE Location granularity= within Tracking Area 0) UE state = DEREGISTERED, UE Location granularity = unknown

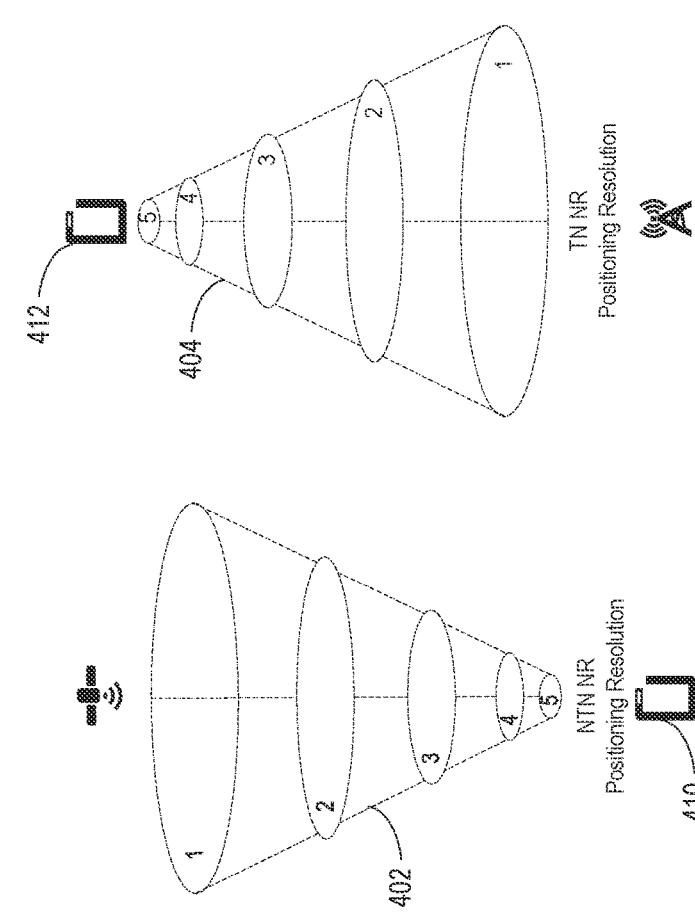

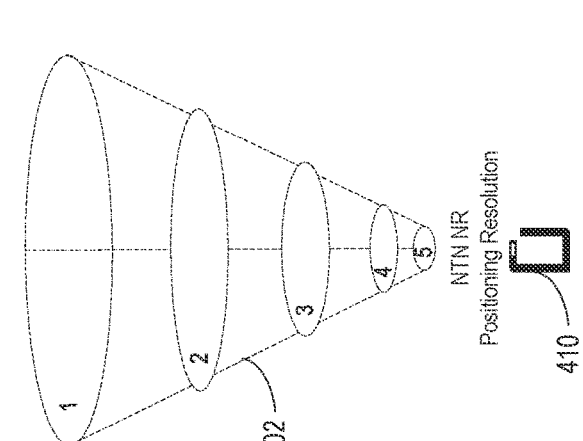

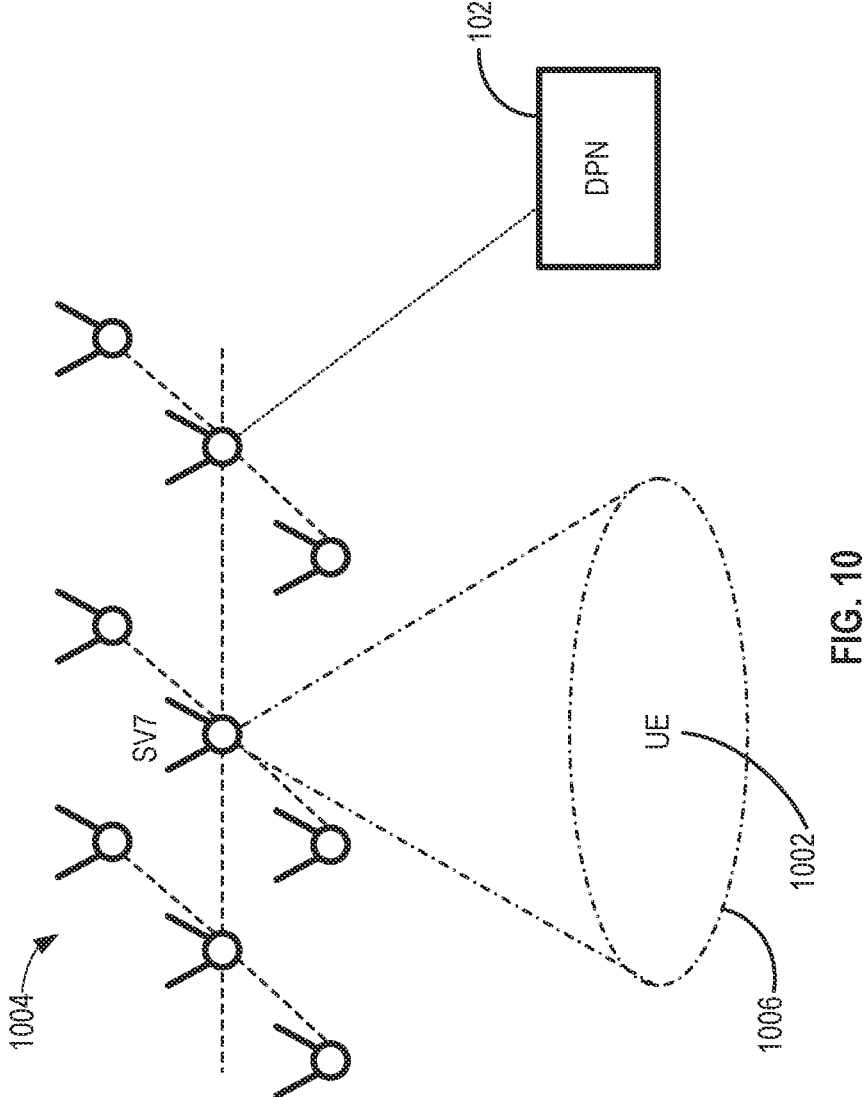
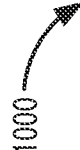
FIG. 10

2000

2002    2001                    ORBIT    2002    2001

MASSIVE MIMO
ANTENNA
2050

BACKHAUL

2020

2040

UE

5G CN

2030

TERRESTRIAL
5G RAN

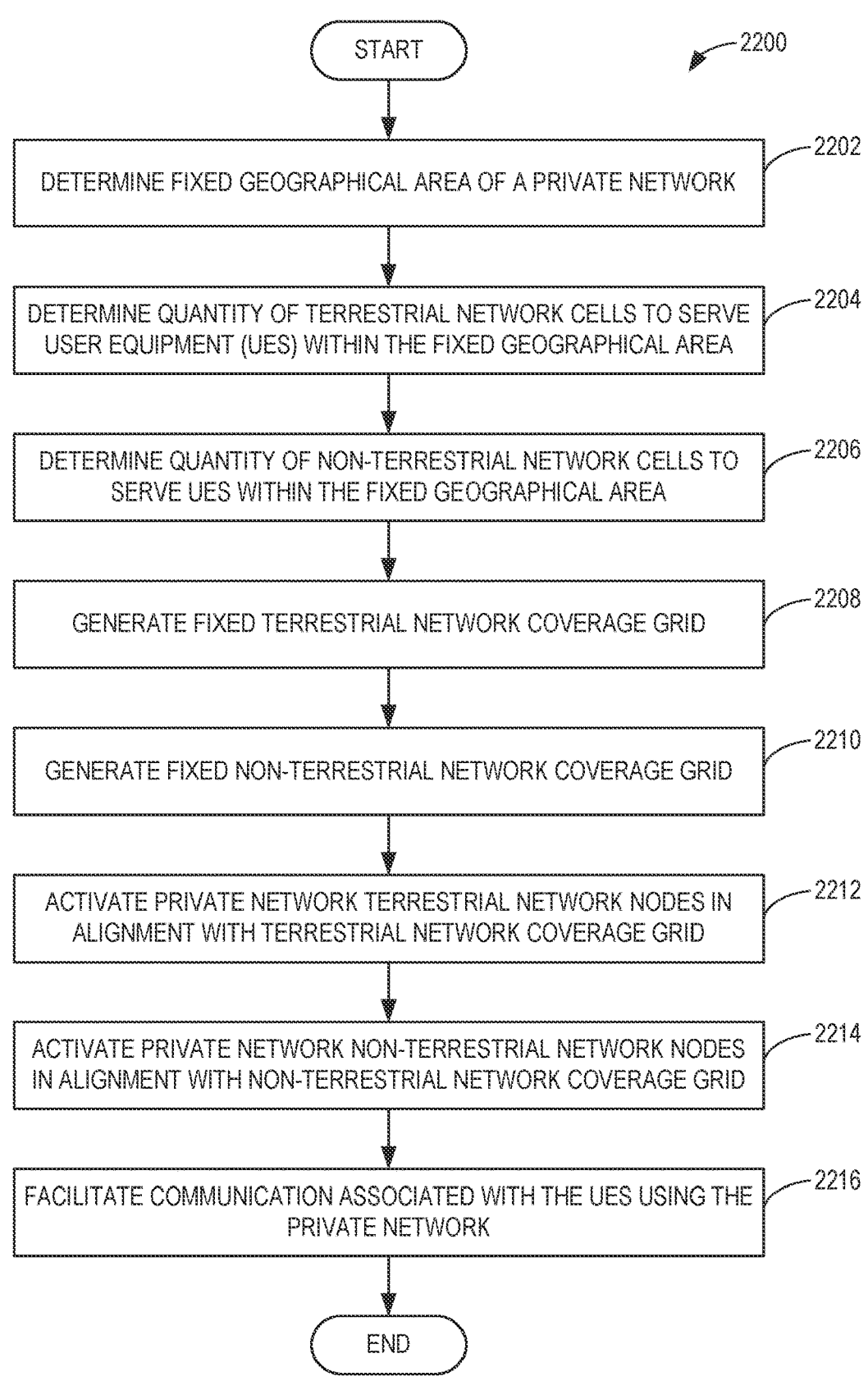

START

2200

DETERMINE FIXED GEOGRAPHICAL AREA OF A PRIVATE NETWORK — 2202

DETERMINE QUANTITY OF TERRESTRIAL NETWORK CELLS TO SERVE USER EQUIPMENT (UES) WITHIN THE FIXED GEOGRAPHICAL AREA — 2204

DETERMINE QUANTITY OF NON-TERRESTRIAL NETWORK CELLS TO SERVE UES WITHIN THE FIXED GEOGRAPHICAL AREA — 2206

GENERATE FIXED TERRESTRIAL NETWORK COVERAGE GRID — 2208

GENERATE FIXED NON-TERRESTRIAL NETWORK COVERAGE GRID — 2210

ACTIVATE PRIVATE NETWORK TERRESTRIAL NETWORK NODES IN ALIGNMENT WITH TERRESTRIAL NETWORK COVERAGE GRID — 2212

ACTIVATE PRIVATE NETWORK NON-TERRESTRIAL NETWORK NODES IN ALIGNMENT WITH NON-TERRESTRIAL NETWORK COVERAGE GRID — 2214

FACILITATE COMMUNICATION ASSOCIATED WITH THE UES USING THE PRIVATE NETWORK — 2216

END

FIG. 22

SYSTEMS, APPARATUS, ARTICLES OF MANUFACTURE, AND METHODS FOR PRIVATE NETWORK MOBILITY MANAGEMENT

RELATED APPLICATION

This patent claims the benefit of International Application No. PCT/CN2022/101946, which was filed on Jun. 28, 2022. International Application No. PCT/CN2022/101946 is hereby incorporated herein by reference in its entirety. Priority to International Application No. PCT/CN2022/101946 is hereby claimed.

FIELD OF THE DISCLOSURE

This disclosure relates generally to networks and, more particularly, to systems, apparatus, articles of manufacture, and methods for network mobility management.

BACKGROUND

Private networks are emerging to serve enterprises, government, and education segments. Private networks can be established using licensed, unlicensed, or shared spectrum. Private networks can be optimized for specific enterprise needs including network access, network performance, and isolation from public networks. Private networks can be deployed with or without traditional communication service providers whereas public networks are deployed with traditional communication service providers.

BRIEF DESCRIPTION OF THE DRAWINGS

FIG. 5 illustrates example states for private network mobility management for precise positioning.

FIG. 10 is an example non-terrestrial private network that can be instantiated utilizing the DPN circuitry of FIGS. 1 and/or 2.

FIG. 22 is a flowchart representative of example machine readable instructions and/or example operations that may be executed by example processor circuitry to implement the DPN circuitry of FIGS. 1 and/or 2 to facilitate communication associated with user equipment using a private network.

DETAILED DESCRIPTION

Figure 1:
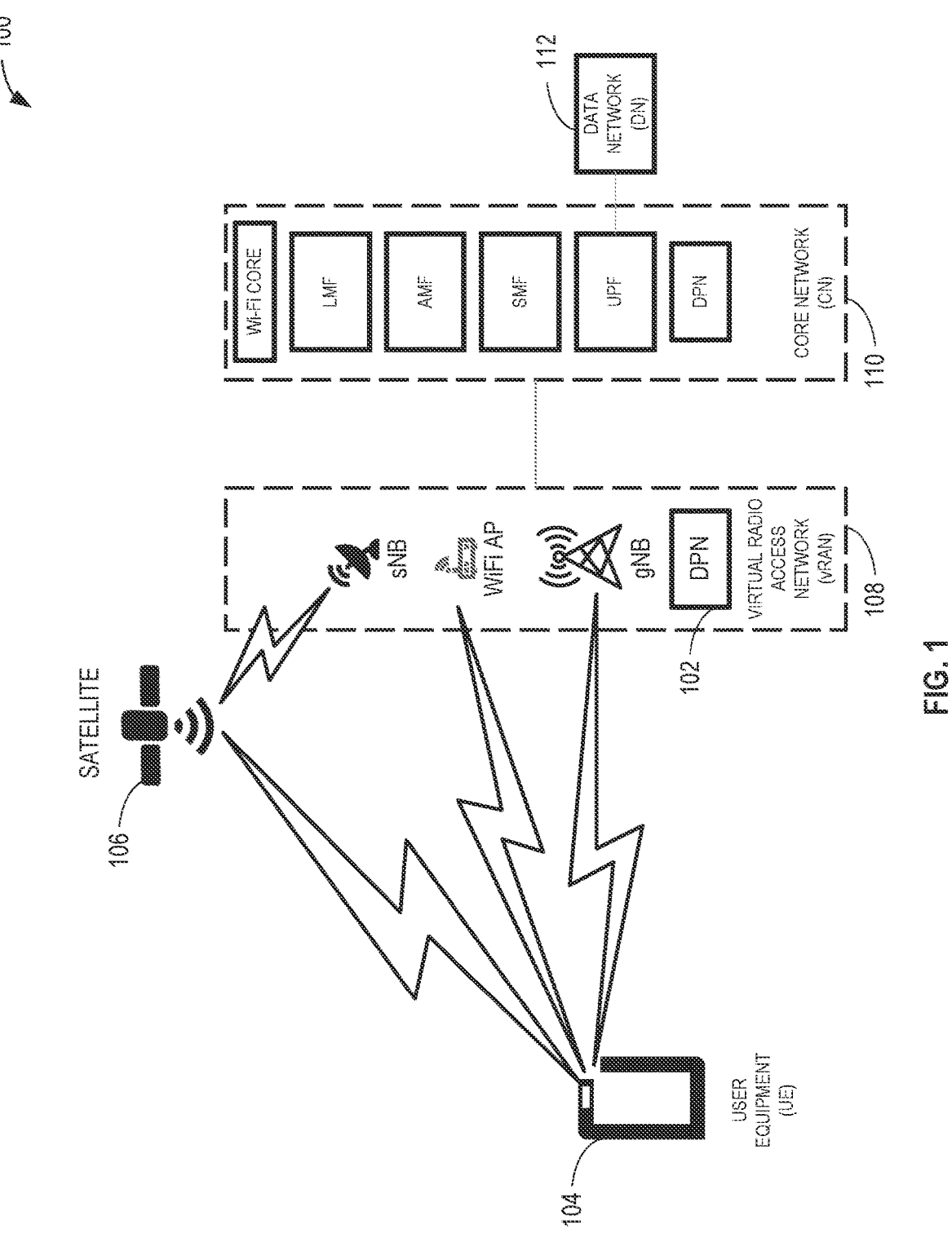
FIG. 1 is an illustration of an example private network instantiated by example dedicated private network (DPN) circuitry.

In general, the same reference numbers will be used throughout the drawing(s) and accompanying written description to refer to the same or like parts. The figures are not to scale. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

Private networks are emerging to serve enterprises, government, and education segments. In examples disclosed herein, a private network refers to a network that operates in a spectrum bought or leased by an entity. In some examples, a private network refers to a portion of spectrum and/or a network slice dedicated to an entity by a network provider (e.g., a telecommunication service provider). In additional or alternative examples, a private network refers to a computer network that utilizes a private address space of Internet Protocol (IP) addresses. In some examples, private network addresses are not allocated to any specific organization. In some examples, anyone may use a private address space without approval from regional or local Internet registries. Private networks can be established using licensed, unlicensed, or shared spectrum. Private networks can be optimized for specific enterprise needs including network access, network performance, and isolation from public networks.

Private networks can be deployed with or without traditional communication service providers whereas public networks are deployed with traditional communication service providers. In examples disclosed herein, a public network refers to a network built, deployed, managed, and/or maintained by a network provider (e.g., a telecommunication service provider). As described above, private networks differ from public networks. For example, whereas any UE can access a public network (e.g., for free and/or for a fee), only UEs associated with the entity that corresponds to a private network may access the private network (e.g., using unique credentials provided by a network administrator of the private network). Additionally, for example, whereas a public network is managed by a network provider (e.g., a telecommunication service provider), a private network is managed by the entity to which the private network was assigned by a network provider.

Private networks can be completely isolated from a traditional network. For example, an isolated private network maintains all network nodes and services on-premises including a next generation radio access network (NG-RAN) supporting multi-access connectivity, control, user plane functionality, subscriber databases, and NG CORE network capabilities. Private network access is typically handled by public land mobile network (PLMN) operators providing wireless communication services in a specific country and/or Global Mobile Satellite System (GMSS) providing satellite services to customers. A PLMN ID is made up of a Mobile Country Code (MCC) and Mobile Network Code (MNC). MCCs are three digits and MNCs are two to three digits and enable user equipment or user equipment devices (UEs) to connect to the operators gNodeBs (gNBs) on cell towers. GMSS is similar to PLMNs for satellite non-terrestrial networks.

Access to public networks is known and specifications from the 3$^{rd}$ Generation Partnership Project (3GPP) allow UEs to connect and interact among networks owned by different communication service providers. Isolated private networks can replicate the same 3GPP procedures and functions to reuse existing 3GPP specifications and maintain UE compatibility. Public and private networks coverage can overlap—overlapping Private/Private PLMNs, overlapping Private/Public GMSSs—thereby providing a UE with multiple connection options when the UE is within multiple overlapping network cells. However, such overlaps can create difficulty when the public and private networks are incompatible with each other and/or otherwise configured differently or based on different standards.

Examples disclosed herein can effectuate private network mobility management. In some disclosed examples, overlapping multiple private networks controlling different levels of access and performance are possible at the same location. In some disclosed examples, overlapping private networks may control access based on UE category and/or actual physical location of a UE. In some disclosed examples, different private networks may restrict the number of users to ensure performance of manufacturing equipment and/or limit electromagnetic frequency (EMF) interference. In some disclosed examples, geofenced private network access may be restricted to certain physical locations as well as UE category. In some disclosed examples, private networks (e.g., fifth generation cellular or sixth generation cellular (5G or 6G)) may be deployed within fixed geographical boundaries of an enterprise and provide multiple coverage cells that provide connectivity to manufacturing devices as well as UEs. For example, an example DPN establishes private network geographical boundaries for coverage area of UEs serviced by fixed and/or moving radio access technology instances (RATs). In some disclosed examples, private network cells can be instantiated to overlap with other private network cells.

Examples disclosed herein include example dedicated private network (DPN) circuitry, which can implement private network instances (e.g., 5G network instances, Wi-Fi network instances, satellite network instances, etc.), such as 5G new radio-radio access network (NR-RAN) and 5G core network (5G-CN) as well as all the required modules and interfaces. In contrast, distributed private networks may share or lease radio access network (RAN) access, control and/or subscriber databases with or from traditional communication service providers. A possible advantage of the DPN is that the DPN can implement an isolated private network.

UE movement between public and private network cell coverage areas can happen especially with distributed private network configurations. These distributed public networks may have their subscriber databases hosted or maintained off-premises (e.g., off-prem) with the PLMN communication service provider. The example DPN can predict private network access based on UE movement (e.g., acceleration, direction, etc.) and thereby be anticipatory. For example, a UE at a certain location moving at a particular speed with a particular direction can be moving out of the range of one private network cell range and into another private network cell coverage range.

Examples disclosed herein include the example DPN to obtain and use UE location to qualify and enforce UE access to the private network according to private network policy. In some disclosed examples, the DPN can enable instantaneous data and measurements required for network initiated UE location detection. In some disclosed examples, the DPN can utilize a programmable data collector (PDC) to ensure instant (or near or approximately instant) access to information needed for the lowest latency and highest location result periodicity possible for access related DPN private network policy decisions. For example, the DPN can utilize location detection to enable UEs to register with a specific private network PLMN.

Examples disclosed herein include a system (e.g., a DPN system) to improve mobile UE access in geographic locations where the coverage area of a DPN private network (e.g., a 5G cellular network, a Wi-Fi network, a non-terrestrial network, etc.) overlaps with the coverage area of other DPN private networks as well as private PLMN networks. An example system may include the following data flow: UE-n1/2-5G-NR-AMF-n11-AMF-n8-UDM-n16-GMLC-n12-AMF-n11-LMF. In some disclosed examples, a DPN may effectuate private network location requests via an example workflow including (1) Network Induced Location Requests (NI-LR) can be initiated by an AMF to determine a UE's location on behalf of a regulatory agency; (2) Mobile Terminated Location Requests (MT-LR) can be initiated by internal or external LCS clients and may be related to a service or application accessed by the UE, requests from regulatory agencies, or requests from the PLMN operator; and/or (3) Mobile Originated Location Requests (MO-LR) can be initiated by the UE to determine its own location or to provide its location to an external client.

In some disclosed examples, an Access and Mobility Management Function (AMF) can receive and manage location requests from several sources: MO-LRs from the UE over the N1 interface, requests for the Network Provided Location Information (NPLI) for a UE from a UDM over the N8 interface, and MT-LRs from GMLCs over the NL2 interface. In some disclosed examples, an AMF can select a Location Management Function (LMF) that is best suited to perform the location determination for each request and uses its Nlmf_Location service to trigger that process. In some disclosed examples, an AMF can determine that another LMF is better suited to complete a location determination or to continue deferred reporting.

In some disclosed examples, a Gateway Mobile Location Center (GMLC) can expose location services to external Providing Location Services (LCS) clients such as web applications or regulatory clients such as emergency services or law enforcement. In some disclosed examples, a GMLC can obtain a UE's LCS privacy policy using an Nudm_SDM service on an NL6 interface if needed. In some disclosed examples, an LMF can manage the resources and timing of positioning activities, and the LMF can expose an Nlmf_Location service to an AMF for immediate or deferred location information requests on an nl1 interface. In some disclosed examples, an LMF uses an Namf_Communication service on an nl1 interface to request UE positioning from the access network over an n2 interface.

A possible advantage of example DPN private network instances disclosed herein is that example DPN private network instances as disclosed herein can support UE/device multi-access including terrestrial (e.g., cellular (e.g., 5G NR, fourth generation (4G)/Long Term Evolution (LTE), etc.), Wi-Fi, citizens broadband radio service (CBRS), public safety spectrum(s), etc.) as well as non-terrestrial satellite-based connectivity (e.g., $K_u$ band, $K_a$ band, low earth orbit (LEO) uplink/downlink (UL/DL), geostationary earth orbit (GEO) UL/DL, proprietary satellite spectrum(s), licensed and/or unlicensed terrestrial spectrums (e.g., a UE connected to a satellite using a licensed terrestrial spectrum), etc.). For example, DPN private network cell coverage area can be provided by terrestrial sources such as NG RAN or Wi-Fi Access Points (APs). In some disclosed examples, DPN private network cell coverage area can be provided by non-terrestrial direct to satellite connections (e.g., transparent or regenerative).

Examples disclosed herein address overlapping private and public mobilty management issues including service coverage contention, interference, power savings, and capacity including discontinous coverage. Examples disclosed herein address if a UE should receive normal service, if the UE should attempt to register, and/or if the UE should be deactivated. Example benefits can include reduced network conjestion triggered by unnecesary signaling load and interference especially on a private (dedicated) network. Example private network coverage areas can be constructed based on radio access technology (RAT) and non-RAT coverage ephemeris including terrestrial and non-terrestrial coverage grid generation. In some disclosed examples, precise RAT/Non-RAT-dependent near-real time UE location detection and/or predictive location techniques can be used to broadcast coverage grids to allow pre/post UE registration, deactivation, and/or handoffs (e.g., communication handoffs) across private (dedicated) and/or public networks. A possible advantage of examples disclosed herein is that examples disclosed herein include terrestrial and non-terrestrial network instances supporting 3GPP, Open Radio Access Network (O-RAN), and/or NON-3GPP architectures.

FIG. 1 is an illustration of an example private network 100 instantiated by example dedicated private network (DPN) circuitry 102. In some examples, the private network 100 is instantiated, implemented, and/or otherwise managed by an enterprise (e.g., a business, a factory, a government office, etc.) or other private entity. The private network 100 includes an example user equipment device 104 (referred to herein as a UE or UE device), an example satellite 106, an example virtual radio access network (vRAN) 108, an example core network (CN) 110, and an example data network (DN) 112 (may also be referred to herein as a central data network). In some examples, the vRAN 108 may be implemented by any type of RAN.

In some examples, the hardware, software, and/or firmware that implements the DPN circuitry 102 is included in a single housing or enclosure. For example, the hardware, software, and/or firmware that implements the DPN circuitry 102 is included in a housing or enclosure that is situated at a fixed location at an enterprise or other private entity. Additionally or alternatively, the hardware, software, and/or firmware that implements the DPN circuitry 102 is included in a housing or enclosure that is mobile and may be carried around by one or more individuals. For example, the DPN circuitry 102 may be included in a backpack sized housing or enclosure. In some examples, the hardware that implements the DPN circuitry 102 may modular such that an enterprise utilizing the DPN circuitry 102 can swap out different modules based on the usage and/or priorities of the enterprise. For example, the modules of the DPN circuitry 102 may be implemented by hardware accelerators on integrated circuit cards (e.g., a network interface card, a location management function card, a unified data management function card, an authentication server function card, etc.). As described below, the DPN circuitry 102 implements one or more multi-spectrum dedicated private networks (e.g., a private network in a box, a standalone or discrete private network device, etc.) serving one or more UEs attached to fixed and/or moving RANs and/or vRANs with improved and/or otherwise optimized (e.g., precise) tracking of UE position.

In the illustrated example of FIG. 1, the UE 104 is in communication with at least one of a non-terrestrial network, which can be implemented by the satellite 106 and a satellite node B (sNB) of the vRAN 108, or a terrestrial network, which can be implemented by the gNodeB (gNB) of the vRAN 108. The UE 104 can also be in communication with a terrestrial network by way of a Wireless Fidelity (Wi-Fi) connection to a Wi-Fi access point (AP) of the vRAN 108. In example operation, the UE 104 can transmit cellular data, such as sounding reference signal (SRS) data, positioning reference signal (PRS) data, etc., to different antennas of the vRAN 108, such as an sNB antenna by way of the satellite 106, a Wi-Fi antenna, and/or a cellular antenna (e.g., a 5G/6G antenna). In example operation, the DPN circuitry 102 can determine a power (e.g., an SRS reference signal received power (SRS-RSRP)) and/or quality (e.g., an SRS reference signal received quality (SRS-RSRQ) or channel state information (CSI) reference signal received quality (CSI-RSRQ)) of the received cellular data.

In example operation, the DPN circuitry 102 can determine which one(s) of the connections between the UE 104 and the vRAN 108 are strongest and thereby may be used to detect a location of the UE 104. For example, the DPN circuitry 102 can determine a time-of-arrival (TOA) of SRS data received at different antenna of the gNB. In some examples, the DPN circuitry 102 can determine a time-difference-of-arrival (TDOA) based on the TOA of the SRS data at the different antenna. In some examples, the DPN circuitry 102 can determine a location of the UE 104, such as a precise location (e.g., a location within 1 meter (m), 5 m, etc., of an actual location of the UE 104) of the UE 104 and/or whether the UE 104 is within range or proximity of the private network 100. In example operation, the DPN circuitry 102, and/or, more generally, the vRAN 108, can provide the location, the cellular data, the TOA data, the TDOA data, etc., to the core network 110.

In the illustrated example of FIG. 1, the core network 110 instantiates, includes, and/or otherwise implements an example Wi-Fi core, an example Location Management Function (LMF), an example Access and Mobility Management Function (AMF), an example Session Management Function (SMF), and an example User Plane Function (UPF), such as a 5G/6G LMF, AMF, SMF, and/or UPF. The core network 110 can output the location, the cellular data, the TOA data, the TDOA data, etc., to the data network 112. For example, the core network 110 and/or the data network 112 can execute and/or instantiate an application, such as a software application or service, which performs function(s) based on a location of the UE 104 as an input to the application.

In some examples, the DPN circuitry 102 can identify the UE 104 based on an identifier, such as a UE identifier, a MAC address, an IP address, etc., and/or any combination(s) thereof. For example, the DPN circuitry 102 can obtain data from the UE 104, such as a MAC address, and the DPN circuitry 102 can identify the UE 104 based on the MAC address. A possible advantage of the DPN circuitry 102 is that the DPN circuitry 102 can identify the UE 104 if the UE 104 does not communicate via a cellular connection and instead communicates via another technique such as Wi-Fi or Bluetooth.

In some examples, the DPN circuitry 102 can identify the UE 104 based on sensor data, such as data from a camera, a radio-frequency identification (RFID) terminal, a Bluetooth beacon, etc. For example, the DPN circuitry 102 can obtain data from a camera, such as a camera image that captures the UE 104. In some examples, the camera image can include an identifier on or associated with the UE 104, such as a label (e.g., a text-based label, a quick response (QR) code, a bar code, etc.), a symbol, or any other indicia that represents data or information. In some examples, the identifier can be representative of data that, when accessed and/or otherwise utilized, can cause the DPN circuitry 102 to obtain instructions. For example, the identifier can be a QR code representative of a uniform resource locator (URL) that the DPN circuitry 102 can access to obtain data, such as instructions on how to connect to the UE 104. In some examples, the identifier itself can be representative of instructions, such as instructions on how to connect to the UE 104. For example, the instructions can include an IP address, a subnet mask, a UE identifier, a Bluetooth identifier, etc., or any other type of communication protocol related instructions.

Figure 2:
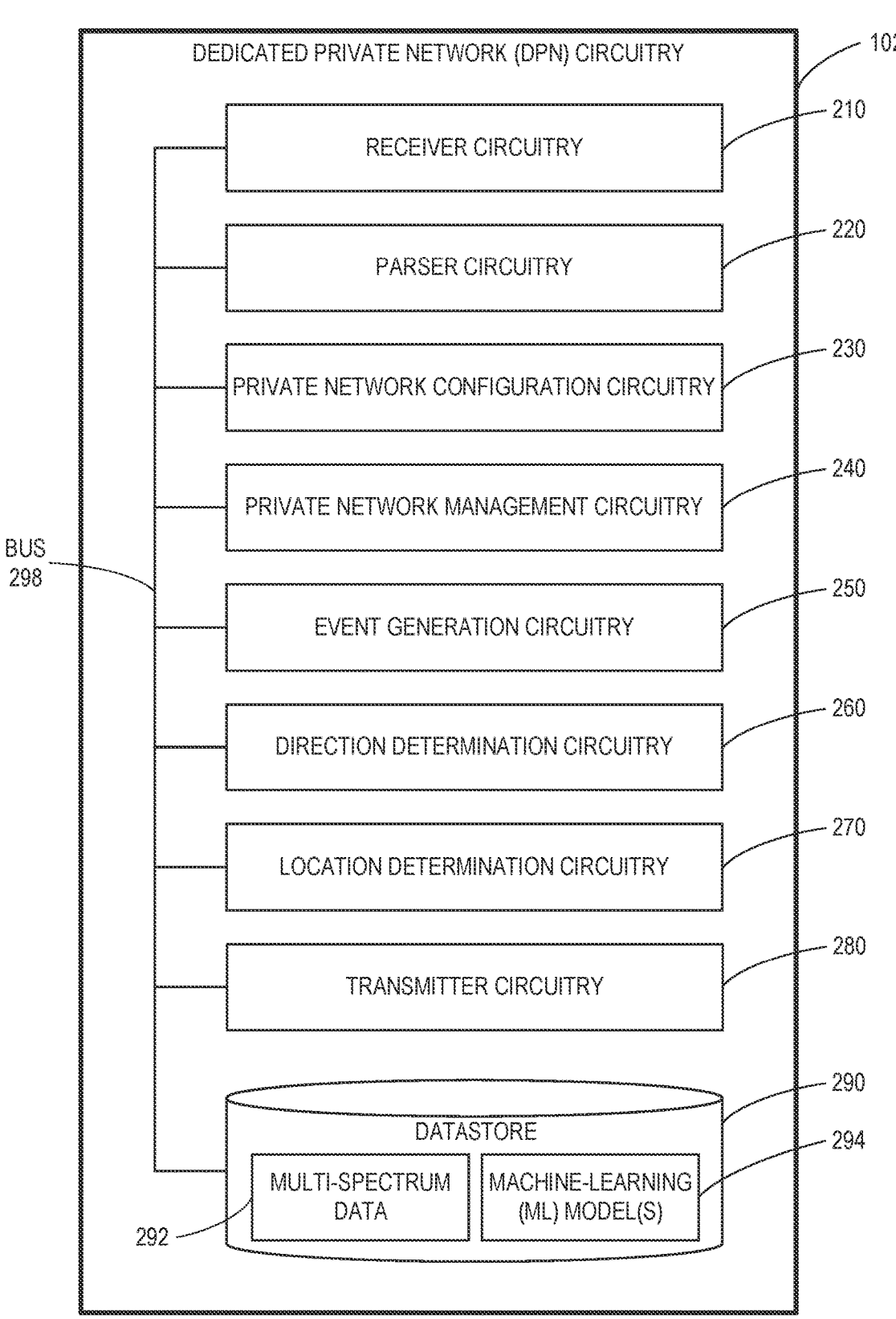
FIG. 2 is a block diagram of an example implementation of the example DPN circuitry of FIG. 1 to instantiate a private network and/or detect a location of a device in the private network.

FIG. 2 is a block diagram of an example implementation of the DPN circuitry 102 of FIG. 1 to instantiate a private network and/or detect a location of a device in the private network. The DPN circuitry 102 of FIGS. 1 and/or 2 may be instantiated (e.g., creating an instance of, bring into being for any length of time, materialize, implement, etc.) by processor circuitry such as a central processing unit executing instructions. Additionally or alternatively, the DPN circuitry 102 of FIGS. 1 and/or 2 may be instantiated (e.g., creating an instance of, bring into being for any length of time, materialize, implement, etc.) by an ASIC or an FPGA structured to perform operations corresponding to the instructions. It should be understood that some or all of the DPN circuitry 102 of FIGS. 1 and/or 2 may, thus, be instantiated at the same or different times. Some or all of the DPN circuitry 102 of FIGS. 1 and/or 2 may be instantiated, for example, in one or more threads executing concurrently on hardware and/or in series on hardware. Moreover, in some examples, some or all of the DPN circuitry 102 of FIGS. 1 and/or 2 may be implemented by microprocessor circuitry executing instructions to implement one or more virtual machines and/or containers.

In the illustrated example of FIG. 2, the DPN circuitry 102 includes example receiver circuitry 210, example parser circuitry 220, example private network configuration circuitry 230, example private network management circuitry 240, example event generation circuitry 250, example direction determination circuitry 260, example location determination circuitry 270, example transmitter circuitry 280, an example datastore 290, and an example bus 298. In this example, the datastore 290 includes example multi-spectrum data 292 and example machine learning (ML) model(s) 294. In examples disclosed herein, the example receiver circuitry 210, the example parser circuitry 220, the example private network configuration circuitry 230, the example private network management circuitry 240, the example event generation circuitry 250, the example direction determination circuitry 260, the example location determination circuitry 270, the example transmitter circuitry 280, the example datastore 290, and the example bus 298 are implemented in a manner such that the number of computational cycles available to an application implemented on the DPN circuitry 102 is optimized (e.g., maximized).

Figure 3:
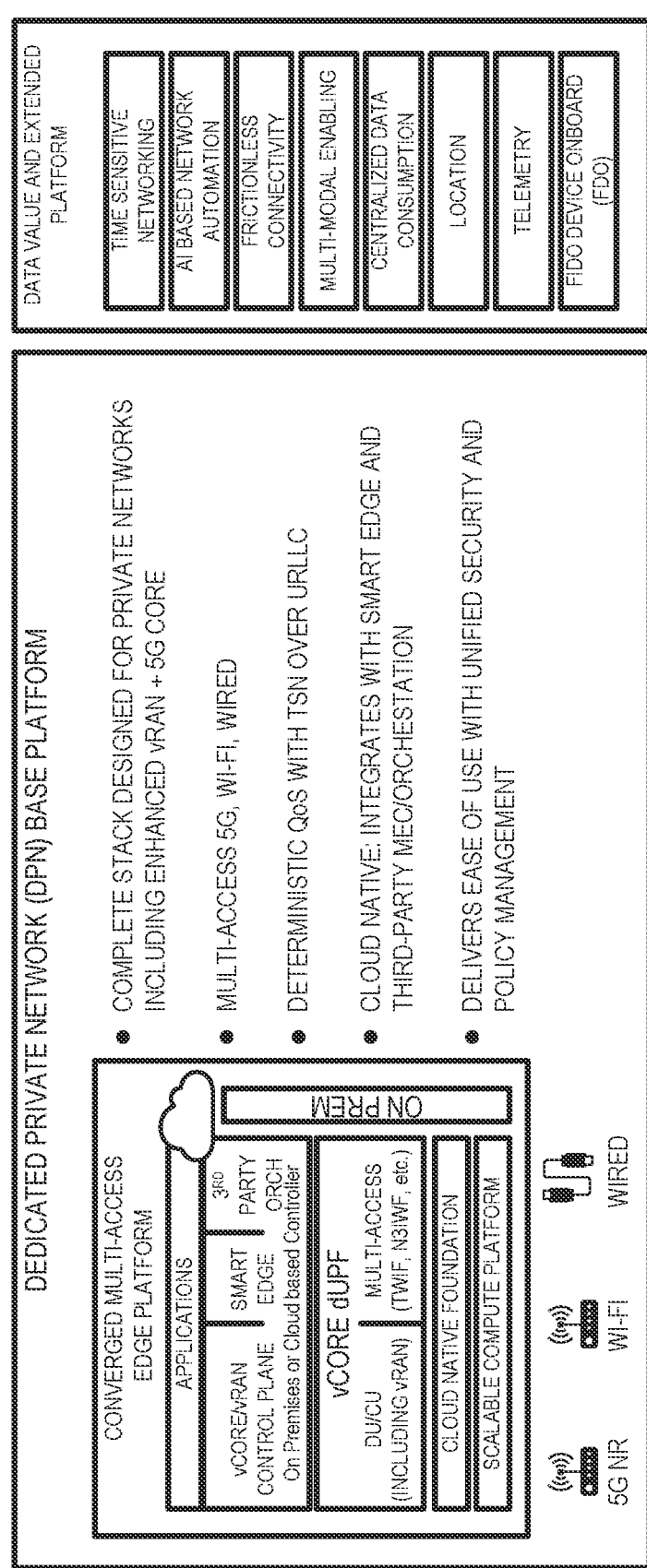
FIG. 3 illustrates an example DPN base platform that can be instantiated utilizing the DPN circuitry of FIGS. 1 and/or 2.

In the illustrated example of FIG. 2, the DPN circuitry 102 includes the direction determination circuitry 260 and the location determination circuitry 270 to facilitate location-related services. In additional or alternative examples, the DPN circuitry 102 includes additional or alternative circuitry to facilitate additional or alternative services. For example, FIG. 3 illustrates an example DPN base platform 300 that can be instantiated utilizing the DPN circuitry 102 of FIGS. 1 and/or 2. In some examples, the DPN base platform 300 can be implemented by the DPN circuitry 102 of FIG. 1. For example, the DPN circuitry 102 can at least one of execute or instantiate a scalable compute platform, a cloud native foundation, and/or applications. The cloud native foundation can include a distributed unit (DU), a control unit (CU), a multi-access controller (e.g., Trusted wireless LAN (WLAN) Inter-Working Function (TWIF), N3IWF, etc.), and/or, more generally, a virtual core (vCore dUPF). The applications can include control plane applications (e.g., a vCore control plane application, a vRAN control plane application, etc.), a smart edge application, and/or a third party orchestration application. Example services that can be facilitated by the DPN base platform 300 include time sensitive networking services, AI based network automation, frictionless connectivity services, multi-modal enabling services, centralized data consumption services, location detection/determination services, telemetry collection services, and/or Fast ID Online (FIDO) device onboarding services.

Returning to the illustrated example of FIG. 2, the receiver circuitry 210, the parser circuitry 220, the private network configuration circuitry 230, the private network management circuitry 240, the event generation circuitry 250, the direction determination circuitry 260, the location determination circuitry 270, the transmitter circuitry 280, and/or the example datastore 290 are in communication with one(s) of each other via the bus 298. For example, the bus 298 may be implemented with at least one of an Inter-Integrated Circuit (I2C) bus, a Serial Peripheral Interface (SPI) bus, a Peripheral Component Interconnect (PCI) bus, or a Peripheral Component Interconnect Express (PCIe or PCI-E) bus. Additionally or alternatively, the bus 298 may be implemented with any other type of computing or electrical bus.

In the illustrated example of FIG. 2, the DPN circuitry 102 includes the receiver circuitry 210 to receive data from device(s), and, in some examples, store the received data as the multi-spectrum data 292. For example, the receiver circuitry 210 may receive data from one(s) of the UE 104 or the satellite 106. In some examples, the receiver circuitry 210 may be implemented by hardware in accordance with any type of interface standard, such as an Ethernet interface, a universal serial bus (USB) interface, a Bluetooth® interface, a near field communication (NFC) interface, a PCI interface, a PCIe interface, a secure payment gateway (SPG) interface, a global navigation system satellite (GNSS) interface, a 4G/5G/6G interface, a CBRS interface, a category 1 (CAT-1) interface, a category M (CAT-M) interface, a narrowband IoT (NB-IoT) interface, etc., and/or any combination thereof. In some examples, the receiver circuitry 210 may include one or more communication devices such as one or more receivers, one or more transceivers, one or more modems, one or more gateways (e.g., residential, commercial, or industrial gateways), one or more wireless access points, and/or one or more network interfaces to facilitate exchange of data with external machines (e.g., computing devices of any kind) by a network, such as the edge cloud 1510 of FIG. 15, the private network 100 of FIG. 1, the core network 110 of FIG. 1, the data network 112 of FIG. 1, etc. In some examples, the receiver circuitry 210 may implement the communication by, for example, an Ethernet connection, a DSL connection, a telephone line connection, a coaxial cable system, a satellite system, a line-of-sight wireless system, a cellular telephone system, an optical connection, etc., and/or any combination thereof. In some examples, the receiver circuitry 210 is instantiated by processor circuitry executing receiver instructions and/or configured to perform operations such as those represented by the data flow diagram and/or the flowcharts of FIGS. 21, 22, 23, and/or 24.

In some examples, the receiver circuitry 210, and/or, more generally, the DPN circuitry 102, executes and/or instantiates a programmable data collector (PDC). For example, the PDC can be executed and/or instantiated to collect statistics, parameters, etc., from a RAN, such as a vRAN. For example, the PDC can be programmed to obtain statistics, parameters, etc., such as 5G SRS statistics/parameters, Wi-Fi statistics/parameters, etc., on an aperiodic or periodic basis. In some examples, the receiver circuitry 210 can initialize the PDC. For example, the PDC can be implemented by hardware, software, and/or firmware to access data (e.g., cellular data, Wi-Fi data, etc.) asynchronously or synchronously based on a policy (e.g., a location determination policy, a service level agreement (SLA), etc.). For example, the PDC can be initialized by being instantiated on hardware (e.g., configure an FPGA to implement the PDC), software (e.g., configure an application, a virtual machine, a container, etc., to implement the PDC), and/or firmware. In some examples, the receiver circuitry 210 configures the PDC based on a policy. For example, the receiver circuitry 210 can configure the PDC to access data at a specified time interval. In some examples, the parser circuitry 220 can configure the PDC to parse data, such as 5G L1 data (e.g., SRS data) substantially instantaneously with the receipt of the 5G L1 data by the receiver circuitry 210 based on an SLA. In some examples, the parser circuitry 220 can configure the PDC to parse 5G L1 data periodically (e.g., every minute, every hour, every day, etc.) based on an SLA.

In the illustrated example of FIG. 2, the DPN circuitry 102 includes the parser circuitry 220 to extract portion(s) of data received by the receiver circuitry 210. In some examples, the parser circuitry 220 may extract portion(s) from data such as cell site or cell tower data, location data (e.g., coordinate data, such as x (horizontal), y (vertical), and/or z (altitude) coordinate data), registration data (e.g., cellular registration data), sensor data (e.g., motion measurements, pressure measurements, speed measurements, temperature measurements, etc.), image data (e.g., camera data, video data, pixel data, etc.), device identifiers (e.g., vendor identifiers, manufacturer identifiers, device name identifiers, etc.), headers (e.g., Internet Protocol (IP) addresses and/or ports, media access control (MAC) addresses and/or ports, etc.), payloads (e.g., protocol data units (PDUs), hypertext transfer protocol (HTTP) payloads, etc.), cellular data (e.g., open systems interconnection (OSI) Layer 1 (L1) data, OSI Layer 2 (L2) data, User Datagram Protocol/Internet Protocol (UDP/IP) data, General Packet Radio Services (GPRS) tunnel protocol user plane (GTP-U) data, etc.), etc., and/or any combination thereof. In some examples, the parser circuitry 220 may store one(s) of the extracted portion(s) in the datastore 290 as the multi-spectrum data 292.

In some examples, the parser circuitry 220 implements hardware queue management circuitry to extract data from the receiver circuitry 210. In some examples, the parser circuitry 220 generates queue events (e.g., data queue events). In some such examples, the queue events may be implemented by an array of data. Alternatively, the queue events may have any other data structure. For example, the parser circuitry 220 may generate a first queue event, which may include a data pointer referencing data stored in memory, a priority (e.g., a value indicative of the priority) of the data, etc. In some examples, the events may be representative of, indicative of, and/or otherwise representative of workload(s) to be facilitated by the hardware queue management circuitry, which may be implemented by the parser circuitry 220. For example, the queue event may be an indication of data to be enqueued to the hardware queue management circuitry.

In some examples, a queue event, such as the first queue event, may be implemented by an interrupt (e.g., a hardware, software, and/or firmware interrupt) that, when generated and/or otherwise invoked, may indicate (e.g., an indication) to the hardware queue management circuitry that there is/are workload(s) associated with the multi-spectrum data 292 to process. In some examples, the hardware queue management circuitry may enqueue the queue event by enqueueing the data pointer, the priority, etc., into first hardware queue(s) included in and/or otherwise implemented by the hardware queue management circuitry. In some examples, the hardware queue management circuitry may dequeue the queue event by dequeuing the data pointer, the priority, etc., into second hardware queue(s) (e.g., consumer queue(s)) that may be accessed by consumer or worker processor cores for subsequent processing) that is/are included in and/or otherwise implemented by the hardware queue management circuitry.

In some examples, a worker processor core may write data to the queue event. For example, in response to dequeuing the queue event from the hardware queue management circuitry and completing a computation operation on the data (e.g., extracting data portion(s) of interest from the data) referenced by the data pointer, the worker processor core may write a completion bit, byte, etc., into the queue event, and enqueue the queue event back to the hardware queue management circuitry. In some such examples, the hardware queue management circuitry may determine that the computation operation has been completed by identifying the completion bit, byte, etc., in the queue event. In some examples, the parser circuitry 220 is instantiated by processor circuitry executing parser instructions and/or configured to perform operations such as those represented by the data flow diagram and/or the flowcharts of FIGS. 21, 22, 23, and/or 24.

In the illustrated example of FIG. 2, the DPN circuitry 102 includes the private network configuration circuitry 230 to instantiate and/or configure the private network 100 of FIG. 1. For example, the private network configuration circuitry 230 can configure a quantity of private network cells to service a quantity of UEs, such as the UE 104. In some examples, the private network configuration circuitry 230 can configure the UE 104 to transmit cellular data (e.g., SRS data) on a synchronous and/or asynchronous basis. In some examples, the private network configuration circuitry 230 can configure the UE 104 to transmit cellular data (e.g., SRS data) on a periodic and/or aperiodic basis. In some examples, the private network configuration circuitry 230 can configure a rate at which the UE 104 is to transmit cellular data. In some examples, the private network configuration circuitry 230 can configure a rate at which the parser circuitry 220 is to extract and/or store portion(s) of the cellular data. In some examples, the private network configuration circuitry 230 is instantiated by processor circuitry executing private network configuration instructions and/or configured to perform operations such as those represented by the data flow diagram and/or the flowcharts of FIGS. 21, 22, 23, and/or 24.

In the illustrated example of FIG. 2, the DPN circuitry 102 includes the private network management circuitry 240 to handle requests for data associated with a private network, such as the private network 100 of FIG. 1. In some examples, the private network management circuitry 240 can process a request from the data network 112 for a location of the UE 104. In some examples, the private network management circuitry 240 can obtain a determination of the location of the UE 104 and provide the location of the UE 104 to at least one of the core network 110 or the data network 112. In some examples, the private network management circuitry 240 is instantiated by processor circuitry executing private network management instructions and/or configured to perform operations such as those represented by the data flow diagram and/or the flowcharts of FIGS. 21, 22, 23, and/or 24.

In the illustrated example of FIG. 2, the DPN circuitry 102 includes the event generation circuitry 250 to generate an event to cause action(s), operation(s), etc., to be executed. In some examples, the event generation circuitry 250 may generate the event to invoke one(s) of the UE 104 or the satellite 106 to execute action(s), operation(s), etc. For example, the event generation circuitry 250 may generate an event that, when received and/or otherwise identified by the UE 104 (when the UE 104 is an autonomous vehicle), may cause the UE 104 to adjust a speed, a direction, etc., of the UE 104. In some such examples, the event generation circuitry 250 may generate the event to cause the UE 104 to move away from an object in response to a determination of a location of the object. In some examples, the event generation circuitry 250 may generate an event to be indicative of an alert, an indication, etc., of an abnormal condition (e.g., an anomaly, an intrusion, etc.) associated with the private network 100. In some examples, the event generation circuitry 250 may store the event(s) in the datastore 290 as the multi-spectrum data 292. In some examples, the event generation circuitry 250 is instantiated by processor circuitry executing event generation instructions and/or configured to perform operations such as those represented by the data flow diagram and/or the flowcharts of FIGS. 21, 22, 23, and/or 24.

In the illustrated example of FIG. 2, the DPN circuitry 102 includes the direction determination circuitry 260 to determine a direction of a device. In some examples, the direction determination circuitry 260 can determine a motion vector including the direction, a speed, etc., of a device, such as the UE 104. In some examples, the direction determination circuitry 260 can determine the direction, and/or, more generally, the motion vector, of the UE 104 based on the multi-spectrum data 292. For example, the direction determination circuitry 260 can determine the direction, and/or, more generally, the motion vector, based on TOA measurements, AOA measurements, TDOA measurements, multi-cell round trip time (RTT) measurements, etc., associated with the UE 104. In some examples, the direction determination circuitry 260 can determine a motion vector including the direction, a speed, etc., of a device, by executing the ML model(s) 294 to generate output(s) (e.g., the direction, the speed, the motion vector, etc.) based on input(s) (e.g., the multi-spectrum data 292). In some examples, the direction determination circuitry 260 can store the direction(s), and/or, more generally, the motion vector(s), in the datastore 290 as the multi-spectrum data 292. In some examples, the direction determination circuitry 260 is instantiated by processor circuitry executing direction determination instructions and/or configured to perform operations such as those represented by the data flow diagram and/or the flowcharts of FIGS. 21, 22, 23, and/or 24.

In the illustrated example of FIG. 2, the DPN circuitry 102 includes the location determination circuitry 270 to determine a location of an object or device, such as the UE 104 of FIG. 1. In some examples, the location determination circuitry 270 can determine a location of the UE 104 based on TOA techniques as described herein. For example, the location determination circuitry 270 can determine a TOA associated with data, or portion(s) thereof, received at a base station, such as the gNB of the vRAN 108. In some examples, the location determination circuitry 270 is instantiated by processor circuitry executing location determination instructions and/or configured to perform operations such as those represented by the data flow diagram and/or the flowcharts of FIGS. 21, 22, 23, and/or 24.

As used herein, time of arrival or TOA refers to the time instant (e.g., the absolute time instant) when a signal (e.g., a radio signal, an electromagnetic signal, an acoustic signal, an optical signal etc.) emanating from a transmitter (e.g., transmitter circuitry) reaches a remote receiver (e.g., remote receiver circuitry). For example, the location determination circuitry 270 can determine a TOA of portion(s) of the multi-spectrum data 292. In some examples, the location determination circuitry 270 can determine the TOA based on the time span that has elapsed since the time of transmission (TOT). In some such examples, the time span is referred to as the time of flight (TOF). For example, the location determination circuitry 270 can determine the TOA of data received by the receiver circuitry 210 based on a first time that a signal was sent from a device, a second time that the signal is received at the receiver circuitry 210, and the speed at which the signal travels (e.g., the speed of light). In some examples, the location determination circuitry 270 can store the TOA data, measurements, etc., in the datastore 290 as the multi-spectrum data 292.

In some examples, the location determination circuitry 270 can determine a location of UE 104 based on angle-of-arrival (AOA) techniques as described herein. For example, location determination circuitry 270 can determine an AOA associated with data, or portion(s) thereof, received at a base station, such as the gNB of the vRAN 108. As used herein, the angle-of-arrival or AOA of a signal is the direction from which the signal (e.g., a radio signal, an electromagnetic signal, an acoustic signal, an optical signal, etc.) is received. In some examples, the location determination circuitry 270 can determine the AOA of a signal based on a determination of the direction of propagation of the signal incident on a sensing array (e.g., an antenna array). In some examples, the location determination circuitry 270 can determine the AOA of a signal based on a signal strength (e.g., a maximum signal strength) during antenna rotation. In some examples, the location determination circuitry 270 can determine the AOA of a signal based on a time difference of arrival (TDOA) between individual elements of a sensing array (e.g., an antenna array). In some examples, the location determination circuitry 270 can measure the difference in received phase at each element in the sensing array and convert the delay of arrival at each element to an AOA measurement. In some examples, the location determination circuitry 270 can store the AOA data, measurements, etc., in the datastore 290 as the multi-spectrum data 292.

In some examples, the location determination circuitry 270 can determine a location (e.g., x, y, and/or z-coordinates in a geometric plane) of an object or device, such as the UE 104. In some examples, the location determination circuitry 270 can determine the position of the UE 104 based on the multi-spectrum data 292. For example, the location determination circuitry 270 can determine a position (e.g., a position vector) of a device, such as the UE 104, based on at least one of AOA, TOA, or TDOA data associated with the UE 104.

In some examples, the location determination circuitry 270 can determine a location and/or position of the UE 104 by executing the ML model(s) 294 to generate output(s) (e.g., the location, the position, etc.) based on input(s) (e.g., the multi-spectrum data 292). In some examples, the location determination circuitry 270 can store the location(s) in the datastore 290 as the multi-spectrum data 292. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the DPN circuitry 102 may train the ML model(s) 294 with data to recognize patterns and/or associations and follow such patterns and/or associations when processing input data such that other input(s) result in output(s) consistent with the recognized patterns and/or associations.

Many different types of machine-learning models and/or machine-learning architectures exist. In some examples, the DPN circuitry 102 generates the ML model(s) 294 as neural network model(s). The DPN circuitry 102 may use a neural network model to execute an AI/ML workload, which, in some examples, may be executed using one or more hardware accelerators. In general, machine-learning models/ architectures that are suitable to use in the example approaches disclosed herein include recurrent neural networks. However, other types of machine learning models could additionally or alternatively be used such as supervised learning artificial neural network (ANN) models, clustering models, classification models, etc., and/or a combination thereof. Example supervised learning ANN models may include two-layer (2-layer) radial basis neural networks (RBN), learning vector quantization (LVQ) classification neural networks, etc. Example clustering models may include k-means clustering, hierarchical clustering, mean shift clustering, density-based clustering, etc. Example classification models may include logistic regression, support-vector machine or network, Naive Bayes, etc. In some examples, the DPN circuitry 102 may compile and/or otherwise generate one(s) of the ML model(s) 294 as lightweight machine-learning models.

In general, implementing an ML/AI system involves two phases, a learning/training phase and an inference phase. In the learning/training phase, the DPN circuitry 102 uses a training algorithm to train the ML model(s) 294 to operate in accordance with patterns and/or associations based on, for example, training data. In general, the ML model(s) 294 include(s) internal parameters (e.g., configuration register data) that guide how input data is transformed into output data, such as through a series of nodes and connections within the ML model(s) 294 to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, the DPN circuitry 102 may invoke supervised training to use inputs and corresponding expected (e.g., labeled) outputs to select parameters (e.g., by iterating over combinations of select parameters) for the ML model(s) 294 that reduce model error. As used herein, "labeling" refers to an expected output of the machine learning model (e.g., a classification, an expected output value, etc.). Alternatively, the DPN circuitry 102 may invoke unsupervised training (e.g., used in deep learning, a subset of machine learning, etc.) that involves inferring patterns from inputs to select parameters for the ML model(s) 294 (e.g., without the benefit of expected (e.g., labeled) outputs).

In some examples, the DPN circuitry 102 trains the ML model(s) 294 using unsupervised clustering of operating observables. For example, the operating observables may include a vendor identifier, an Internet Protocol (IP) address, a media access control (MAC) address, a serial number, a certificate, AOA data, TOA data, TDOA data, SRS data or portion(s) thereof, etc., of and/or associated with a device (e.g., an enterprise device, an IoT device, the UE 104, etc.). However, the DPN circuitry 102 may additionally or alternatively use any other training algorithm such as stochastic gradient descent, Simulated Annealing, Particle Swarm Optimization, Evolution Algorithms, Genetic Algorithms, Nonlinear Conjugate Gradient, etc.

In some examples, the DPN circuitry 102 may train the ML model(s) 294 until the level of error is no longer reducing. In some examples, the DPN circuitry 102 may train the ML model(s) 294 locally on the DPN circuitry 102 and/or remotely at an external computing system communicatively coupled to a network. In some examples, the DPN circuitry 102 trains the ML model(s) 294 using hyperparameters that control how the learning is performed (e.g., a learning rate, a number of layers to be used in the machine learning model, etc.). In some examples, the DPN circuitry 102 may use hyperparameters that control model performance and training speed such as the learning rate and regularization parameter(s). The DPN circuitry 102 may select such hyperparameters by, for example, trial and error to reach an optimal model performance. In some examples, the DPN circuitry 102 utilizes Bayesian hyperparameter optimization to determine an optimal and/or otherwise improved or more efficient network architecture to avoid model overfitting and improve the overall applicability of the ML model(s) 294. Alternatively, the DPN circuitry 102 may use any other type of optimization. In some examples, the DPN circuitry 102 may perform re-training. The DPN circuitry 102 may execute such re-training in response to override(s) by a user of the DPN circuitry 102, a receipt of new training data, etc.

In some examples, the DPN circuitry 102 facilitates the training of the ML model(s) 294 using training data. In some examples, the DPN circuitry 102 utilizes training data that originates from locally generated data, such as 5G Layer 1 (L1) data, image data, IP addresses, MAC addresses, radio identifiers, etc. In some examples, the DPN circuitry 102 utilizes training data that originates from externally generated data. For example, the DPN circuitry 102 may utilize L1 data from any data source (e.g., a camera, a RAN system, a satellite, an AP, etc.). In some such examples, the L1 data may correspond to L1 data of an OSI model. In some such examples, the L1 data of an OSI model may correspond to the physical layer (PHY) of the OSI model, L2 data of the OSI model may correspond to the data link layer, L3 data of the OSI model may correspond to the network layer, and so forth. In some such examples, the L1 data may correspond to the transmitted raw bit stream over a physical medium (e.g., a wired line physical structure such as coax or fiber, an antenna, a receiver, a transmitter, a transceiver, etc.). In some such examples, the L1 data may be implemented by signals, binary transmission, etc. In some examples, the L2 data may correspond to physical addressing of the data, which may include Ethernet data, MAC addresses, logical link control (LLC) data, etc.

In some examples where supervised training is used, the DPN circuitry 102 may label the training data (e.g., label training data or portion(s) thereof as object identification data, location data, etc.). Labeling is applied to the training data by a user manually or by an automated data pre-processing system. In some examples, the DPN circuitry 102 may pre-process the training data using, for example, an interface (e.g., network interface circuitry) to extract and/or otherwise identify data of interest and discard data not of interest to improve computational efficiency. In some examples, the DPN circuitry 102 sub-divides the training data into a first portion of data for training the ML model(s) 294, and a second portion of data for validating the ML model(s) 294.

Once training is complete, the DPN circuitry 102 may deploy the ML model(s) 294 for use as an executable construct that processes an input and provides an output based on the network of nodes and connections defined in the ML model(s) 294. The DPN circuitry 102 may store the ML model(s) 294 in a datastore that may be accessed by the DPN circuitry 102, a cloud repository, etc. In some examples, the DPN circuitry 102 may transmit the ML model(s) 294 to external computing system(s) via the network. In some such examples, in response to transmitting the ML model(s) 294 to the external computing system(s), the external computing system(s) may execute the ML model(s) 294 to execute AI/ML workloads with at least one of improved efficiency or performance to achieve improved object tracking, location detection, etc., and/or a combination thereof.

Once trained, the deployed one(s) of the ML model(s) 294 may be operated in an inference phase to process data. In the inference phase, data to be analyzed (e.g., live data) is input to the ML model(s) 294, and the ML model(s) 294 execute(s) to create an output. This inference phase can be thought of as the AI "thinking" to generate the output based on what it learned from the training (e.g., by executing the ML model(s) 294 to apply the learned patterns and/or associations to the live data). In some examples, input data undergoes pre-processing before being used as an input to the ML model(s) 294. Moreover, in some examples, the output data may undergo post-processing after it is generated by the ML model(s) 294 to transform the output into a useful result (e.g., a display of data, a detection and/or identification of an object, a location determination of an object, an instruction to be executed by a machine, etc.).

In some examples, output of the deployed one(s) of the ML model(s) 294 may be captured and provided as feedback. By analyzing the feedback, an accuracy of the deployed one(s) of the ML model(s) 294 can be determined. If the feedback indicates that the accuracy of the deployed model is less than a threshold or other criterion, training of an updated model can be triggered using the feedback and an updated training data set, hyperparameters, etc., to generate an updated, deployed model.

As used herein, data is information in any form that may be ingested, processed, interpreted, and/or otherwise manipulated by processor circuitry to produce a result. The produced result may itself be data. As used herein, a model is a set of instructions and/or data that may be ingested, processed, interpreted, and/or otherwise manipulated by processor circuitry to produce a result. Often, a model is operated using input data to produce output data in accordance with one or more relationships reflected in the model. The model may be based on training data. As used herein "threshold" is expressed as data such as a numerical value represented in any form, that may be used by processor circuitry as a reference for a comparison operation.

Turning back to the illustrated example of FIG. 2, the DPN circuitry 102 includes the transmitter circuitry 280 to transmit data to device(s). For example, the transmitter circuitry 280 may transmit data to one(s) of the edge cloud 1510, the UE 104, the satellite 106, the core network 110, the data network 112, etc. In some examples, the transmitter circuitry 280 is instantiated by processor circuitry executing transmitter instructions and/or configured to perform operations such as those represented by the data flow diagram and/or the flowcharts of FIGS. 21, 22, 23, and/or 24.

In some examples, the transmitter circuitry 280 may be implemented by hardware in accordance with any type of interface standard, such as an Ethernet interface, a USB interface, a Bluetooth® interface, an NFC interface, a PCI interface, a PCIe interface, an SPG interface, a GNSS interface, a 4G/5G/6G interface, a CBRS interface, a CAT-1 interface, a CAT-M interface, an NB-IoT interface, etc., and/or any combination thereof. In some examples, the transmitter circuitry 280 may include one or more communication devices such as one or more transmitters, one or more transceivers, one or more modems, one or more gateways (e.g., residential, commercial, or industrial gateways), one or more wireless access points, and/or one or more network interfaces to facilitate exchange of data with external machines (e.g., computing devices of any kind) by a network, such as the edge cloud 1510. In some examples, the transmitter circuitry 280 may implement the communication by, for example, an Ethernet connection, a DSL connection, a telephone line connection, a coaxial cable system, a satellite system, a line-of-sight wireless system, a cellular telephone system, an optical connection, etc., and/or any combination thereof.

In the illustrated example of FIG. 2, the DPN circuitry 102 includes the datastore 290 to record data (e.g., the multi-spectrum data 292, the ML model(s) 294, etc.). The datastore 290 of this example may be implemented by a volatile memory and/or a non-volatile memory (e.g., flash memory). The datastore 290 may additionally or alternatively be implemented by one or more double data rate (DDR) memories, such as DDR, DDR2, DDR3, DDR4, mobile double data rate (mDDR), etc. The datastore 290 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 290 is illustrated as a single datastore, the datastore 290 may be implemented by any number and/or type(s) of datastores. Furthermore, the data stored in the datastore 290 may be in any data format such as, for example, binary data, comma delimited data, tab delimited data, structured query language (SQL) structures, an executable (e.g., an executable binary, an ML configuration image, etc.), etc.

In some examples, the multi-spectrum data 292 may include data received by the receiver circuitry 210. For example, the multi-spectrum data 292 may receive data from one(s) of the UE 104, the satellite 106, a Bluetooth device, a Wi-Fi device, etc. In some examples, the multi-spectrum data 292 may include GPS data, 4G LTE/5G/6G data, direction data, and/or speed data associated with the UE 104. In some examples, the multi-spectrum data 292 can include device identification data, TOA data, AOA data, TDOA data, event data, direction data, location data, etc., and/or any combination(s) thereof.

While an example manner of implementing the DPN circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example receiver circuitry 210, the example parser circuitry 220, the example private network configuration circuitry 230, the example private network management circuitry 240, the example event generation circuitry 250, the example direction determination circuitry 260, the example location determination circuitry 270, the example transmitter circuitry 280, the example datastore 290, and/or, more generally, the example DPN circuitry 102 of FIG. 1, may be implemented by hardware alone or by hardware in combination with software and/or firmware. Thus, for example, any of the example receiver circuitry 210, the example parser circuitry 220, the example private network configuration circuitry 230, the example private network management circuitry 240, the example event generation circuitry 250, the example direction determination circuitry 260, the example location determination circuitry 270, the example transmitter circuitry 280, the example datastore 290, and/or, more generally, the example DPN circuitry 102, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example DPN circuitry 102 of FIG. 1 may include one or more elements, processes, and/or devices in addition to, or instead of, those illustrated in FIG. 2, and/or may include more than one of any or all of the illustrated elements, processes and devices.

Figure 4:
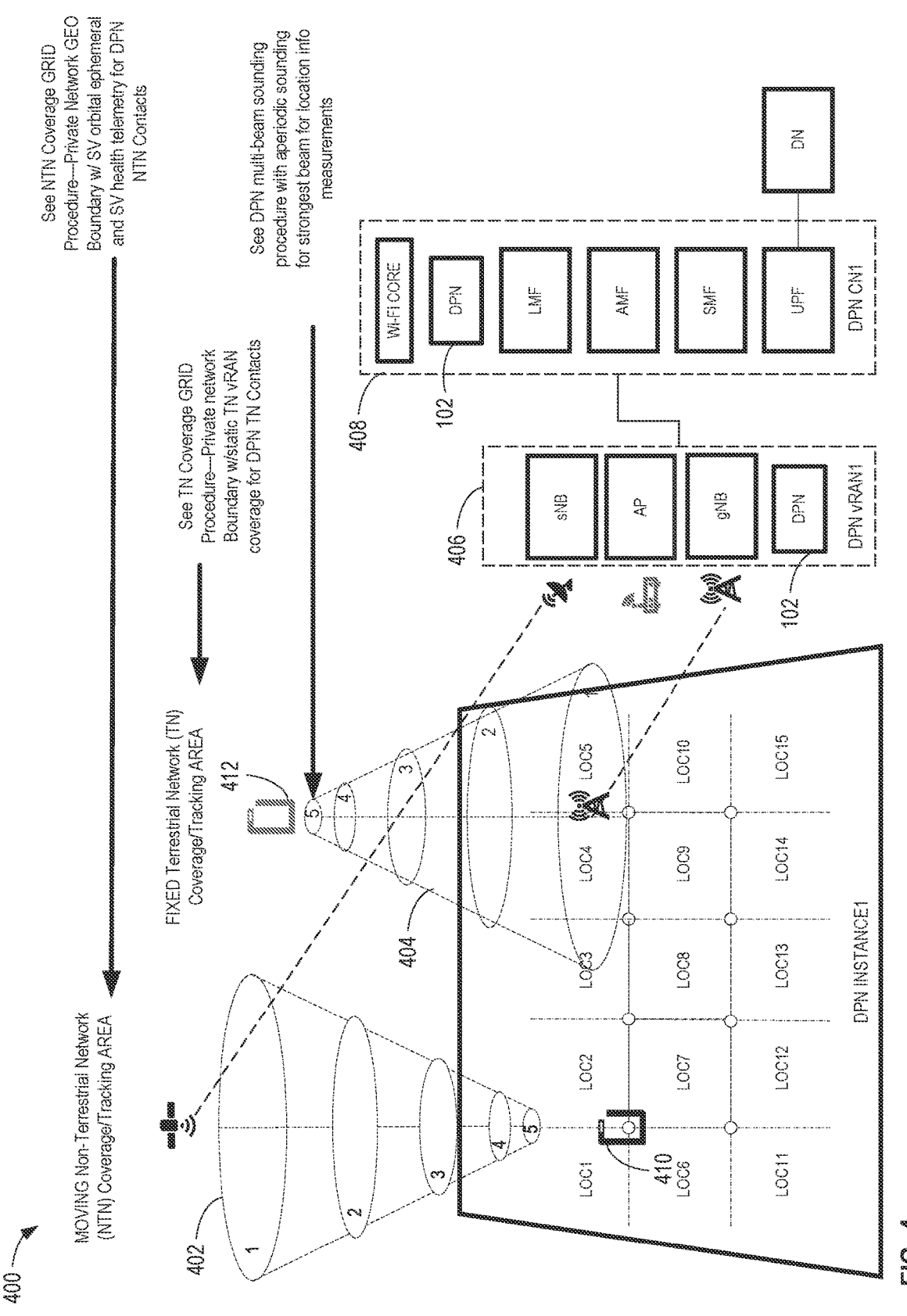
FIG. 4 is an example private network system including a terrestrial network (TN) and a non-terrestrial network (NTN) that can be instantiated utilizing the DPN circuitry of FIGS. 1 and/or 2.

FIG. 4 is an example private network system 400 including a terrestrial network (TN) and a non-terrestrial network (NTN) that can be instantiated utilizing the DPN circuitry 102 of FIGS. 1 and/or 2. The private network system 400 includes a first example private network 402 and a second example private network 404. The first private network 402 is a moving non-terrestrial network (NTN) provided by a space vehicle (SV) (e.g., an NTN node) having a particular coverage and/or tracking area. The second private network 404 is a fixed terrestrial network (TN) provided by a base station (e.g., a TN node) having a particular coverage and/or tracking area. A possible advantage of examples disclosed herein is that an example vRAN 406, which includes the DPN circuitry 102 of FIG. 1, can configure and/or manage the first private network 402 and/or the second private network 404. In some examples, the vRAN 406 may be implemented by any type of RAN. Additionally, an example core network (CN) 408, which includes the DPN circuitry 102, can determine a location of one or more UEs accessing the private network system 400 based on processed (or unprocessed) SRS data provided by the DPN circuitry 102 of the vRAN 406.

In the illustrated example of FIG. 4, the first private network 402 is providing connectivity to a first example UE 410. In the example of FIG. 4, the first UE 410 is a terrestrial UE (e.g., a UE on the Earth). As the SV providing the first private network 402 moves over the first UE 410 and the coverage and/or tracking area of the first private network 402 intersects with the first UE 410, the first UE 410 may register with the first private network 402. In some examples, the DPN circuitry 102 of the vRAN 406 and/or the CN 408 can track the first UE 410 via SRS and/or PRS data (e.g., for multi-cell RTT) while the first UE 410 is within the line-of-sight of the SV providing the first private network 402. Additionally, in the example of FIG. 4, the second private network 404 is providing connectivity to a second example UE 412. In the example of FIG. 4, the second UE 412 is a non-terrestrial UE (e.g., a UE that is above the Earth (e.g., flying in the air, orbiting the Earth, etc.)). As the second UE 412 moves over the second private network 404 and intersects with the coverage and/or tracking area of the second private network 404, the second UE 412 may register with the second private network 404. In some examples, the DPN circuitry 102 of the vRAN 406 and/or the CN 408 can track the second UE 412 via SRS and/or PRS data (e.g., for multi-cell RTT) while the second UE 412 is within the line-of-sight of the DPN circuitry 102 of the vRAN 406 and/or the CN 408.

In the illustrated example of FIG. 4, the first UE 410 may have different states of connectivity with the first private network 402 and the second UE 412 may have different states of connectivity with the second private network 404. For example, FIG. 5 illustrates example states 500 for private network mobility management for precise positioning. In the example of FIG. 5, the level of resolution with which the DPN circuitry 102 of FIG. 1 can determine the position of a UE depends on the state of connectivity (e.g., level of connectivity) between the UE and the private network. For example, if the first UE 410 has a UE state 0, then the first UE 410 is unregistered with the first private network 402 and has a first UE location granularity, which may be unknown.

Figure 7:
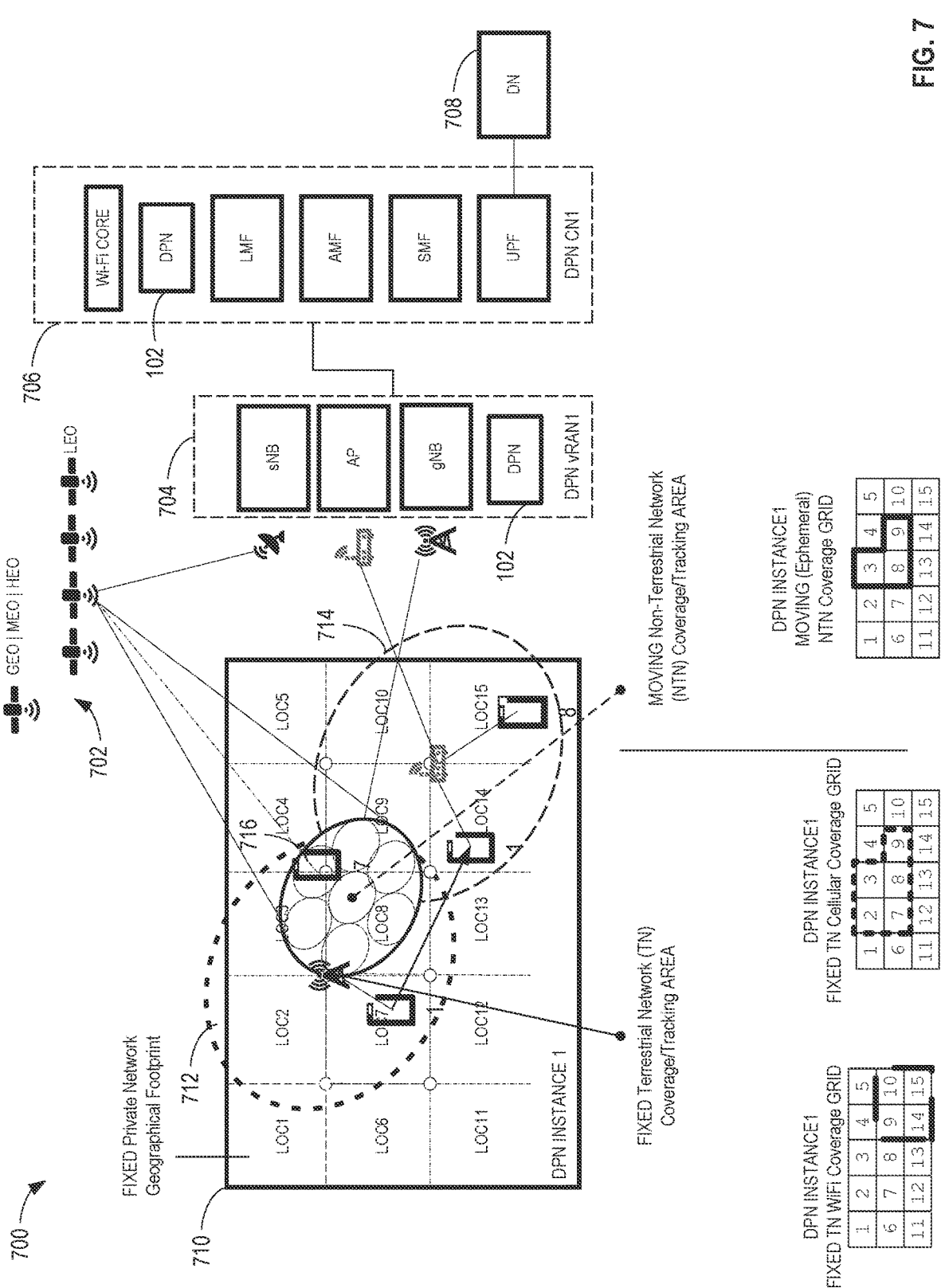
FIG. 7 is yet another example private network system to implement and/or otherwise effectuate private network precise positioning utilizing the DPN circuitry of FIGS. 1 and/or 2.

In the illustrated example of FIG. 5, if the first UE 410 has UE state 1, then the first UE 410 is idle and has a second UE location granularity, which is more granular than the first UE location granularity. For example, in UE state 1, the DPN circuitry 102 can determine that the first UE 410 is within the coverage and/or tracking area of the first private network 402. In another example, if the first UE 410 has UE state 2, then the first UE 410 is RRC-INACTIVE and has a third UE location granularity, which is more granular than the second UE location granularity. For example, in UE state 2, the DPN circuitry 102 can determine that the first UE 410 is within a RAN of the first private network 402. When the first UE 410 is in UE state 2 (e.g., the RRC-INACTIVE state), the DPN circuitry 102 can determine the location of the first UE 410 without the data and control protocols required by higher UE states. For example, when the first UE 410 is in UE state 2 (e.g., the RRC-INACTIVE state), the first UE 410 is in a state of connectivity with the first private network 402 that does not require communications related to a data plane or a control plane of the first private network 402. As such, by monitoring location of the first UE 410 in the RRC-INACTIVE state, the DPN circuitry 102 can reduce power consumption on the first UE 410. In some examples, in UE state 2, the DPN circuitry 102 can maintain reference signal (e.g., SRS) transmissions with the first UE 410 via TN and/or NTN. An example of ephemeral connectivity is illustrated in FIG. 7.

In the illustrated example of FIG. 5, if the first UE 410 has UE state 3, then the first UE 410 is RRC-CONNECTED and has a fourth UE location granularity, which is more granular than the third UE location granularity. For example, in UE state 3, the DPN circuitry 102 can determine that the first UE 410 is within a cell of the first private network 402. In another example, if the first UE 410 has UE state 4, then the first UE 410 is RRC-CONNECTED with scheduled periodic SRS data collection and has a fifth UE location granularity, which is more granular than the fourth UE location granularity. For example, in UE state 4, the DPN circuitry 102 can determine the location of the first UE 410 within 1 m of the actual location of the first UE 410. Additionally, for example, in UE state 4, the DPN circuitry 102 can determine the location of the first UE 410 with sub-1 second frequency.

In the illustrated example of FIG. 5, if the first UE 410 has UE state 5, then the first UE 410 is RRC-CONNECTED with scheduled periodic SRS data collection via an aperiodic beam in the strongest channel (e.g., strongest communication channel) of the bandwidth of the first UE 410. Additionally, in UE state 5, the first UE 410 has a sixth UE location granularity, which is more granular than the fifth UE location granularity. For example, in UE state 5, the DPN circuitry 102 can determine the location of the first UE 410 within much less than 1 m of the actual location of the first UE 410. Additionally, for example, in UE state 5, the DPN circuitry 102 can determine the location of the first UE 410 with much less than sub-1 second frequency. By way of example, as the first UE 410 and the second UE 412 transitions from UE state 0 to UE state 5, the UE location granularity becomes more granular and/or otherwise more accurate. As illustrated in FIG. 5, the DPN circuitry 102 can determine the location of a UE with increased resolution as a level of connectivity between the UE and a private network increases.

Figure 6:
FIG. 6 is another example private network system, which can implement an example precise positioning architecture that can be instantiated utilizing the DPN circuitry of FIGS. 1 and/or 2.

FIG. 6 is another example private network system 600, which can implement an example precise positioning architecture that can be instantiated utilizing the DPN circuitry 102 of FIGS. 1 and/or 2. The private network system 600 includes a plurality of example satellites 602 traveling along an example orbital direction 604. In example operation, a first one of the satellites 602, which can be a LEO satellite, can enter a range of a private network coverage area and handle private network management. In example operation, after the first one of the satellites 602 leaves the range of the private network coverage area, a second one of the satellites 602 can take over the private network management to effectuate seamless private network management handoff. As such, DPN circuitry (e.g., the DPN circuitry 102) can consistently provide connectivity to an example UE 606. In some examples, the UE 606 can transmit reference signals (e.g., for multi-cell RTT) to the satellites 602 to facilitate tracking of the UE 606 by the DPN circuitry 102.

FIG. 7 is yet another example private network system 700 to implement and/or otherwise effectuate private network precise positioning utilizing the DPN circuitry 102 of FIGS. 1 and/or 2. The private network system 700 includes an example satellite constellation 702, an example vRAN 704, an example core network 706, and an example data network 708. In some examples, the vRAN 704 may be implemented by any type of RAN. The satellite constellation 702 may include one or more geostationary earth orbit (GEO) satellites, low earth orbit (LEO) satellites, medium earth orbit (MEO) satellites, and/or high earth orbit (HEO) satellites. In the example of FIG. 7, the vRAN 704 includes the DPN circuitry 102. Additionally or alternatively, the core network 706 of FIG. 7 includes the DPN circuitry 102.

In the illustrated example of FIG. 7, the private network system 700 includes an example coverage grid 710 in which portions may be assigned for one or more private networks. The coverage grid 710 includes a plurality of fixed private network geographical footprints (identified by LOC1, LOC2, etc.). For example, the coverage grid 710 includes a first example private network 712 and a second example private network 714. In some examples, the coverage grid 710 may be referred to as a coverage mesh. In some examples, an example mesh refers to a division of a geographic area into one or more zones that may or may not be uniform. The first private network 712 is a cellular-based private network implemented by a cellular base station. The second private network 714 is a Wi-Fi based private network implemented by a Wi-Fi access point. The first private network 712 and the second private network 714 overlap (e.g., LOC9). As such, each fixed private network geographical footprint (e.g., LOC9) is associated with and/or supports one or more communication access mediums (e.g., each fixed private network geographical footprint is multi-access). For example, the DPN circuitry 102 can predict a communication access medium that would have the highest likelihood of providing a stable connection for an example UE 716. In such examples, the DPN circuitry 102 can provide the UE 716 access to the private network system 700 via the predicted communication access medium. Additionally or alternatively, the DPN circuitry 102 can provide the UE 716 access to the private network system 700 via a communication access medium that is indicated in a policy for a fixed private network geographical footprint in the coverage grid 710.

In the illustrated example of FIG. 7, the DPN circuitry 102 can determine the coverage grid 710 dynamically, on-the-fly. For example, the DPN circuitry 102 determines the coverage grid 710 based on data received from one or more base stations (e.g., one or more gNBs) and/or one or more access points (e.g., one or more APs) deployed in an environment in which the private network system 700 is implemented. In some examples, the DPN circuitry 102 can determine latitude and longitude coordinates for a Wi-Fi access point deployed in the environment based on data received from the Wi-Fi access point. Based on latitude and longitude coordinates received from one or more base stations and/or access points deployed in the environment in which the private network system 700, the DPN circuitry 102 can determine (e.g., define, create, etc.) the coverage grid 710. Additionally or alternatively, the coverage grid 710 may be predefined.

In example operation, the UE 716, which may be implemented by any type of electronic device (e.g., a smartphone, a tablet computer, an electronic control unit (ECU) in a vehicle, etc.), is moving within the coverage grid 710. For example, the UE 716 is moving between LOC3, LOC8, and LOC9. A possible advantage of the DPN circuitry 102 is that the DPN circuitry 102 can ensure that the UE 716 does not experience (e.g., mitigate) a drop in communication when moving between the first private network 712 and the second private network 714. For example, as described above, the DPN circuitry 102 can predict a next location of the UE 716 and select a next communication access medium to support connectivity for the UE 716. For example, based on location data and/or other feedback from the UE 716, the DPN circuitry 102 can predict that the UE 716 has moved from LOC8 to LOC9 and will next move to LOC10, LOC14, and/or LOC15. For example, as the UE 716 traverses the coverage grid 710, the UE 716 transmits reference signal via multiple communication mediums. As such, the multi-access nodes (e.g., TN nodes such as access points, base stations, gNBs, eNBs, etc. and NTN nodes such as space vehicles, satellites, sNBs, etc.) of the private network of FIG. 7 can receive the reference signals which allows for the DPN circuitry 102 to identify which access technology can best serve the UE 716. For example, the DPN circuitry 102 can select a Wi-Fi connection as the next communication access medium to support connectivity for the UE 716. To facilitate such communication, the DPN circuitry 102 can authorize the UE 716 to join the first private network 712

(e.g., a 5G terrestrial network) and the second private network 714 (e.g., a Wi-Fi network).

In some examples, the DPN circuitry 102 provides connectivity to the UE 716 via one or more satellites. For example, as the UE 716 moves between the first private network 712 and the second private network 714, network access may degrade as signals communicated to and/or from the UE 716 may attenuate before reaching a base station or access point. As such, the DPN circuitry 102 may provide temporary (e.g., ephemeral) or moving connectivity to the UE 716 via one or more satellites when the UE 716 is transitioning between the first private network 712 and the second private network 714. Additionally, by providing temporary or moving connectivity to the UE 716, the coverage grid 710 supports dynamic location monitoring (e.g., via one or more non-terrestrial connections to the UE 716) and static location monitoring (e.g., via one or more terrestrial connections to the UE 716).

Figure 8:
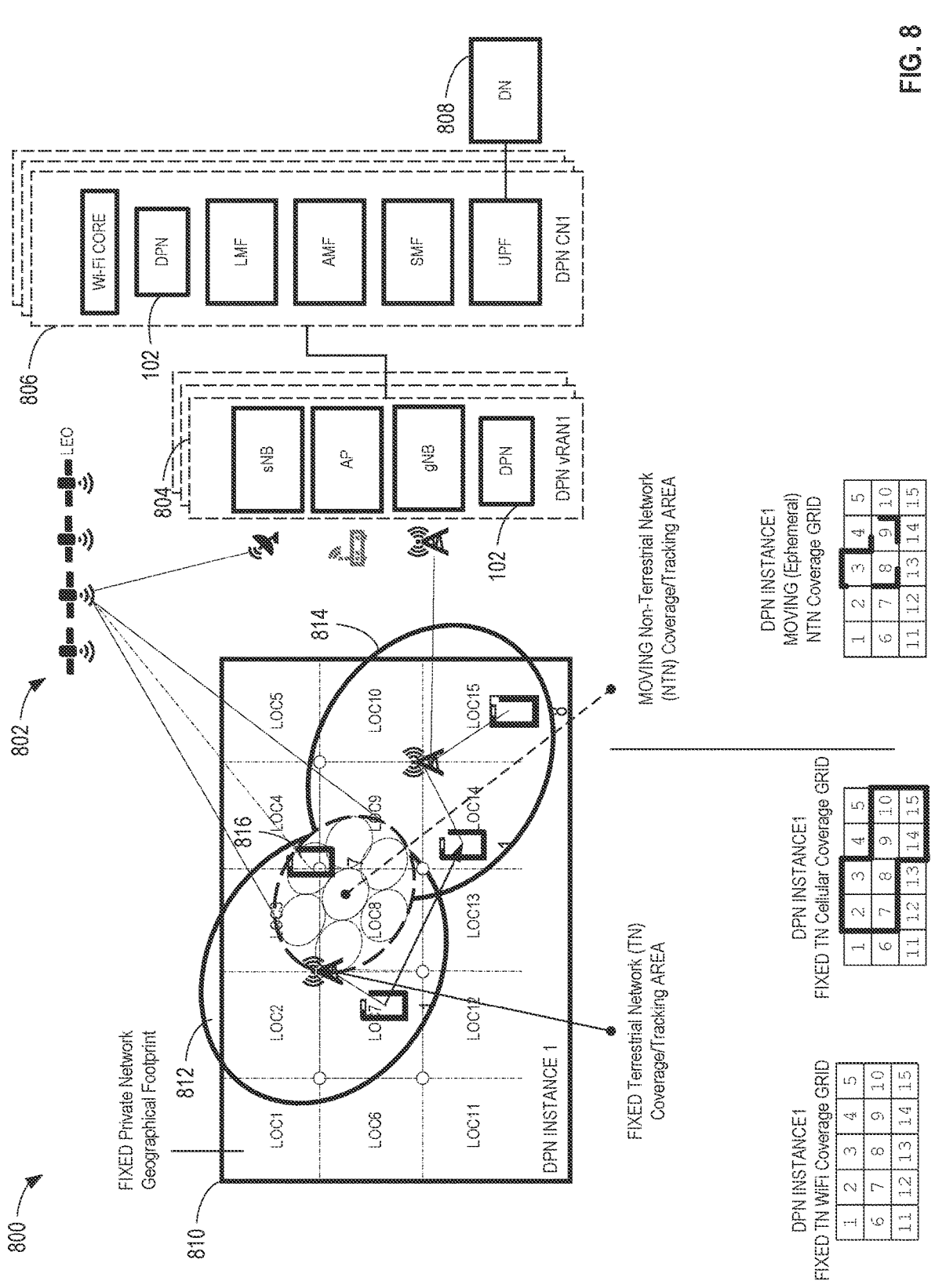
FIG. 8 is yet another example private network system to implement and/or otherwise effectuate private network precise positioning utilizing the DPN circuitry of FIGS. 1 and/or 2.

FIG. 8 is yet another example private network system 800 to implement and/or otherwise effectuate private network precise positioning utilizing the DPN circuitry 102 of FIGS. 1 and/or 2. The private network system 800 includes an example satellite constellation 802, one or more example vRANs 804, one or more example core networks 806, and an example data network 808. In some examples, the one or more vRANs 804 may be implemented by any type of RAN. The satellite constellation 802 may include one or more LEO satellites. In the example of FIG. 8, the one or more vRANs 804 include the DPN circuitry 102. Additionally or alternatively, the one or more core networks 806 of FIG. 8 include the DPN circuitry 102.

In the illustrated example of FIG. 8, the private network system 800 includes an example coverage grid 810 in which portions may be assigned for one or more private networks. The coverage grid 810 includes a plurality of fixed private network geographical footprints (identified by LOC1, LOC2, etc.). For example, the coverage grid 810 includes a first example private network 812 and a second example private network 814. The first private network 812 and the second private network 814 are cellular-based private networks implemented by respective cellular base stations. The first private network 812 and the second private network 814 overlap (e.g., LOC9). As such, each fixed private network geographical footprint (e.g., LOC9) is associated with and/or supports one or more communication access mediums. For example, the DPN circuitry 102 can predict a communication access medium that would have the highest likelihood of providing a stable connection for an example UE 816. In such examples, the DPN circuitry 102 can provide the UE 816 access to the private network system 800 via the predicted communication access medium. Additionally or alternatively, the DPN circuitry 102 can provide the UE 816 access to the private network system 800 via a communication access medium that is indicated in a policy for a fixed private network geographical footprint in the coverage grid 810.

In the illustrated example of FIG. 8, the DPN circuitry 102 can determine the coverage grid 810 dynamically, on-the-fly. For example, the DPN circuitry 102 determines the coverage grid 810 based on data received from one or more base stations (e.g., one or more gNBs) and/or one or more access points (e.g., one or more APs) deployed in an environment in which the private network system 800 is implemented. In some examples, the DPN circuitry 102 can determine latitude and longitude coordinates for a Wi-Fi access point deployed in the environment based on data received from the Wi-Fi access point. Based on latitude and longitude coordinates received from one or more base stations and/or access points deployed in the environment in which the private network system 800, the DPN circuitry 102 can determine (e.g., define, create, etc.) the coverage grid 810. Additionally or alternatively, the coverage grid 810 may be predefined.

In example operation, the UE 816, which may be implemented by any type of electronic device (e.g., a smartphone, a tablet computer, an electronic control unit (ECU) in a vehicle, etc.), is moving within the coverage grid 810. For example, the UE 816 is moving between LOC3, LOC8, and LOC9. A possible advantage of the DPN circuitry 102 is that the DPN circuitry 102 can ensure that the UE 816 does not experience a drop in communication when moving between the first private network 812 and the second private network 814. For example, as described above, the DPN circuitry 102 can predict a next location of the UE 816 and select a next communication access medium to support connectivity for the UE 816. For example, based on location data and/or other feedback from the UE 816, the DPN circuitry 102 can predict that the UE 816 has moved from LOC8 to LOC9 and will next move to LOC10, LOC14, and/or LOC15. As such, the DPN circuitry 102 can select a terrestrial cellular connection as the next communication access medium to support connectivity for the UE 816. For example, the DPN circuitry 102 can authorize the UE 816 to join the first private network 812 (e.g., a 5G terrestrial network) and the second private network 814 (e.g., a 5G terrestrial network).

In some examples, the DPN circuitry 102 provides connectivity to the UE 816 via one or more satellites. For example, as the UE 816 moves between the first private network 812 and the second private network 814, network access may degrade as signals communicated to and/or from the UE 816 may attenuate before reaching a base station or access point. As such, the DPN circuitry 102 may provide temporary (e.g., ephemeral) or moving connectivity to the UE 816 via one or more satellites when the UE 816 is transitioning between the first private network 812 and the second private network 814. Additionally, by providing temporary or moving connectivity to the UE 816, the coverage grid 810 supports dynamic location monitoring (e.g., via one or more non-terrestrial connections to the UE 816) and static location monitoring (e.g., via one or more terrestrial connections to the UE 816).

Figure 9:
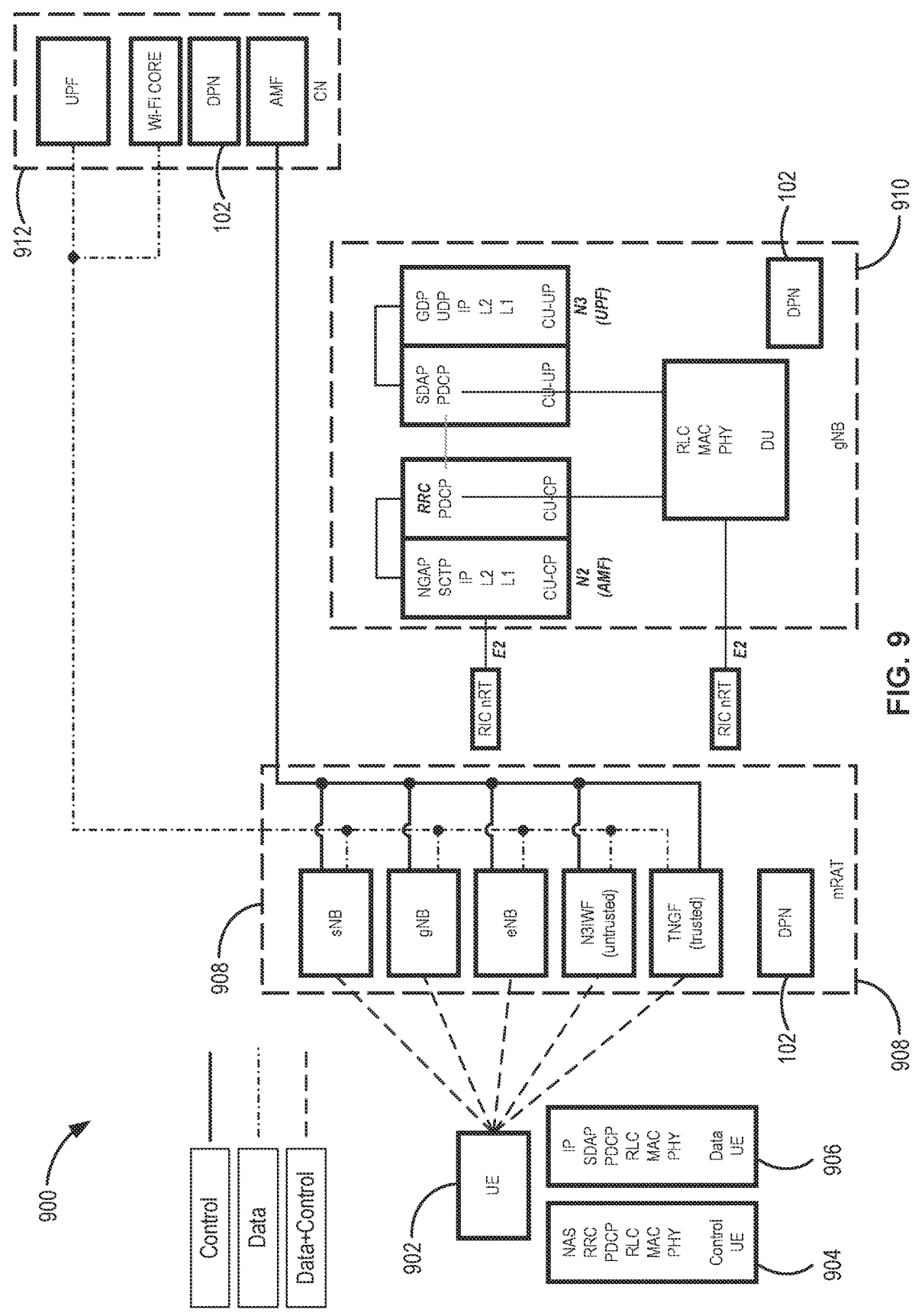
FIG. 9 is an example private network architecture that can be instantiated utilizing the DPN circuitry of FIGS. 1 and/or 2.

FIG. 9 is an example private network architecture 900 that can be instantiated utilizing the DPN circuitry 102 of FIGS. 1 and/or 2. The private network architecture 900 includes an example UE 902, which can instantiate and/or execute an example control plane 904 (identified by CONTROL UE) and an example data plane 906 (identified by DATA UE). The private network architecture 900 includes an example mobile radio access technology (mRAT) 908, which includes the DPN circuitry 102 of FIG. 1. The private network architecture 900 includes an example gNB 910, which includes the DPN circuitry 102. The private network architecture 900 includes an example core network 912, which includes the DPN circuitry 102 and an example Wi-Fi core. Alternatively, the mRAT 908, the gNB 910, and/or the core network 912 may not include the DPN circuitry 102.

In example operation, the UE 902 can transmit cellular data, such as SRS data, to the mRAT 908 via one or more spectrums, such as satellite (e.g., sNB), 4G LTE (e.g., eNB), 5G (e.g., gNB), etc. For example, the gNB 910 can be an example implementation of the gNB of the mRAT 908. In example operation, the DPN circuitry 102 of the mRAT 908 can determine a location of the UE 902 based on the SRS data. In example operation, the DPN circuitry 102 of the mRAT 908 can provide and/or otherwise output the location of the UE 902 to the core network 912. In some examples, the DPN circuitry 102 of the mRAT 908 can process the SRS data and output the processed SRS data to the core network 912 to cause the DPN circuitry 102 of the core network 912 to determine a location of the UE 902 based on the processed (or unprocessed) SRS data.

FIG. 10 is an example non-terrestrial private network 1000 that can be instantiated utilizing the DPN circuitry 102 of FIGS. 1 and/or 2. The non-terrestrial private network 1000 includes an example UE 1002, an example satellite constellation 1004, and the DPN circuitry 102 of FIG. 1. A satellite (identified by space vehicle 7 (SV7)) in the satellite constellation 1004 is monitoring communications within an example geofenced area, cell, or zone 1006. For example, the DPN circuitry 102 can configure SV7 to instantiate and/or generate a private network cell, which is represented by the geofenced zone 1006 of FIG. 10. In example operation, the UE 1002 can communicate with SV7, which, in turn, can provide data from the UE 1002 to the DPN circuitry 102 via an sNB connection.

In the example of FIG. 10, example telemetry data transmitted to the DPN circuitry 102 from the example satellite constellation 1004 includes orbital ephemeral telemetry and/or SV health telemetry which can be used by the DPN circuitry 102 to ensure that the non-terrestrial private network 1000 continues to provide contact to the geofenced zone 1006. Additionally or alternatively, example telemetry data transmitted to the DPN circuitry 102 from the example satellite constellation 1004 includes SV ephemeris such as (1) SV orbital data (e.g., perigee, apogee, inclination, period, semi major access, etc.) and (2) SV telemetry data (e.g., uplink/downlink status, inter satellite link status, battery status, temperature status, processing status, speed, altitude sensor, velocity sensor, thruster fuel status, spot beam status, spot beam frequency status, on-board memory status, on-board network packet status (e.g., number of dropped packets, number of processed packets, number of malformed packets, number of retransmitted packets, etc.), etc.).

As illustrated in the examples of FIGS. 4-10, the DPN circuitry 102 facilitates private network coverage using TNs and/or NTNs (e.g., by establishing a TN coverage grid and/or NTN coverage grid). For example, the DPN circuitry 102 may be implemented as a self-contained network in a box that is optimized to support TN and NTN UE connections and provide the best possible location and positioning performance of UEs serviced by the DPN circuitry 102. In examples disclosed herein, information technology (IT) providers of an enterprise utilizing the DPN circuitry 102 can set one or more policies including UE limits (number of UEs, types of UEs, RAT, interference, noise, services, etc.) for each cell (e.g., each cell of a coverage grid) of a private network. Additionally or alternatively, in examples disclosed herein, an AMF of the DPN circuitry 102 can maintain tracking areas (TAs) for each cell (e.g., geographical area) of a private network. In some examples disclosed herein, an AMF of the DPN circuitry 102 informs an LMF of the DPN circuitry 102 which sets location request measurement periodicity for each UE within a cell of a private network. In additional or alternative examples disclosed herein, an AMF of the DPN circuitry 102 can maintain ephemeral location data of each UE based on location results of an LMF. In yet other examples disclosed herein, an AMF of the DPN circuitry 102 can determine if a UE will enter or exit a TA using resource coverage grids established based on capacity of each cell of a private network. In some examples disclosed herein, the DPN circuitry 102 can initiate 3GPP UE registration and deregistration procedures.

As described above, the hardware, software, and/or firmware that implements the DPN circuitry 102 may be included in a single housing or enclosure that is situated at a fixed location at an enterprise or other private entity and/or in a housing or enclosure that is mobile and may be carried around by one or more individuals. In some examples, the hardware that implements the DPN circuitry 102 may modular such that an enterprise utilizing the DPN circuitry 102 can swap out different modules based on the usage and/or priorities of the enterprise. For example, the modules of the DPN circuitry 102 may be implemented by hardware accelerators on integrated circuit cards (e.g., a network interface card, a location management function card, a unified data management function card, an authentication server function card, etc.). As described below, the DPN circuitry 102 implements one or more multi-spectrum dedicated private networks (e.g., a private network in a box, a standalone or discrete private network device, etc.) serving one or more UEs attached to fixed and/or moving RANs and/or vRANs with improved and/or otherwise optimized (e.g., precise) tracking of UE position.

Figure 11:
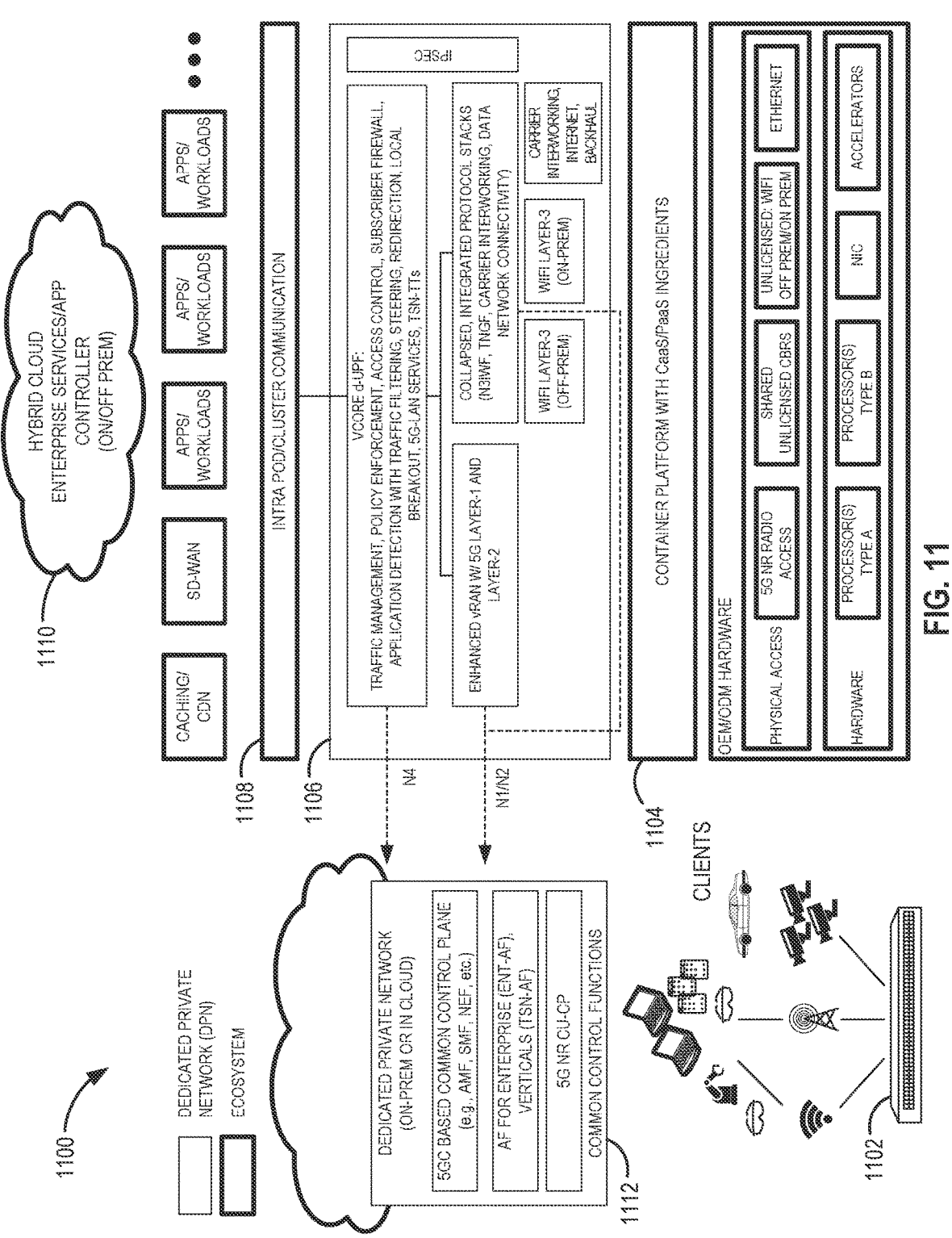
FIG. 11 is an example DPN stack associated with the DPN circuitry of FIGS. 1 and/or 2.

FIG. 11 is an example DPN stack 1100 associated with the DPN circuitry 102 of FIGS. 1 and/or 2. The DPN stack 1100 is implemented by example hardware 1102, which can at least one of execute or instantiate the DPN stack 1100. The hardware 1102 can be a processor platform as described herein. For example, the hardware 1102 includes OEM hardware and/or original design manufacture (ODM) hardware. The example OEM hardware and/or ODM hardware may be implemented by one or more types of processors, one or more network interface controllers (NICs), and/or one or more accelerators. In the example of FIG. 11, the hardware 1102 provides a variety of physical access. For example, the hardware 1102 provides 5G new radio-radio access, shared unlicensed citizens broadband radio service (CBRS) access, unlicensed Wi-Fi access (on-premises and/or off-premises), and/or Ethernet access.

In the illustrated example of FIG. 11, the hardware 1102 can at least one of execute or instantiate an example container platform 1104 to effectuate example applications 1106. In the example of FIG. 11, the container platform 1104 may be implemented by a containers-as-a-service (CaaS) and/or platform-as-a-service (PaaS). In the example of FIG. 11, the example applications 1106 include one or more virtual core (vCore d-UPF) applications, one or more enhanced virtual RAN (vRAN) applications with 5G layer 1 and/or 5G layer 2, one or more collapsed, integrated protocol stacks, and/or one or more Internet Protocol Security (IPSec) applications. Example vCore d-UPF applications include traffic management applications, policy enforcement applications, access control applications, subscriber firewall applications, application detection applications with traffic filtering, steering, redirection, local breakout, 5G-LAN services, and/or time sensitive networking translators (TSN-TTs). Example collapsed, integrated protocol stacks include one or more non-3GPP inter-working functions (N3IWFs), one or more trusted non-3GPP gateway functions (TNGFs), one or more carrier interworking functions, and/or one or more data network connectivity functions.

In the illustrated example of FIG. 11, the applications 1106 are in communication with an example intra pod and/or cluster 1108 associated with an example hybrid cloud 1110. In some examples, the applications 1106 are in communication with a caching and/or content delivery network (CDN) and/or a software-defined wide area network (SD- WAN). In the example of FIG. 11, the example hybrid cloud 1110 may execute and/or instantiate one or more enterprise services and/or one or more application controllers. In the example of FIG. 11, the applications 1106 of the illustrated example are executed and/or instantiated by an example dedicated private network 1112. In some examples, the dedicated private network 1112 can be implemented by the DPN circuitry 102 of FIG. 1.

Figure 12:
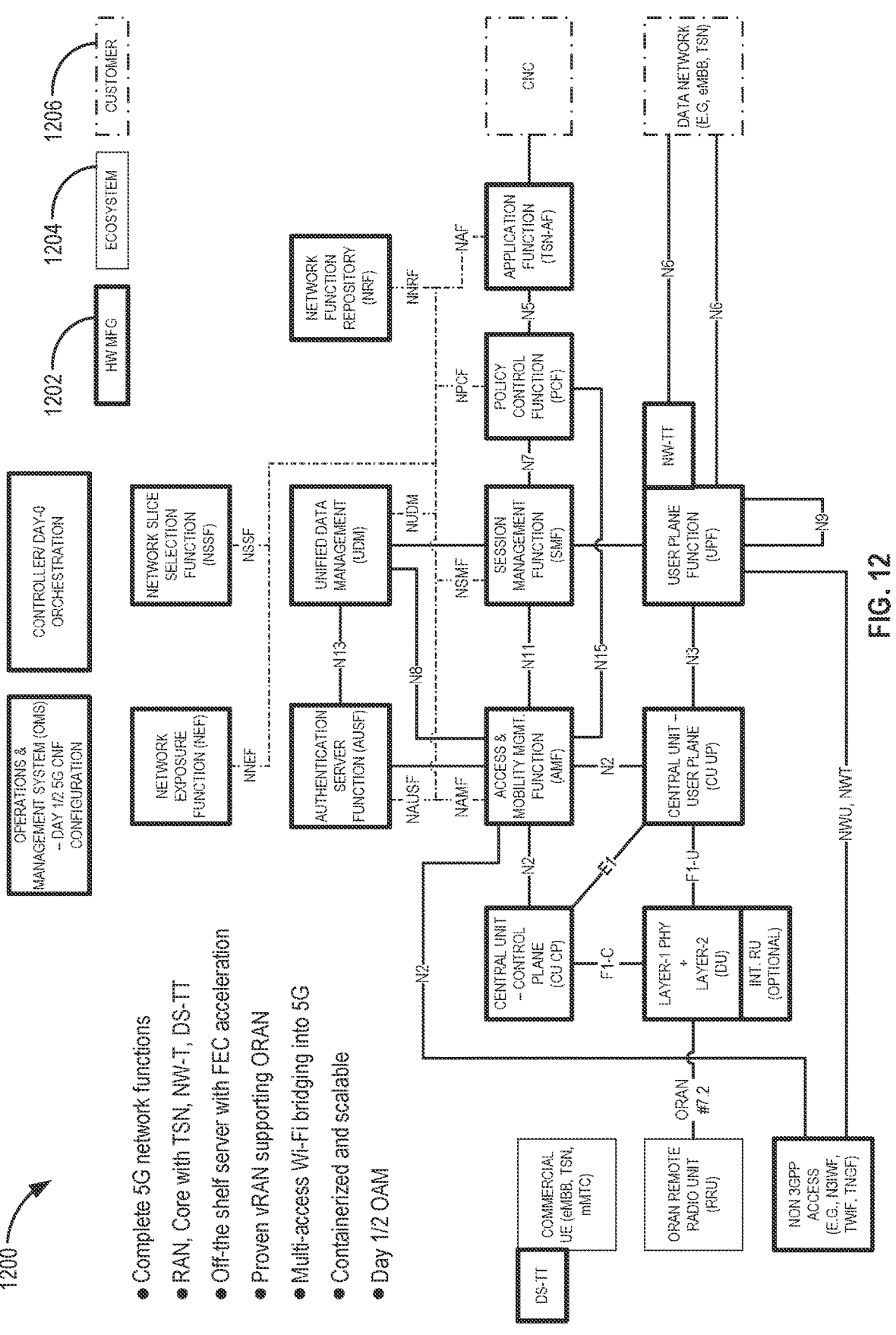
FIG. 12 is an example DPN architecture that can be instantiated utilizing the DPN circuitry of FIGS. 1 and/or 2.

FIG. 12 is an example DPN architecture 1200 that can be instantiated utilizing the DPN circuitry 102 of FIGS. 1 and/or 2. The DPN architecture 1200 includes first example functions and hardware 1202 implemented by a hardware manufacture, second example functions and hardware 1204 implemented by an ecosystem, and third example functions and hardware 1206 implemented by an end user such as a customer and/or enterprise. For example, the first functions and hardware 1202 can be executed and/or instantiated by the DPN circuitry 102 of FIG. 1. In the example of FIG. 12, functions of the first functions and hardware 1202 include one or more network exposure functions (NEFs), one or more network slice selection functions (NSSFs), one or more authentication server functions (AUSFs), one or more unified data management (UDM) functions, one or more network function repository functions (NRFs), one or more AMFs, one or more SMFs, one or more policy control functions (PCFs), and one or more application functions (e.g., one or more time sensitive networking application functions (TSN-AFs)).

Additionally, in the example of FIG. 12, the functions of the first functions and hardware 1202 include one or more central unit-control plane (CU CP) functions, one or more central unit-user plane (CU UP) functions, one or more UPFs (e.g., a network-side time sensitive networking translator (NW-TT) and/or a device-side time sensitive networking translator (DS-TT)), and/or one or more operations and management system (OMS) configuration functions (e.g., day 1 and/or day 2 5G configuration functions). In the example of FIG. 12, the one or more UPFs provide non-3GPP access (e.g., N3IWF, TWIF, TNGF, etc.). In some examples, the functions of the first functions and hardware 1202 include one or more controller and/or orchestration functions (e.g., day 0 orchestration functions). In the example of FIG. 12, hardware of the first functions and hardware 1202 includes layer 1 physical layer hardware and layer 2 DU hardware. For example, the layer 1 physical layer hardware and layer 2 DU hardware may include a radio unit.

In the illustrated example of FIG. 12, functions of the second functions and hardware 1204 include one or more commercial UE functions. For example, commercial UE functions include one or more enhanced mobile broadband (eMBB) functions, one or more time sensitive networking (TSN) functions, one or more massive machine type communication (mMTC) functions, among others. In the example of FIG. 12, hardware of the second functions and hardware 1204 includes O-RAN remote radio unit (RRU) hardware.

In the illustrated example of FIG. 12, the third functions and hardware 1206 include a centralized network configuration (CNC) and a data network. For example, the data network includes one or more eMBB functions, one or more TSN functions, among others. In some examples, the third functions and hardware 1206 include one or more controller and/or orchestration functions (e.g., day 0 orchestration functions). The first functions and hardware 1202, the second functions and hardware 1204, and the third functions and hardware 1206 are in communication with one(s) of each other as depicted in FIG. 12.

Figure 13:
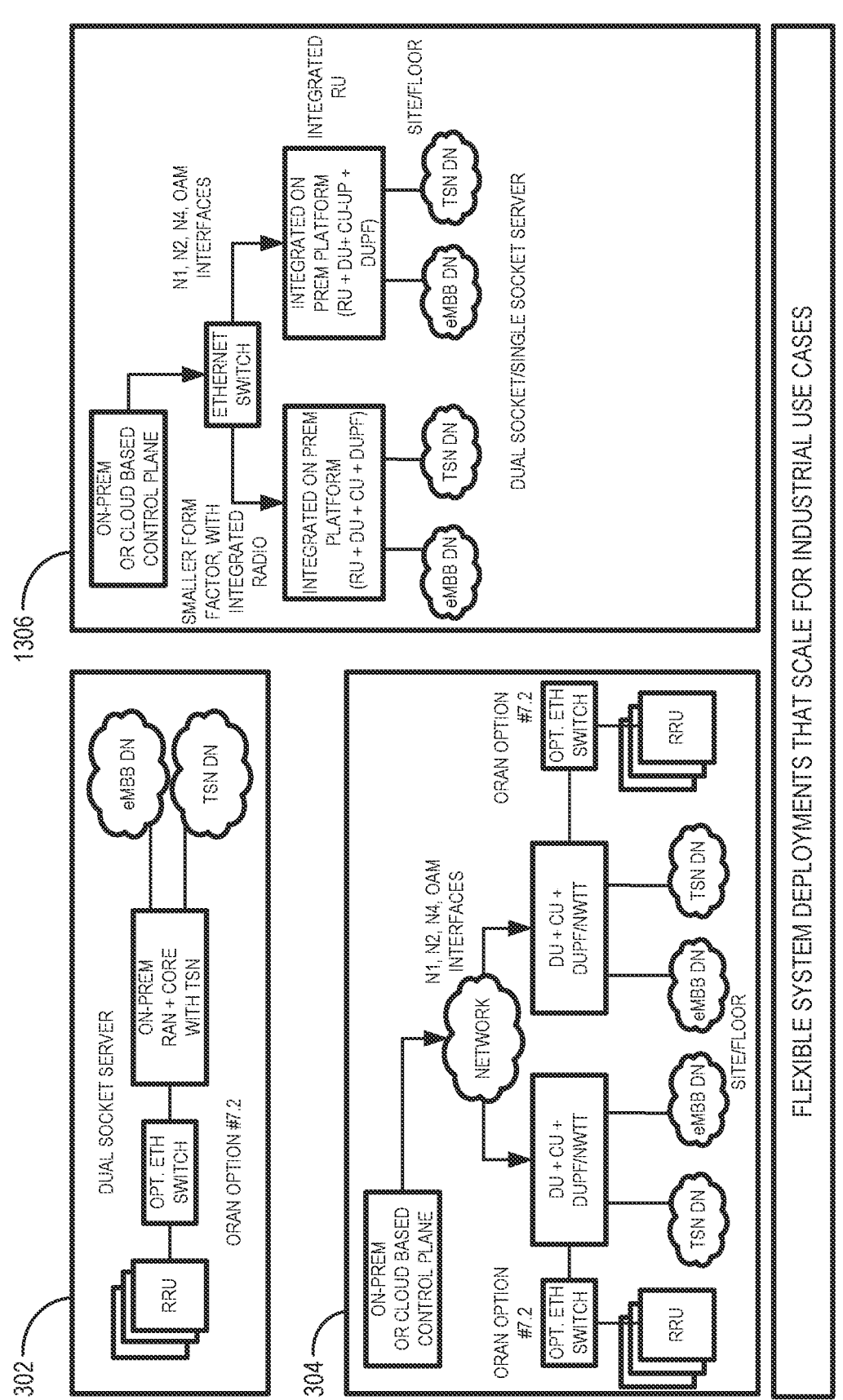
FIG. 13 depicts example platform configurations associated with the DPN circuitry of FIGS. 1 and/or 2.

FIG. 13 depicts example platform configurations 1302, 1304, 1306 including a first example configuration 1302, a second example configuration 1304, and a third example configuration 1306. Any other configurations are contemplated. By way of example, the first configuration 1302 includes a plurality of remote radio units (RRUs) in communication with an on-premises RAN server and core server via an optical Ethernet switch. For example, the RAN server and/or the core server can include and/or otherwise be implemented by the DPN circuitry 102 of FIG. 1. In the first example configuration 1302, the RAN server and/or the core server includes TSN functionality and is implemented as a dual socket server coupled to an eMBB DN and a TSN DN. A possible advantage of the DPN circuitry 102 is that the DPN circuitry 102 can achieve flexible system deployments that scale for a variety of use cases such as industrial use cases.

Figure 14:
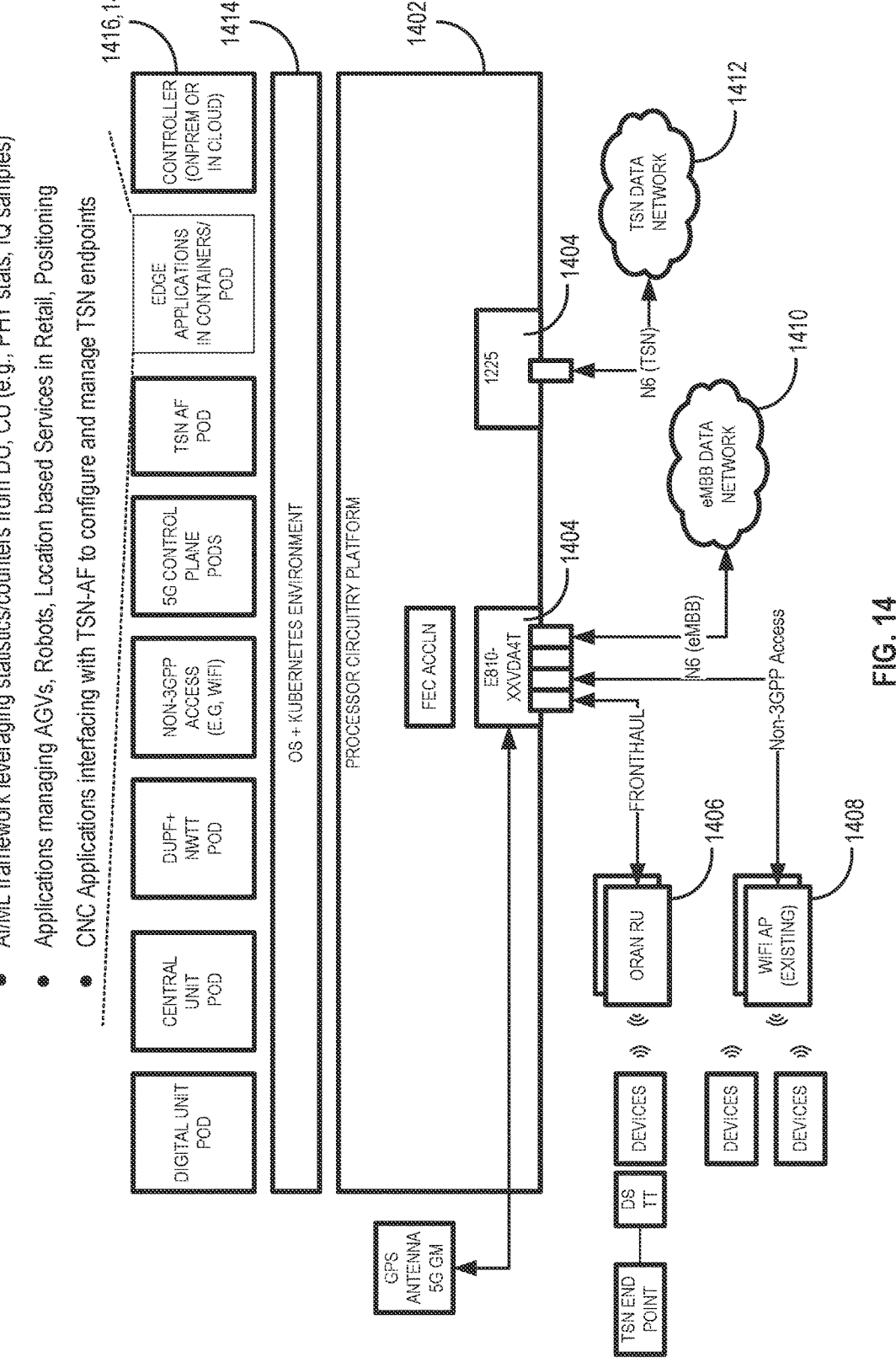
FIG. 14 is an example DPN edge architecture that can be instantiated utilizing the DPN circuitry of FIGS. 1 and/or 2.

FIG. 14 is an example DPN edge architecture 1400 that can be instantiated utilizing the DPN circuitry 102 of FIGS. 1 and/or 2. The DPN edge architecture 1400 includes an example processor circuitry platform 1402, which includes one or more different types of example interface circuitry 1404. The processor circuitry platform 1402 can include and/or otherwise be implemented by the DPN circuitry 102 of FIG. 1. A possible advantage of the processor platform 1402 is that the processor circuitry platform 1402 can be in communication with a plurality of different types of communication devices, protocols, etc., such as O-RAN RUs 1406, Wi-Fi APs 1408, an enhanced mobile broadband (eMBB) data network 1410, a time sensitive networking (TSN) data network 1412, etc. In the example of FIG. 14, the processor circuitry platform 1402 can execute and/or instantiate an example operating system (OS) and/or container environment 1414. The OS and/or container environment 1414 can execute and/or instantiate one or more example applications 1416, services 1418, etc., to effectuate examples described herein.

Figure 15:
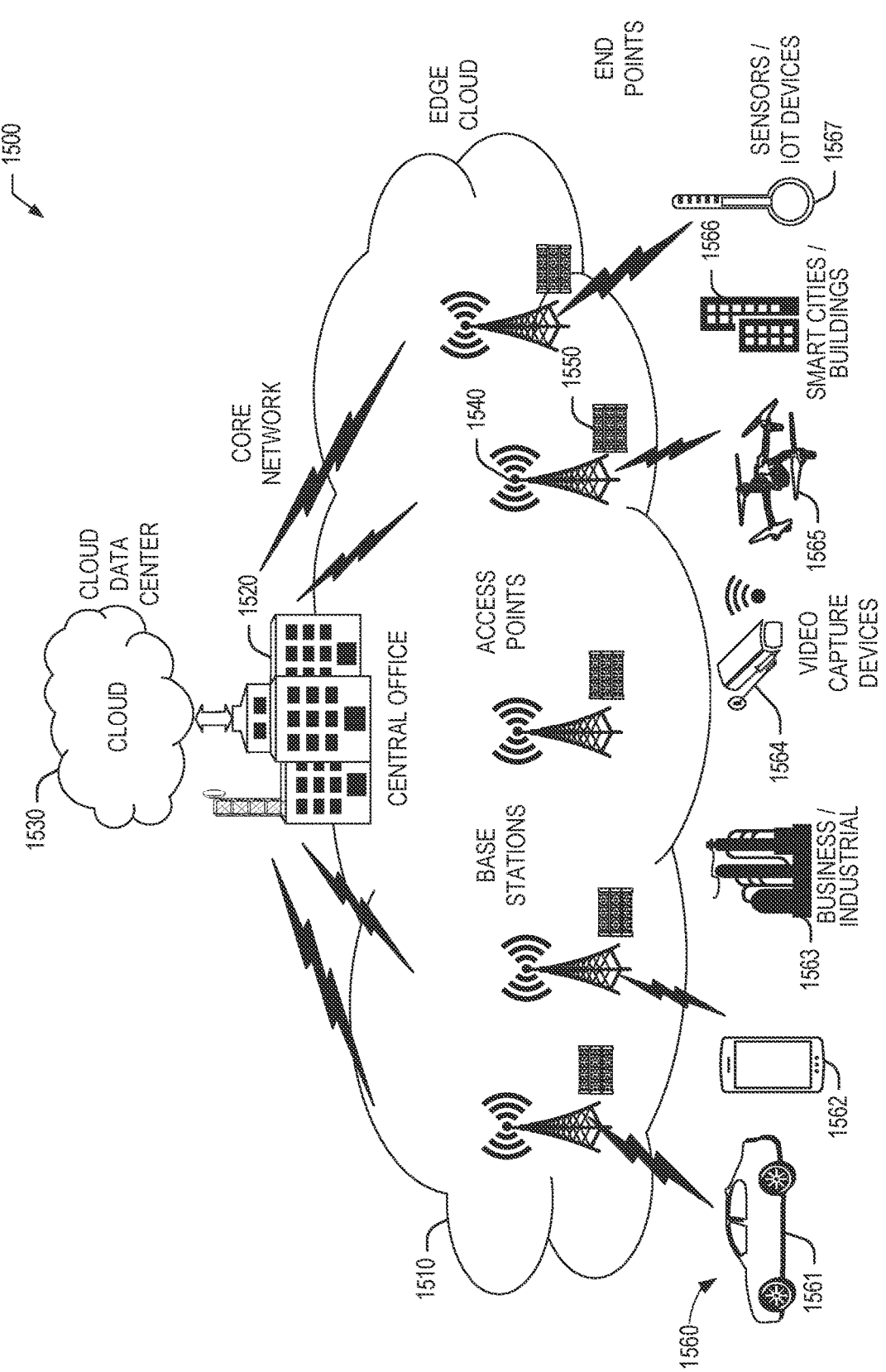
FIG. 15 illustrates an overview of an example edge cloud configuration for edge computing that may implement the examples disclosed herein.

FIG. 15 is a block diagram 1500 showing an overview of a configuration for edge computing, which includes a layer of processing referred to in many of the following examples as an "edge cloud". As shown, the edge cloud 1510 is co-located at an edge location, such as an access point or base station 1540, a local processing hub 1550, or a central office 1520, and thus may include multiple entities, devices, and equipment instances. The edge cloud 1510 is located much closer to the endpoint (consumer and producer) data sources 1560 (e.g., autonomous vehicles 1561, user equipment 1562, business and industrial equipment 1563, video capture devices 1564, drones 1565, smart cities and building devices 1566, sensors and Internet-of-Things (IoT) devices 1567, etc.) than the cloud data center 1530. Compute, memory, and storage resources that are offered at the edges in the edge cloud 1510 are critical to providing ultra-low latency response times for services and functions used by the endpoint data sources 1560 as well as reduce network backhaul traffic from the edge cloud 1510 toward cloud data center 1530 thus improving energy consumption and overall network usages among other benefits.

In some examples, the central office 1520, the cloud data center 1530, and/or portion(s) thereof, may implement one or more location engines that locate and/or otherwise identify positions of devices of the endpoint (consumer and producer) data sources 1560 (e.g., autonomous vehicles 1561, user equipment 1562, business and industrial equipment 1563, video capture devices 1564, drones 1565, smart cities and building devices 1566, sensors and Internet-of-Things (IoT) devices 1567, etc.). In some such examples, the central office 1520, the cloud data center 1530, and/or portion(s) thereof, may implement one or more location engines to execute location detection operations with improved accuracy.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge," "close edge," "local edge," "middle edge," or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the network architecture of FIG. 15, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the OSI layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 1510, which provide coordination from client and distributed computing devices.

Figure 16:
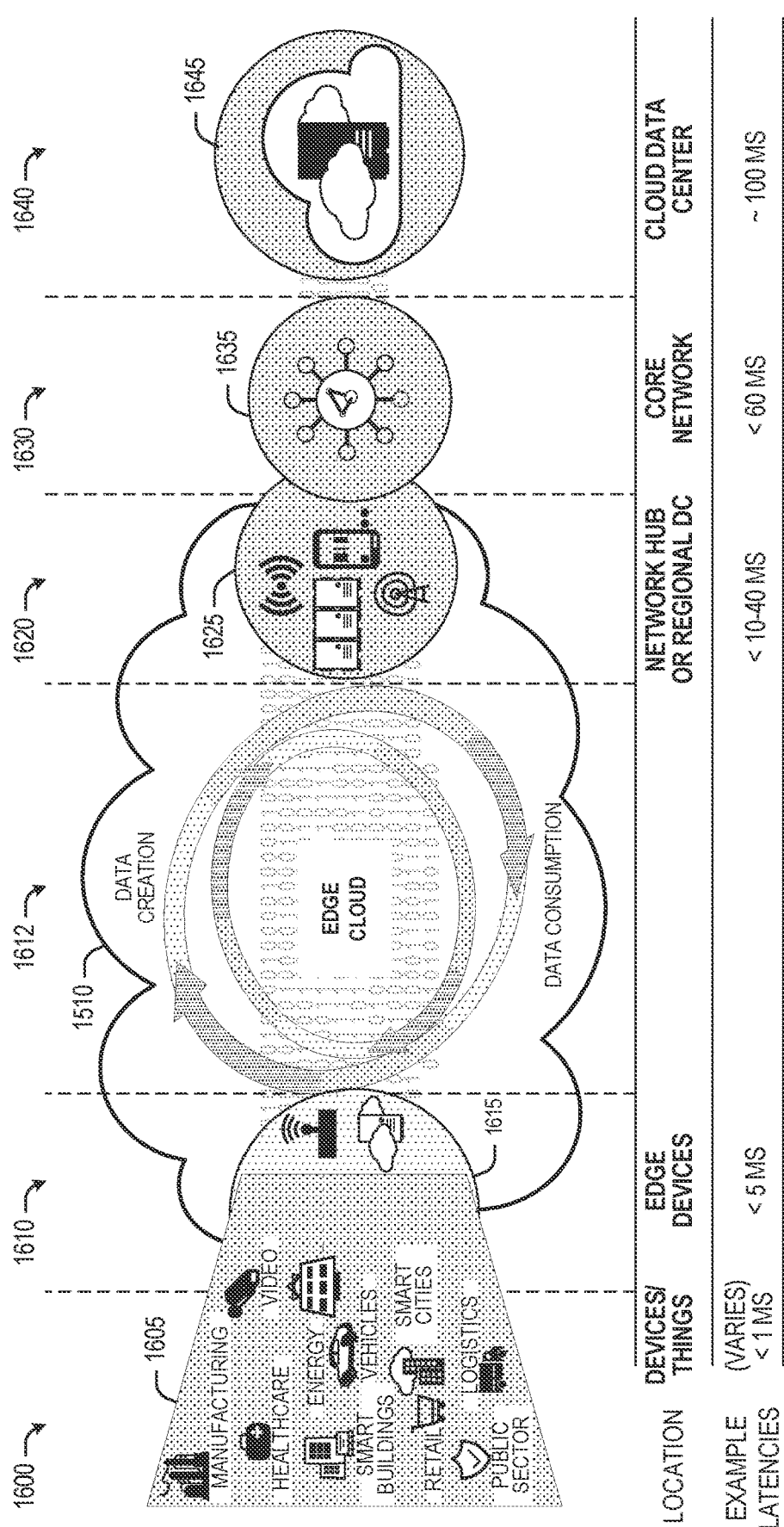
FIG. 16 illustrates operational layers among example endpoints, an example edge cloud, and example cloud computing environments that may implement the examples disclosed herein.

FIG. 16 illustrates operational layers among endpoints, an edge cloud, and cloud computing environments. Specifically, FIG. 16 depicts examples of computational use cases 1605, utilizing the edge cloud 1510 of FIG. 15 among multiple illustrative layers of network computing. The layers begin at an endpoint (devices and things) layer 1600, which accesses the edge cloud 1510 to conduct data creation, analysis, and data consumption activities. The edge cloud 1510 may span multiple network layers, such as an edge devices layer 1610 having gateways, on-premise servers, or network equipment (nodes 1615) located in physically proximate edge systems; a network access layer 1620, encompassing base stations, radio processing units, network hubs, regional data centers (DC), or local network equipment (equipment 1625); and any equipment, devices, or nodes located therebetween (in layer 1612, not illustrated in detail). The network communications within the edge cloud 1510 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1600, under 5 ms at the edge devices layer 1610, to even between 10 to 40 ms when communicating with nodes at the network access layer 1620. Beyond the edge cloud 1510 are core network 1630 and cloud data center 1632 layers, each with increasing latency (e.g., between 50-60 ms at the core network layer 1630, to 100 or more ms at the cloud data center layer 1640). As a result, operations at a core network data center 1635 or a cloud data center 1645, with latencies of at least 50 to 100 ms or more, will not be able to accomplish many time-critical functions of the use cases 1605. Each of these latency values are provided for purposes of illustration and contrast; it will be understood that the use of other access network mediums and technologies may further reduce the latencies. In some examples, respective portions of the network may be categorized as "close edge," "local edge," "near edge," "middle edge," or "far edge" layers, relative to a network source and destination. For instance, from the perspective of the core network data center 1635 or a cloud data center 1645, a central office or content data network may be considered as being located within a "near edge" layer ("near" to the cloud, having high latency values when communicating with the devices and endpoints of the use cases 1605), whereas an access point, base station, on-premise server, or network gateway may be considered as located within a "far edge" layer ("far" from the cloud, having low latency values when communicating with the devices and endpoints of the use cases 1605). It will be understood that other categorizations of a particular network layer as constituting a "close," "local," "near," "middle," or "far" edge may be based on latency, distance, number of network hops, or other measurable characteristics, as measured from a source in any of the network layers 1600-1640.

The various use cases 1605 may access resources under usage pressure from incoming streams, due to multiple services utilizing the edge cloud. For example, location detection of devices associated with such incoming streams of the various use cases 1605 is desired and may be achieved with example location engines as described herein. To achieve results with low latency, the services executed within the edge cloud 1510 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1510 may provide the ability to serve and respond to multiple applications of the use cases 1605 (e.g., object tracking, location detection, video surveillance, connected cars, etc.) in real-time or near real-time, and meet ultra-low latency requirements for these multiple applications. These possible advantages enable a whole new class of applications (VNFs), Function-as-a-Service (FaaS), Edge-as-a-Service (EaaS), standard processes, etc.), which cannot leverage conventional cloud computing due to latency or other limitations.

However, with the possible advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1510 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1510 (network layers 1610-1630), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco," or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1510.

As such, the edge cloud 1510 is formed from network components and functional features operated by and within edge gateway nodes, edge aggregation nodes, or other edge compute nodes among network layers 1610-1630. The edge cloud 1510 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1510 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1510 may be servers, multi-tenant servers, appliance computing devices, and/or any other type of computing devices. For example, the edge cloud 1510 may include an appliance computing device that is a self-contained electronic device including a housing, a chassis, a case or a shell. In some examples, the edge cloud 1510 may include an appliance to be operated in harsh environmental conditions (e.g., extreme heat or cold ambient temperatures, strong wind conditions, wet or frozen environments, and the like). In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures), and/or enable submergibility. Example housings may include power circuitry to provide power for stationary and/or portable implementations, such as alternating current (AC) power inputs, direct current (DC) power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB)), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 25, 26, 27, and/or 28 illustrate example hardware for implementing an appliance computing device. The edge cloud 1510 may also include one or more servers and/or one or more multi-tenant servers. Such a server may include an operating system and a virtual computing environment. A virtual computing environment may include a hypervisor managing (spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 17:
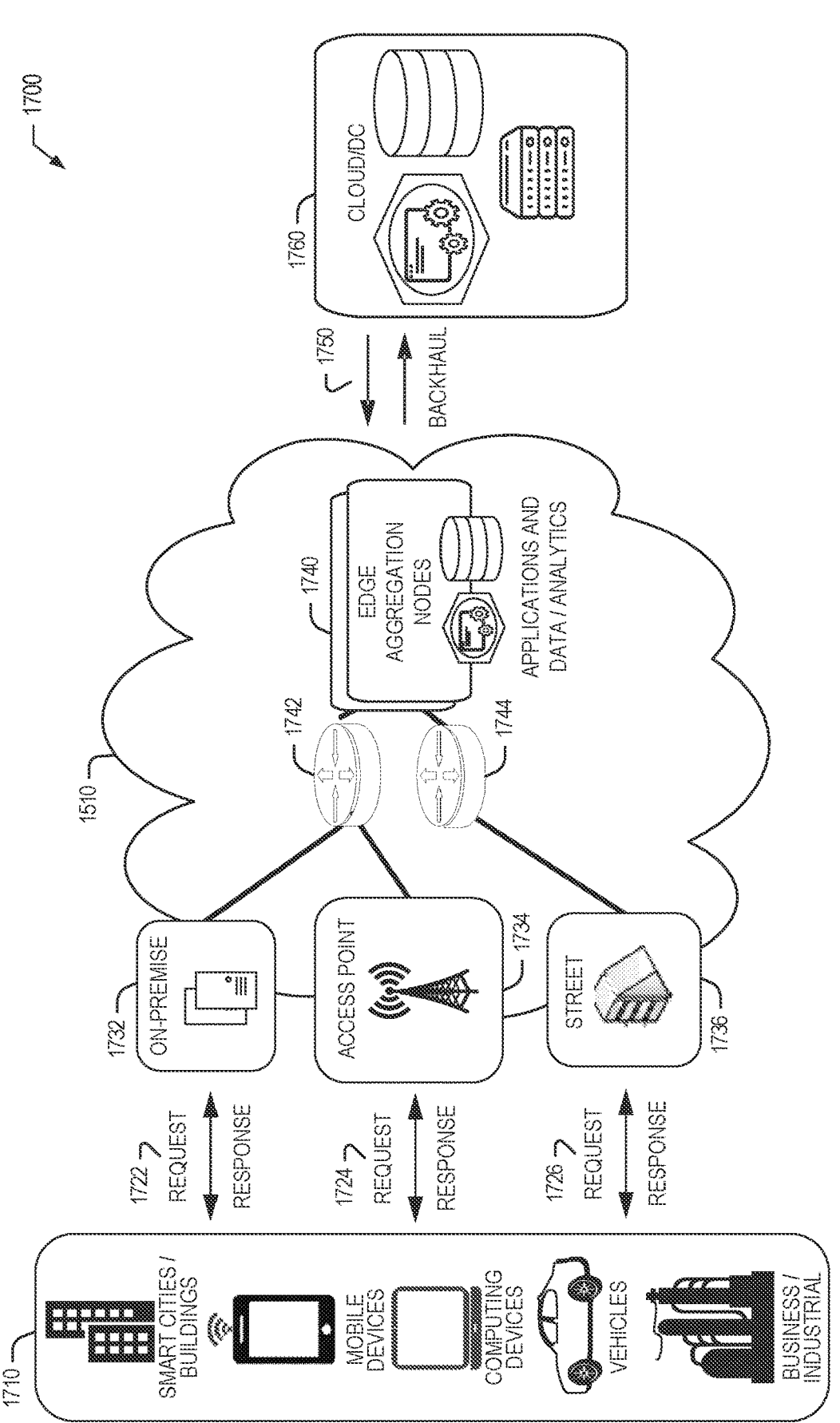
FIG. 17 illustrates an example approach for networking and services in an edge computing system that may implement the examples disclosed herein.

In FIG. 17, various client endpoints 1710 (in the form of mobile devices, computers, autonomous vehicles, business computing equipment, industrial processing equipment) exchange requests and responses that are specific to the type of endpoint network aggregation. For instance, client endpoints 1710 may obtain network access via a wired broadband network, by exchanging requests and responses 1722 through an on-premise network system 1732. Some client endpoints 1710, such as mobile computing devices, may obtain network access via a wireless broadband network, by exchanging requests and responses 1724 through an access point (e.g., cellular network tower) 1734. Some client endpoints 1710, such as autonomous vehicles may obtain network access for requests and responses 1726 via a wireless vehicular network through a street-located network system 1736. However, regardless of the type of network access, the TSP may deploy aggregation points 1742, 1744 within the edge cloud 1510 of FIG. 15 to aggregate traffic and requests. Thus, within the edge cloud 1510, the TSP may deploy various compute and storage resources, such as at edge aggregation nodes 1740, to provide requested content. The edge aggregation nodes 1740 and other systems of the edge cloud 1510 are connected to a cloud or data center (DC) 1760, which uses a backhaul network 1750 to fulfill higher-latency requests from a cloud/data center for websites, applications, database servers, etc. Additional or consolidated instances of the edge aggregation nodes 1740 and the aggregation points 1742, 1744, including those deployed on a single server framework, may also be present within the edge cloud 1510 or other areas of the TSP infrastructure. A possible advantage of example location engines described herein is that example location engines as described herein may detect and/or otherwise determine locations of the client endpoints 1710 with improved performance and accuracy and reduced latency.

Figure 18:
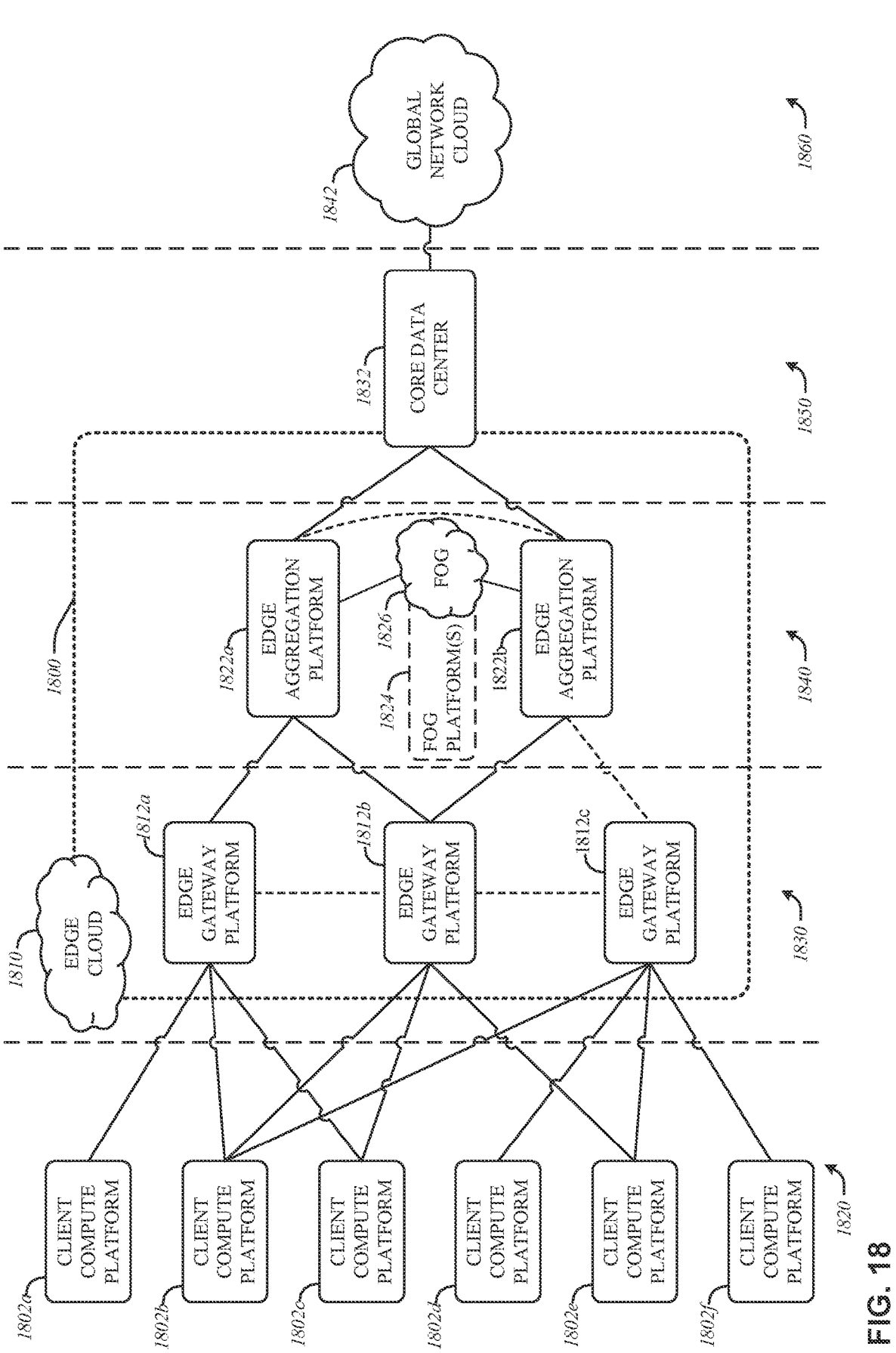
FIG. 18 depicts an example edge computing system for providing edge services and applications to multi-stakeholder entities, as distributed among one or more client compute platforms, one or more edge gateway platforms, one or more edge aggregation platforms, one or more core data centers, and a global network cloud, as distributed across layers of the edge computing system.

FIG. 18 depicts an example edge computing system 1800 for providing edge services and applications to multi-stakeholder entities, as distributed among one or more client compute platforms 1802, one or more edge gateway platforms 1812, one or more edge aggregation platforms 1822, one or more core data centers 1832, and a global network cloud 1842, as distributed across layers of the edge computing system 1800. The implementation of the edge computing system 1800 may be provided at or on behalf of a telecommunication service provider ("telco," or "TSP"), internet-of-things service provider, cloud service provider (CSP), enterprise entity, or any other number of entities. Various implementations and configurations of the edge computing system 1800 may be provided dynamically, such as when orchestrated to meet service objectives.

Individual platforms or devices of the edge computing system 1800 are located at a particular layer corresponding to layers 1820, 1830, 1840, 1850, and 1860. For example, the client compute platforms 1802a, 1802b, 1802c, 1802d, 1802e, 1802f are located at an endpoint layer 1820, while the edge gateway platforms 1812a, 1812b, 1812c are located at an edge devices layer 1830 (local level) of the edge computing system 1800. Additionally, the edge aggregation platforms 1822a, 1822b (and/or fog platform(s) 1824, if arranged or operated with or among a fog networking configuration 1826) are located at a network access layer 1840 (an intermediate level). Fog computing (or "fogging") generally refers to extensions of cloud computing to the edge of an enterprise's network or to the ability to manage transactions across the cloud/edge landscape, typically in a coordinated distributed or multi-node network. Some forms of fog computing provide the deployment of compute, storage, and networking services between end devices and cloud computing data centers, on behalf of the cloud computing locations. Some forms of fog computing also provide the ability to manage the workload/workflow level services, in terms of the overall transaction, by pushing certain workloads to the edge or to the cloud based on the ability to fulfill the overall service level agreement.

Fog computing in many scenarios provides a decentralized architecture and serves as an extension to cloud computing by collaborating with one or more edge node devices, providing the subsequent amount of localized control, configuration and management, and much more for end devices. Furthermore, fog computing provides the ability for edge resources to identify similar resources and collaborate to create an edge-local cloud which can be used solely or in conjunction with cloud computing to complete computing, storage or connectivity related services. Fog computing may also allow the cloud-based services to expand their reach to the edge of a network of devices to offer local and quicker accessibility to edge devices. Thus, some forms of fog computing provide operations that are consistent with edge computing as discussed herein; the edge computing aspects discussed herein are also applicable to fog networks, fogging, and fog configurations. Further, aspects of the edge computing systems discussed herein may be configured as a fog, or aspects of a fog may be integrated into an edge computing architecture.

The core data center 1832 is located at a core network layer 1850 (a regional or geographically central level), while the global network cloud 1842 is located at a cloud data center layer 1860 (a national or world-wide layer). The use of "core" is provided as a term for a centralized network location-deeper in the network-which is accessible by multiple edge platforms or components; however, a "core" does not necessarily designate the "center" or the deepest location of the network. Accordingly, the core data center 1832 may be located within, at, or near the edge cloud 1810. Although an illustrative number of client compute platforms 1802a, 1802b, 1802c, 1802d, 1802e, 1802f; edge gateway platforms 1812a, 1812b, 1812c; edge aggregation platforms 1822a, 1822b; edge core data centers 1832; and global network clouds 1842 are shown in FIG. 18, it should be appreciated that the edge computing system 1800 may include any number of devices and/or systems at each layer. Devices at any layer can be configured as peer nodes and/or peer platforms to each other and, accordingly, act in a collaborative manner to meet service objectives. For example, in additional or alternative examples, the edge gateway platforms 1812a, 1812b, 1812c can be configured as an edge of edges such that the edge gateway platforms 1812a, 1812b, 1812c communicate via peer to peer connections. In some examples, the edge aggregation platforms 1822a, 1822b and/or the fog platform(s) 1824 can be configured as an edge of edges such that the edge aggregation platforms 1822a, 1822b and/or the fog platform(s) communicate via peer to peer connections. Additionally, as shown in FIG. 18, the number of components of respective layers 1820, 1830, 1840, 1850, and 1860 generally increases at each lower level (e.g., when moving closer to endpoints (e.g., client compute platforms 1802a, 1802b, 1802c, 1802d, 1802e, 1802f). As such, one edge gateway platforms 1812a, 1812b, 1812c may service multiple ones of the client compute platforms 1802a, 1802b, 1802c, 1802d, 1802e, 1802f, and one edge aggregation platform (e.g., one of the edge aggregation platforms 1822a, 1822b) may service multiple ones of the edge gateway platforms 1812a, 1812b, 1812c.

Consistent with the examples provided herein, a client compute platform (e.g., one of the client compute platforms 1802a, 1802b, 1802c, 1802d, 1802e, 1802f) may be implemented as any type of endpoint component, device, appliance, or other thing capable of communicating as a producer or consumer of data. For example, a client compute platform can include a mobile phone, a laptop computer, a desktop computer, a processor platform in an autonomous vehicle, etc. In additional or alternative examples, a client compute platform can include a camera, a sensor, etc. Further, the label "platform," "node," and/or "device" as used in the edge computing system 1800 does not necessarily mean that such platform, node, and/or device operates in a client or slave role; rather, any of the platforms, nodes, and/or devices in the edge computing system 1800 refer to individual entities, platforms, nodes, devices, and/or subsystems which include discrete and/or connected hardware and/or software configurations to facilitate and/or use the edge cloud 1810. A possible advantage of example location engines described herein is that example location engines as described herein may detect and/or otherwise determine locations of the client compute platforms 1802a, 1802b, 1802c, 1802d, 1802e, 1802f with improved performance and accuracy as well as with reduced latency.

As such, the edge cloud 1810 is formed from network components and functional features operated by and within the edge gateway platforms 1812a, 1812b, 1812c and the edge aggregation platforms 1822a, 1822b of layers 1830, 1840, respectively. The edge cloud 1810 may be implemented as any type of network that provides edge computing and/or storage resources which are proximately located to radio access network (RAN) capable endpoint devices (e.g., mobile computing devices, IoT devices, smart devices, etc.), which are shown in FIG. 18 as the client compute platforms 1802a, 1802b, 1802c, 1802d, 1802e, 1802f. In other words, the edge cloud 1810 may be envisioned as an "edge" which connects the endpoint devices and traditional network access points that serves as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

In some examples, the edge cloud 1810 may form a portion of, or otherwise provide, an ingress point into or across a fog networking configuration 1826 (e.g., a network of fog platform(s) 1824, not shown in detail), which may be implemented as a system-level horizontal and distributed architecture that distributes resources and services to perform a specific function. For instance, a coordinated and distributed network of fog platform(s) 1824 may perform computing, storage, control, or networking aspects in the context of an IoT system arrangement. Other networked, aggregated, and distributed functions may exist in the edge cloud 1810 between the core data center 1832 and the client endpoints (e.g., client compute platforms 1802a, 1802b, 1802c, 1802d, 1802e, 1802f). Some of these are discussed in the following sections in the context of network functions or service virtualization, including the use of virtual edges and virtual services which are orchestrated for multiple tenants.

As discussed in more detail below, the edge gateway platforms 1812a, 1812b, 1812c and the edge aggregation platforms 1822a, 1822b cooperate to provide various edge services and security to the client compute platforms 1802a, 1802*b*, 1802*c*, 1802*d*, 1802*e*, 1802*f*. Furthermore, because a client compute platforms (e.g., one of the client compute platforms 1802*a*, 1802*b*, 1802*c*, 1802*d*, 1802*e*, 18020 may be stationary or mobile, a respective edge gateway platform 1812*a*, 1812*b*, 1812*c* may cooperate with other edge gateway platforms to propagate presently provided edge services, relevant service data, and security as the corresponding client compute platforms 1802*a*, 1802*b*, 1802*c*, 1802*d*, 1802*e*, 1802*f* moves about a region. To do so, the edge gateway platforms 1812*a*, 1812*b*, 1812*c* and/or edge aggregation platforms 1822*a*, 1822*b* may support multiple tenancy and multiple tenant configurations, in which services from (or hosted for) multiple service providers, owners, and multiple consumers may be supported and coordinated across a single or multiple compute devices.

In examples disclosed herein, edge platforms in the edge computing system 1800 includes meta-orchestration functionality. For example, edge platforms at the far-edge (e.g., edge platforms closer to edge users, the edge devices layer 1830, etc.) can reduce the performance or power consumption of orchestration tasks associated with far-edge platforms so that the execution of orchestration components at far-edge platforms consumes a small fraction of the power and performance available at far-edge platforms.

The orchestrators at various far-edge platforms participate in an end-to-end orchestration architecture. Examples disclosed herein anticipate that the comprehensive operating software framework (such as, open network automation platform (ONAP) or similar platform) will be expanded, or options created within it, so that examples disclosed herein can be compatible with those frameworks. For example, orchestrators at edge platforms implementing examples disclosed herein can interface with ONAP orchestration flows and facilitate edge platform orchestration and telemetry activities. Orchestrators implementing examples disclosed herein act to regulate the orchestration and telemetry activities that are performed at edge platforms, including increasing or decreasing the power and/or resources expended by the local orchestration and telemetry components, delegating orchestration and telemetry processes to a remote computer and/or retrieving orchestration and telemetry processes from the remote computer when power and/or resources are available.

The remote devices described above are situated at alternative locations with respect to those edge platforms that are offloading telemetry and orchestration processes. For example, the remote devices described above can be situated, by contrast, at a near-edge platforms (e.g., the network access layer 1840, the core network layer 1850, a central office, a mini-datacenter, etc.). By offloading telemetry and/ or orchestration processes at a near edge platforms, an orchestrator at a near-edge platform is assured of (comparatively) stable power supply, and sufficient computational resources to facilitate execution of telemetry and/or orchestration processes. An orchestrator (e.g., operating according to a global loop) at a near-edge platform can take delegated telemetry and/or orchestration processes from an orchestrator (e.g., operating according to a local loop) at a far-edge platform. For example, if an orchestrator at a near-edge platform takes delegated telemetry and/or orchestration processes, then at some later time, the orchestrator at the near-edge platform can return the delegated telemetry and/or orchestration processes to an orchestrator at a far-edge platform as conditions change at the far-edge platform (e.g., as power and computational resources at a far-edge platform satisfy a threshold level, as higher levels of power and/or computational resources become available at a far-edge platform, etc.).

A variety of security approaches may be utilized within the architecture of the edge cloud 1810. In a multi-stakeholder environment, there can be multiple loadable security modules (LSMs) used to provision policies that enforce the stakeholder's interests including those of tenants. In some examples, other operators, service providers, etc. may have security interests that compete with the tenant's interests. For example, tenants may prefer to receive full services (e.g., provided by an edge platform) for free while service providers would like to get full payment for performing little work or incurring little costs. Enforcement point environments could support multiple LSMs that apply the combination of loaded LSM policies (e.g., where the most constrained effective policy is applied, such as where if any of A, B or C stakeholders restricts access then access is restricted). Within the edge cloud 1810, each edge entity can provision LSMs that enforce the Edge entity interests. The cloud entity can provision LSMs that enforce the cloud entity interests. Likewise, the various fog and IoT network entities can provision LSMs that enforce the fog entity's interests.

In these examples, services may be considered from the perspective of a transaction, performed against a set of contracts or ingredients, whether considered at an ingredient level or a human-perceivable level. Thus, a user who has a service agreement with a service provider, expects the service to be delivered under terms of the SLA. Although not discussed in detail, the use of the edge computing techniques discussed herein may play roles during the negotiation of the agreement and the measurement of the fulfillment of the agreement (e.g., to identify what elements are required by the system to conduct a service, how the system responds to service conditions and changes, and the like).

Additionally, in examples disclosed herein, edge platforms and/or orchestration components thereof may consider several factors when orchestrating services and/or applications in an edge environment. These factors can include next-generation central office smart network functions virtualization and service management, improving performance per watt at an edge platform and/or of orchestration components to overcome the limitation of power at edge platforms, reducing power consumption of orchestration components and/or an edge platform, improving hardware utilization to increase management and orchestration efficiency, providing physical and/or end to end security, providing individual tenant quality of service and/or service level agreement satisfaction, improving network equipment-building system compliance level for each use case and tenant business model, pooling acceleration components, and billing and metering policies to improve an edge environment.

A "service" is a broad term often applied to various contexts, but in general, it refers to a relationship between two entities where one entity offers and performs work for the benefit of another. However, the services delivered from one entity to another must be performed with certain guidelines, which ensure trust between the entities and manage the transaction according to the contract terms and conditions set forth at the beginning, during, and end of the service.

An example relationship among services for use in an edge computing system is described below. In scenarios of edge computing, there are several services, and transaction layers in operation and dependent on each other—these services create a "service chain." At the lowest level, ingredients compose systems. These systems and/or resources communicate and collaborate with each other in order to provide a multitude of services to each other as well as other permanent or transient entities around them. In turn, these entities may provide human-consumable services. With this hierarchy, services offered at each tier must be transactionally connected to ensure that the individual component (or sub-entity) providing a service adheres to the contractually agreed to objectives and specifications. Deviations at each layer could result in overall impact to the entire service chain.

One type of service that may be offered in an edge environment hierarchy is Silicon Level Services. For instance, Software Defined Silicon (SDSi)-type hardware provides the ability to ensure low level adherence to transactions, through the ability to intra-scale, manage and assure the delivery of operational service level agreements. Use of SDSi and similar hardware controls provide the capability to associate features and resources within a system to a specific tenant and manage the individual title (rights) to those resources. Use of such features is among one way to dynamically "bring" the compute resources to the workload.

For example, an operational level agreement and/or service level agreement could define "transactional throughput" or "timeliness"—in case of SDSi, the system and/or resource can sign up to guarantee specific service level specifications (SLS) and objectives (SLO) of a service level agreement (SLA). For example, SLOs can correspond to particular key performance indicators (KPIs) (e.g., frames per second, floating point operations per second, latency goals, etc.) of an application (e.g., service, workload, etc.) and an SLA can correspond to a platform level agreement to satisfy a particular SLO (e.g., one gigabyte of memory for 10 frames per second). SDSi hardware also provides the ability for the infrastructure and resource owner to empower the silicon component (e.g., components of a composed system that produce metric telemetry) to access and manage (add/remove) product features and freely scale hardware capabilities and utilization up and down. Furthermore, it provides the ability to provide deterministic feature assignments on a per-tenant basis. It also provides the capability to tie deterministic orchestration and service management to the dynamic (or subscription based) activation of features without the need to interrupt running services, client operations or by resetting or rebooting the system.

At the lowest layer, SDSi can provide services and guarantees to systems to ensure active adherence to contractually agreed-to service level specifications that a single resource has to provide within the system. Additionally, SDSi provides the ability to manage the contractual rights (title), usage and associated financials of one or more tenants on a per component, or even silicon level feature (e.g., stockkeeping unit (SKU) features). Silicon level features may be associated with compute, storage or network capabilities, performance, determinism or even features for security, encryption, acceleration, etc. These capabilities ensure not only that the tenant can achieve a specific service level agreement, but also assist with management and data collection, and assure the transaction and the contractual agreement at the lowest manageable component level.

At a higher layer in the services hierarchy, Resource Level Services, includes systems and/or resources which provide (in complete or through composition) the ability to meet workload demands by either acquiring and enabling system level features via SDSi, or through the composition of individually addressable resources (compute, storage and network). At yet a higher layer of the services hierarchy, Workflow Level Services, is horizontal, since service-chains may have workflow level requirements. Workflows describe dependencies between workloads in order to deliver specific service level objectives and requirements to the end-to-end service. These services may include features and functions like high-availability, redundancy, recovery, fault tolerance or load-leveling (we can include lots more in this). Workflow services define dependencies and relationships between resources and systems, describe requirements on associated networks and storage, as well as describe transaction level requirements and associated contracts in order to assure the end-to-end service. Workflow Level Services are usually measured in Service Level Objectives and have mandatory and expected service requirements.

At yet a higher layer of the services hierarchy, Business Functional Services (BFS) are operable, and these services are the different elements of the service which have relationships to each other and provide specific functions for the customer. In the case of Edge computing and within the example of Autonomous Driving, business functions may be composing the service, for instance, of a "timely arrival to an event"—this service would require several business functions to work together and in concert to achieve the goal of the user entity: GPS guidance, RSU (Road Side Unit) awareness of local traffic conditions, Payment history of user entity, Authorization of user entity of resource(s), etc. Furthermore, as these BFS(s) provide services to multiple entities, each BFS manages its own SLA and is aware of its ability to deal with the demand on its own resources (Workload and Workflow). As requirements and demand increases, it communicates the service change requirements to Workflow and resource level service entities, so they can, in-turn provide insights to their ability to fulfill. This step assists the overall transaction and service delivery to the next layer.

At the highest layer of services in the service hierarchy, Business Level Services (BLS), is tied to the capability that is being delivered. At this level, the customer or entity might not care about how the service is composed or what ingredients are used, managed, and/or tracked to provide the service(s). The primary objective of business level services is to attain the goals set by the customer according to the overall contract terms and conditions established between the customer and the provider at the agreed to a financial agreement. BLS(s) are comprised of several Business Functional Services (BFS) and an overall SLA.

This arrangement and other service management features described herein are designed to meet the various requirements of edge computing with its unique and complex resource and service interactions. This service management arrangement is intended to inherently address several of the resource basic services within its framework, instead of through an agent or middleware capability. Services such as: locate, find, address, trace, track, identify, and/or register may be placed immediately in effect as resources appear on the framework, and the manager or owner of the resource domain can use management rules and policies to ensure orderly resource discovery, registration and certification.

Moreover, any number of edge computing architectures described herein may be adapted with service management features. These features may enable a system to be constantly aware and record information about the motion, vector, and/or direction of resources as well as fully describe these features as both telemetry and metadata associated with the devices. These service management features can be used for resource management, billing, and/or metering, as well as an element of security. The same functionality also applies to related resources, where a less intelligent device, like a sensor, might be attached to a more manageable resource, such as an edge gateway. The service management framework is made aware of change of custody or encapsulation for resources. Since nodes and components may be directly accessible or be managed indirectly through a parent or alternative responsible device for a short duration or for its entire lifecycle, this type of structure is relayed to the service framework through its interface and made available to external query mechanisms.

Additionally, this service management framework is always service aware and naturally balances the service delivery requirements with the capability and availability of the resources and the access for the data upload the data analytics systems. If the network transports degrade, fail or change to a higher cost or lower bandwidth function, service policy monitoring functions provide alternative analytics and service delivery mechanisms within the privacy or cost constraints of the user. With these features, the policies can trigger the invocation of analytics and dashboard services at the edge ensuring continuous service availability at reduced fidelity or granularity. Once network transports are re-established, regular data collection, upload and analytics services can resume.

The deployment of a multi-stakeholder edge computing system may be arranged and orchestrated to enable the deployment of multiple services and virtual edge instances, among multiple edge platforms and subsystems, for use by multiple tenants and service providers. In a system example applicable to a cloud service provider (CSP), the deployment of an edge computing system may be provided via an "over-the-top" approach, to introduce edge computing platforms as a supplemental tool to cloud computing. In a contrasting system example applicable to a telecommunications service provider (TSP), the deployment of an edge computing system may be provided via a "network-aggregation" approach, to introduce edge computing platforms at locations in which network accesses (from different types of data access networks) are aggregated. However, these over-the-top and network aggregation approaches may be implemented together in a hybrid or merged approach or configuration.

Figure 19:
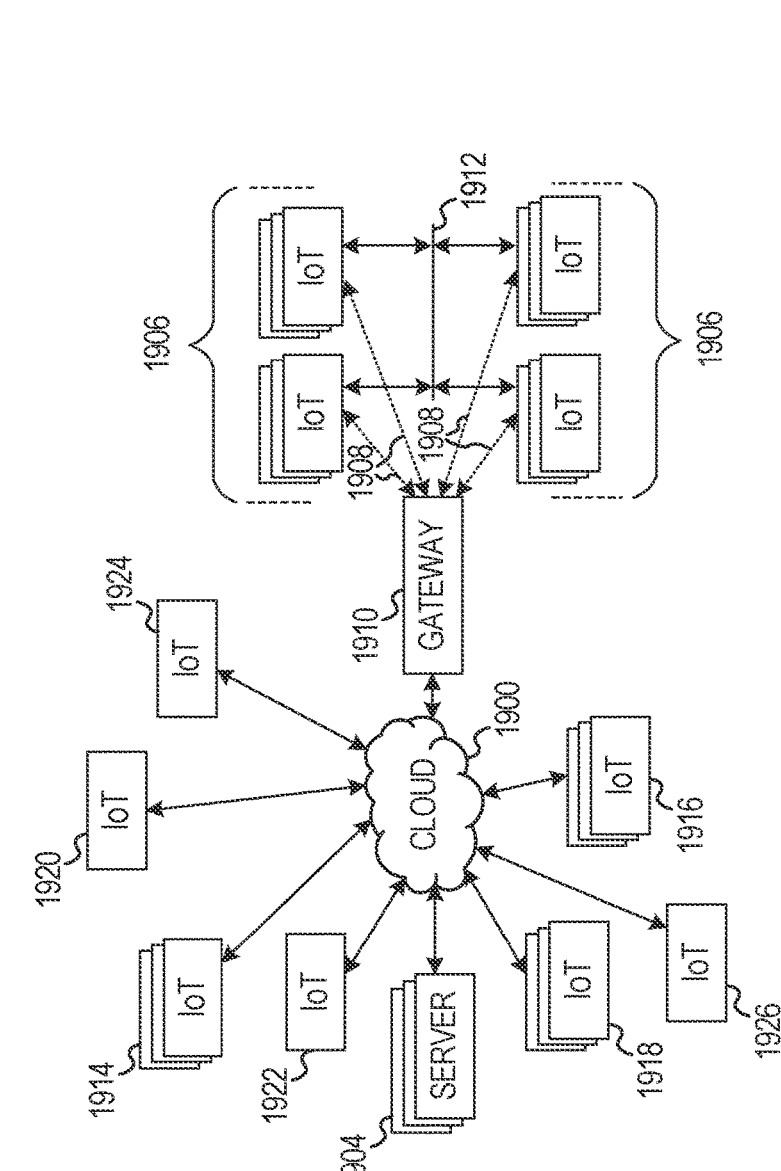
FIG. 19 illustrates a drawing of a cloud computing network, or cloud, in communication with a number of Internet of Things (IoT) devices, according to an example.

FIG. 19 illustrates a drawing of a cloud computing network, or cloud 1900, in communication with a number of Internet of Things (IoT) devices. The cloud 1900 may represent the Internet, or may be a local area network (LAN), or a wide area network (WAN), such as a proprietary network for a company. The IoT devices may include any number of different types of devices, grouped in various combinations. For example, a traffic control group 1906 may include IoT devices along streets in a city. These IoT devices may include stoplights, traffic flow monitors, cameras, weather sensors, and the like. The traffic control group 1906, or other subgroups, may be in communication with the cloud 1900 through wired or wireless links 1908, such as LPWA links, and the like. Further, a wired or wireless sub-network 1912 may allow the IoT devices to communicate with each other, such as through a local area network, a wireless local area network, and the like. The IoT devices may use another device, such as a gateway 1910 or 1928 to communicate with remote locations such as the cloud 1900; the IoT devices may also use one or more servers 1930 to facilitate communication with the cloud 1900 or with the gateway 1910. For example, the one or more servers 1930 may operate as an intermediate network node to support a local Edge cloud or fog implementation among a local area network. Further, the gateway 1928 that is depicted may operate in a cloud-to-gateway-to-many Edge devices configuration, such as with the various IoT devices 1914, 1920, 1924 being constrained or dynamic to an assignment and use of resources in the cloud 1900.

Other example groups of IoT devices may include remote weather stations 1914, local information terminals 1916, alarm systems 1918, automated teller machines 1920, alarm panels 1922, or moving vehicles, such as emergency vehicles 1924 or other vehicles 1926, among many others. Each of these IoT devices may be in communication with other IoT devices, with servers 1904, with another IoT fog device or system (not shown), or a combination therein. The groups of IoT devices may be deployed in various residential, commercial, and industrial settings (including in both private or public environments). A possible advantage of example location engines described herein is that example location engines as described herein may achieve location detection of one(s) of the IoT devices of the traffic control group 1906, one(s) of the IoT devices 1914, 1916, 1918, 1920, 1922, 1924, 1926, etc., and/or a combination thereof with improved performance, improved accuracy, and/or reduced latency.

As may be seen from FIG. 19, a large number of IoT devices may be communicating through the cloud 1900. This may allow different IoT devices to request or provide information to other devices autonomously. For example, a group of IoT devices (e.g., the traffic control group 1906) may request a current weather forecast from a group of remote weather stations 1914, which may provide the forecast without human intervention. Further, an emergency vehicle 1924 may be alerted by an automated teller machine 1920 that a burglary is in progress. As the emergency vehicle 1924 proceeds towards the automated teller machine 1920, it may access the traffic control group 1906 to request clearance to the location, for example, by lights turning red to block cross traffic at an intersection in sufficient time for the emergency vehicle 1924 to have unimpeded access to the intersection.

Clusters of IoT devices, such as the remote weather stations 1914 or the traffic control group 1906, may be equipped to communicate with other IoT devices as well as with the cloud 1900. This may allow the IoT devices to form an ad-hoc network between the devices, allowing them to function as a single device, which may be termed a fog device or system (e.g., as described above with reference to FIG. 18).

Figure 20:
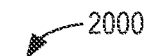
FIG. 20 illustrates network connectivity in non-terrestrial (satellite) and terrestrial (mobile cellular network) settings, according to an example.

FIG. 20 illustrates network connectivity in non-terrestrial (satellite) and terrestrial (mobile cellular network) settings, according to an example. As shown, a satellite constellation (e.g., a Low Earth Orbit constellation) may include multiple satellites 2001, 2002, which are connected to each other and to one or more terrestrial networks. Specifically, the satellite constellation is connected to a backhaul network, which is in turn connected to a 5G core network 2040. The 5G core network is used to support 5G communication operations at the satellite network and at a terrestrial 5G radio access network (RAN) 2030.

FIG. 20 also depicts the use of the terrestrial 5G RAN 2030, to provide radio connectivity to a user equipment (UE) 2020 via a massive multiple input, multiple output (MIMO) antenna 2050. It will be understood that a variety of network communication components and units are not depicted in FIG. 20 for purposes of simplicity. With these basic entities in mind, the following techniques describe ways in which terrestrial and satellite networks can be extended for various Edge computing scenarios. Alternatively, the illustrated example of FIG. 20 may be applicable to other cellular technologies (e.g., 6G and the like).

Data flow diagrams and/or flowcharts representative of example machine readable instructions, which may be executed to configure processor circuitry to implement the DPN circuitry 102 of FIG. 1, are shown in FIGS. 21-24. The machine readable instructions may be one or more executable programs or portion(s) of an executable program for execution by processor circuitry, such as the processor circuitry 2560 shown in the example IoT device 2550 discussed below in connection with FIG. 25 and/or the processor circuitry 2612 shown in the example processor platform 2600 discussed below in connection with FIG. 26 and/or the example processor circuitry discussed below in connection with FIGS. 27 and/or 28. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the data flow diagrams and/or flowcharts illustrated in FIGS. 21-24, many other methods of implementing the example DPN circuitry 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 21-24 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 21:
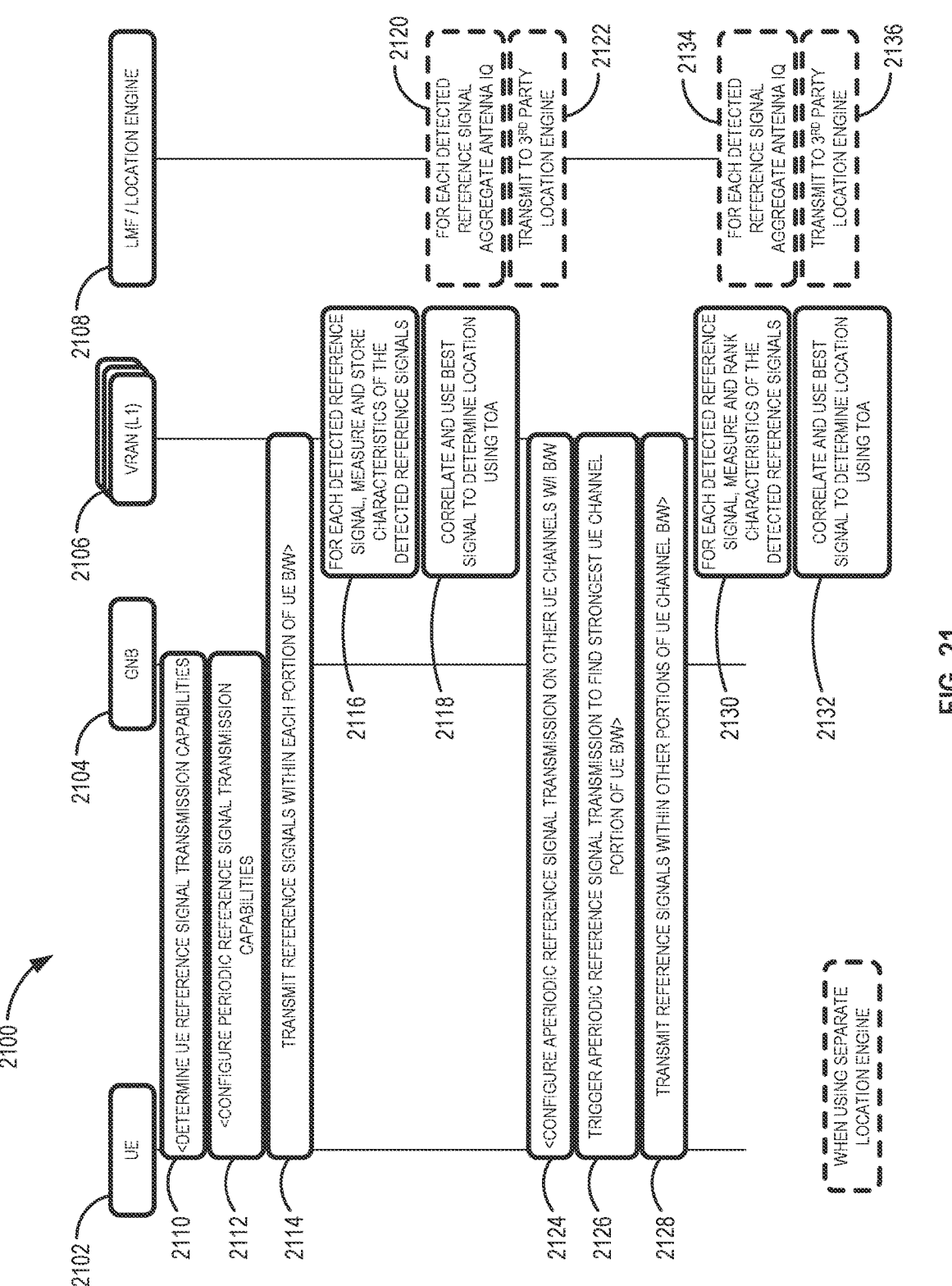
FIG. 21 is an example data flow diagram to implement examples disclosed herein.

FIG. 21 is a data flow diagram representative of example machine readable instructions and/or example operations 2100 that may be executed by example processor circuitry to implement the DPN circuitry 102 of FIGS. 1 and/or 2 to facilitate communication associated with user equipment using a private network. The data flow diagram includes an example UE 2102, an example gNB 2104, one or more example vRANs 2106, and an example LMF/Location Engine 2108. In some examples, at least one of the gNB 2104, the one or more vRANs 2106, or the LMF/Location Engine 2108 can be implemented by the DPN circuitry 102 of FIGS. 1 and/or 2.

In the illustrated example of FIG. 21, the example readable instructions and/or example operations 2100 begin at a first operation 2110, at which the gNB 2104 determines reference signal transmission capabilities of the UE 2102. For example, when the UE 2102 is attaching to the private network, the gNB 2104 determines the SRS transmission capabilities of the UE 2102 at the first operation 2110. At a second operation 2112, the gNB 2104 configures the UE 2102 for periodic reference signal transmission capabilities (e.g., the UE 2102 is configured for repeated transmission of reference signals). For example, at the second operation 2112, the gNB 2104 configures the UE 2102 to periodically transmit SRS data in all portions (e.g., all communication channels) of the bandwidth of the UE 2102. At a third operation 2114, the UE 2102 transmits reference signal data, which can include reference signal parameters, to the one or more vRANs 2106 via the gNB 2104. For example, the UE 2102 transmits SRS data within each portion (e.g., communication channel) of the bandwidth of the UE 2102 to the one or more vRANs 2106 via the gNB 2104.

In the illustrated example of FIG. 21, at a fourth operation 2116, for each detected reference signal, the one or more vRANs 2106 measure the characteristics of the detected transmissions of reference signals and store the received characteristics. For example, at the fourth operation 2116, the one or more vRANs 2106 compute an SRS reference signal received power (SRS-RSRP) and/or an SRS reference signal received quality (SRS-RSRQ) of a detected SRS transmission. As such, at the fourth operation 2116, the one or more vRANs 2106 can compute the signal power and signal quality in each portion of the bandwidth of (e.g., all communication channels supported by) the UE 2102.

In the illustrated example of FIG. 21, at a fifth operation 2118, the one or more vRANs 2106 correlate and use the best signal to determine a location of the UE 2102. For example, at the fifth operation 2118, the one or more vRANs 2106 determine the portion of the bandwidth of the UE 2102 that has the highest signal power and/or highest signal quality. Using the identified portion of the bandwidth of the UE 2102, the one or more vRANs 2106 determine the location of the UE 2102 based on TOA techniques described herein. Additionally or alternatively, the one or more vRANs 2106 can transmit and/or receive uplink and/or downlink traffic using the identified portion of the bandwidth of the UE 2102. In some examples when using a separate location engine, at a sixth operation 2120, the LMF/Location Engine 2108 aggregates antenna IQ samples for each detected reference signal. In some examples when using a separate location engine, at a seventh operation 2122, the LMF/Location Engine 2108 transmits the antenna IQ samples to a separate location engine for location determination of the UE 2102.

In the illustrated example of FIG. 21, at an eighth operation 2124, the one or more vRANs 2106 configure the UE 2102 for aperiodic reference signal transmission on other portions (e.g., communication channels) of the bandwidth of the UE 2102. For example, at the eighth operation 2124, the one or more vRANs 2106 configure the UE 2102 to aperiodically transmit SRS data in the portions (e.g., communication channels) of the bandwidth of the UE 2102 that were not determined at the fifth operation 2118. At a ninth operation 2126, the one or more vRANs 2106 trigger the aperiodic reference signal transmission (e.g., the UE 2102 is configured to repeatedly transmit reference signals) to find the strongest portion (e.g., communication channel) of the bandwidth of the UE 2102. For example, at the ninth operation 2126, the one or more vRANs 2106 aperiodically trigger the UE 2102 to transmit SRS data to the one or more vRANs 2106 in the portions (e.g., communication channels) of the bandwidth of the UE 2102 that were not determined at the fifth operation 2118. At a tenth operation 2128, the UE 2102 transmits reference signals within the portions (e.g., communication channels) of the bandwidth of the UE 2102 that were not determined at the fifth operation 2118.

In the illustrated example of FIG. 21, at an eleventh operation 2130, the one or more vRANs 2106 measure and rank characteristics for each detected reference signal. For example, at the eleventh operation 2130, the one or more vRANs 2106 measure and rank the SRS-RSRP and/or the SRS-RSRQ of each detected SRS transmission in the other portions of the bandwidth of the UE 2102 that were not determined at the fifth operation 2118. At a twelfth operation 2132, the one or more vRANs 2106 correlate and use the best signal to determine a location of the UE 2102. For example, at the twelfth operation 2132, the one or more vRANs 2106 determine the portion of the bandwidth of the UE 2102 that has the highest signal power and/or highest signal quality. Using the identified portion of the bandwidth of the UE 2102, the one or more vRANs 2106 determine the location of the UE 2102 based on TOA techniques described herein. Additionally or alternatively, the one or more vRANs 2106 can transmit and/or receive uplink and/or downlink traffic using the identified portion of the bandwidth of the UE 2102. In some examples when using a separate location engine, at a thirteenth operation 2134, the LMF/Location Engine 2108 aggregates antenna IQ samples for each detected reference signal. In some examples when using a separate location engine, at a fourteenth operation 2136, the LMF/Location Engine 2108 transmits the antenna IQ samples to a separate location engine for location determination of the UE 2102.

As described above, the DPN circuitry 102 of FIGS. 1 and/or 2 can monitor which channel of the bandwidth of the UE 2102 provides the strongest and highest quality connectivity in which location statistics for the UE 2102 can be determined. In some examples, one or more of the eighth operation 2124, the ninth operation 2126, the tenth operation 2128, the eleventh operation 2130, the twelfth operation 2132, the thirteenth operation 2134, or the fourteenth operation 2136 can be executed and/or instantiated by the DPN circuitry 102 of FIGS. 1 and/or 2 during uplink and/or downlink traffic taking place in a previously identified channel of the bandwidth of the UE 2102. Thus, the DPN circuitry 102 increases the power efficiency of applications (e.g., applications monitoring UE location) by improving signal strength and quality of communications transmitted between the UE 2102 and the DPN circuitry 102. In additional or alternative examples, the example readable instructions and/or example operations 2100 of FIG. 21 may be implemented with additional or alternative reference signals such as PRS, proprietary reference signals, among others.

FIG. 22 is a flowchart representative of example machine readable instructions and/or example operations 2200 that may be executed and/or instantiated by processor circuitry to facilitate communication associated with user equipment using a private network. The example machine readable instructions and/or the example operations 2200 of FIG. 22 begin at block 2202, at which the DPN circuitry 102 determines a fixed geographical area of a private network.

For example, at block 2202, the private network configuration circuitry 230 determines a fixed geographical area of a private network.

In the illustrated example of FIG. 22, at block 2204, the DPN circuitry 102 determines a quantity of terrestrial network cells to serve user equipment (UEs) within the fixed geographical area. For example, at block 2204, the private network configuration circuitry 230 determines a quantity of terrestrial network cells to serve UEs within the fixed geographical area of the private network. At block 2206, the DPN circuitry 102 determines a quantity of non-terrestrial network cells to serve UEs within the fixed geographical area. For example, at block 2206, the private network configuration circuitry 230 determines a quantity of non-terrestrial network cells to serve UEs within the fixed geographical area of the private network.

In the illustrated example of FIG. 22, at block 2208, the DPN circuitry 102 generates a fixed terrestrial network coverage grid (e.g., a fixed terrestrial network coverage mesh). For example, at block 2208, the private network configuration circuitry 230 generates a fixed terrestrial network coverage grid. At block 2210, the DPN circuitry 102 generates a fixed non-terrestrial network coverage grid (e.g., a fixed non-terrestrial network coverage mesh). For example, at block 2210, the private network configuration circuitry 230 generates a fixed non-terrestrial network coverage grid.

In the illustrated example of FIG. 22, at block 2212, the DPN circuitry 102 activates (e.g., initiates) private network terrestrial network nodes in alignment with terrestrial network coverage grid. For example, at block 2212, the private network configuration circuitry 230 activates one or more private network terrestrial network nodes in alignment with the terrestrial network coverage grid. At block 2214, the DPN circuitry 102 activates (e.g., initiates) private network non-terrestrial network nodes in alignment with non-terrestrial network coverage grid. For example, at block 2214, the private network configuration circuitry 230 activates one or more private network non-terrestrial network nodes in alignment with the non-terrestrial network coverage grid.

In the illustrated example of FIG. 22, at block 2216, the DPN circuitry 102 facilitates communication associated with the UEs using the private network. For example, the receiver circuitry 210, the private network management circuitry 240, and/or the transmitter circuitry 280 facilitate communication with one or more UEs in the private network. In response to facilitating communication associated with the UEs using the private network at block 2216, the example machine readable instructions and/or the example operations 2200 of FIG. 22 conclude.

Figure 23:
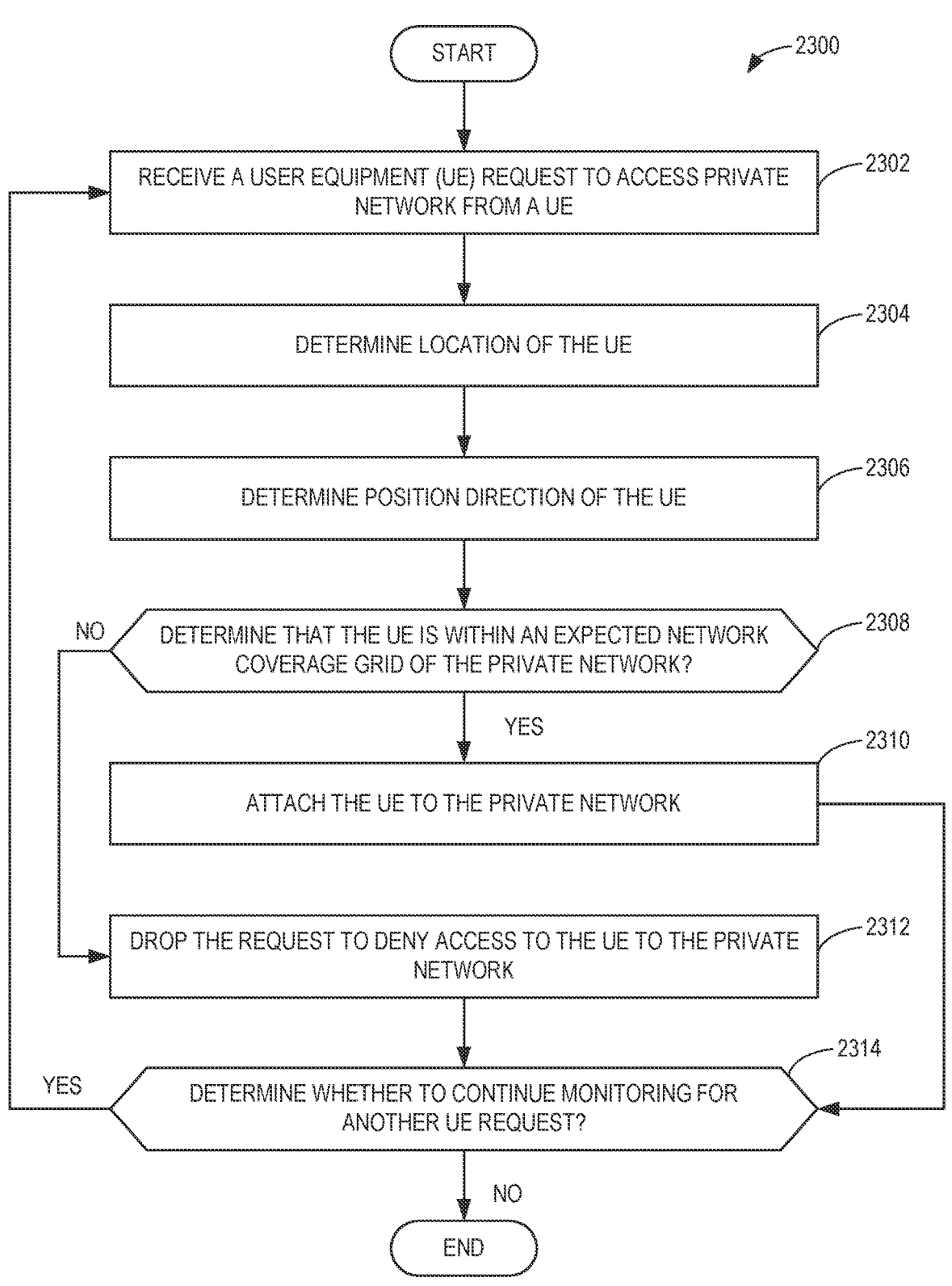
FIG. 23 is a flowchart representative of example machine readable instructions and/or example operations that may be executed by example processor circuitry to implement the DPN circuitry of FIGS. 1 and/or 2 to process user equipment requests to join a private network.

FIG. 23 is a flowchart representative of example machine readable instructions and/or example operations 2300 that may be executed and/or instantiated by processor circuitry to process user equipment requests to join a private network. The example machine readable instructions and/or the example operations 2300 of FIG. 23 begin at block 2302, at which the DPN circuitry 102 receives a user equipment (UE) request to access a private network from a UE. For example, at block 2302, the receiver circuitry 210 receives a UE request from a UE to access a private network.

In the illustrated example of FIG. 23, at block 2304, the DPN circuitry 102 determines a location of the UE. For example, at block 2304, the location determination circuitry 270 determines a location of the UE. At block 2306, the DPN circuitry 102 determines a position direction of the UE. For example, at block 2306, the direction determination circuitry 260 determines a position direction of the UE. At block 2308, the DPN circuitry 102 determines whether the UE is within an expected network coverage grid (e.g., an expected network coverage mesh) of the private network. For example, at block 2308, the location determination circuitry 270 determines whether the UE is within an expected network coverage grid of the private network based on the location and/or position direction of the UE.

In the illustrated example of FIG. 23, if, at block 2308, the DPN circuitry 102 determines that the UE is within an expected network coverage grid of the private network, control proceeds to block 2310. At block 2310, the DPN circuitry 102 attaches the UE to the private network. For example, at block 2310, the private network management circuitry 240 attaches the UE to the private network. In response to attaching the UE to the private network at block 2310, control proceeds to block 2314.

In the illustrated example of FIG. 23, if, at block 2308, the DPN circuitry 102 determines that the UE is not within an expected network coverage grid of the private network, control proceeds to block 2312. At block 2312, the DPN circuitry 102 drops the request to deny access to the UE to the private network. For example, at block 2312, the private network management circuitry 240 drops the request to deny access to the UE to the private network. In response to dropping the request to deny access to the UE to the private network at block 2312, control proceeds to block 2314.

In the illustrated example of FIG. 23, at block 2314, the DPN circuitry 102 determines whether to continue monitoring for another UE request. For example, at block 2314, the private network management circuitry 240 determines whether to continue monitoring for another UE request. If, at block 2314, the DPN circuitry 102 determines to continue monitoring for another UE request, control returns to block 2302, otherwise (e.g., if the DPN circuitry 102 determines nit to continue monitoring for another UE request) the example machine readable instructions and/or the example operations 2300 of FIG. 23 conclude.

Figure 24:
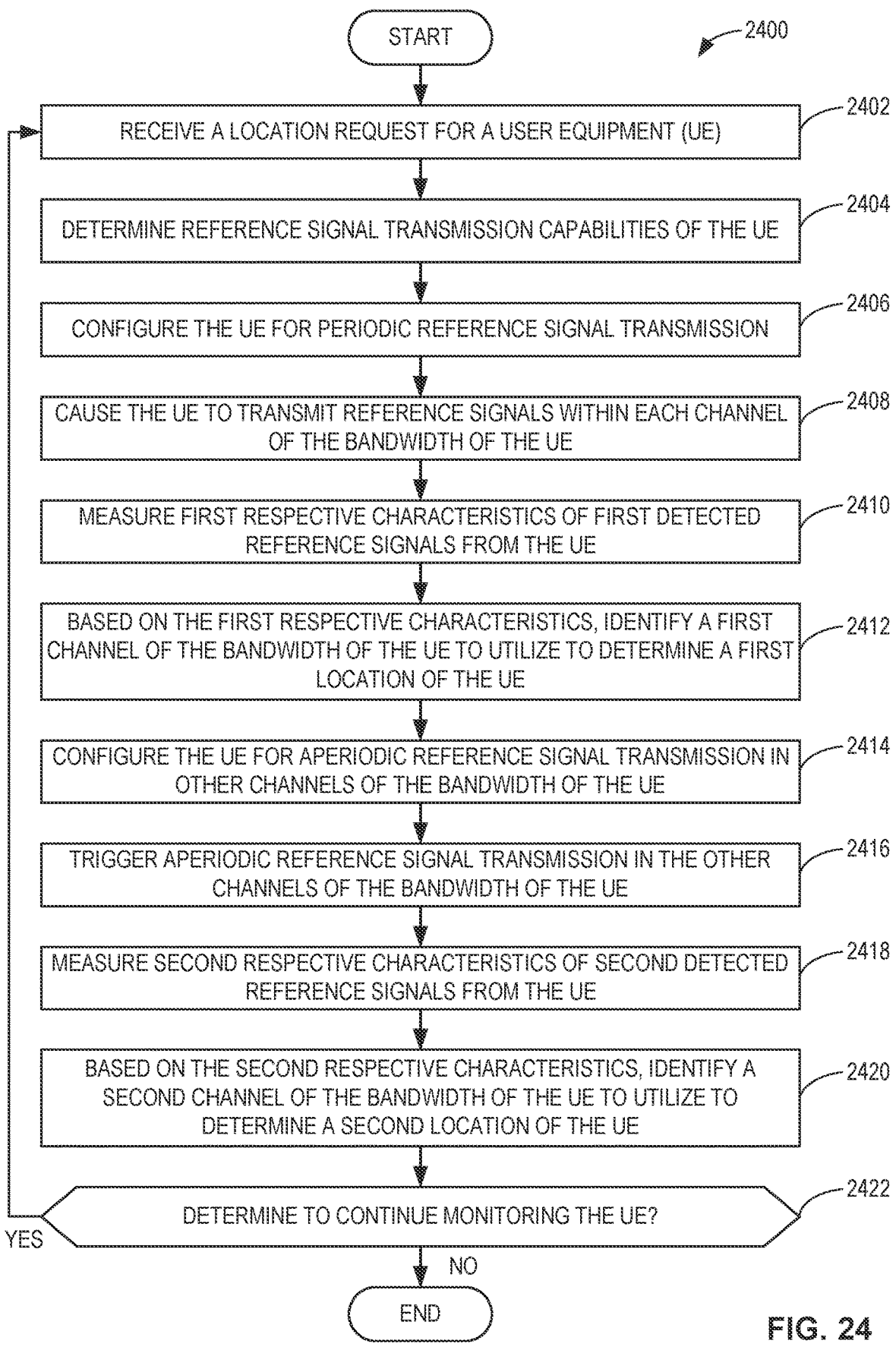
FIG. 24 is a flowchart representative of example machine readable instructions and/or example operations that may be executed by example processor circuitry to implement the DPN circuitry of FIGS. 1 and/or 2 to determine a location of user equipment in a private network.

FIG. 24 is a flowchart representative of example machine readable instructions and/or example operations 2400 that may be executed and/or instantiated by processor circuitry to determine a location of user equipment in a private network. The example machine readable instructions and/or the example operations 2400 of FIG. 24 begin at block 2402, at which the DPN circuitry 102 receives a location request for a user equipment (UE). For example, at block 2402, the private network management circuitry 240 receives a location request for the UE.

In the illustrated example of FIG. 24, at block 2404, the DPN circuitry 102 determines reference signal transmission capabilities of the UE. For example, at block 2404, the private network configuration circuitry 230 determines reference signal (e.g., SRS) transmission capabilities of the UE. At block 2406, the DPN circuitry 102 configures the UE for periodic reference signal transmission. For example, at block 2406, the private network configuration circuitry 230 configures the UE for periodic reference signal transmission (e.g., periodic transmission of SRS data) based on the reference signal (e.g., SRS) transmission capabilities of the UE. At block 2408, the DPN circuitry 102 causes the UE to transmit reference signals within each channel of the bandwidth of the UE. For example, by configuring the UE for periodic reference signal transmission at block 2406, the private network configuration circuitry 230 causes the UE to transmit reference signals within each channel of the bandwidth of the UE at block 2408.

In the illustrated example of FIG. 24, at block 2410, the DPN circuitry 102 measures first respective characteristics (e.g., the DPN circuitry 102 is to measure respective characteristics) of first detected reference signals from the UE. For example, at block 2410, the location determination circuitry 270 measures first respective SRS-RSRPs and first respective SRS-RSRQs based on the SRS transmissions collected by the receiver circuitry 210. At block 2412, based on the first respective characteristics, the DPN circuitry 102 identifies a first channel of the bandwidth of the UE to utilize to determine a first location of the UE. For example, at block 2412, based on the first respective powers and the first respective qualities, the location determination circuitry 270 identifies a first channel of the bandwidth of the UE to utilize to determine a first location of the UE based on time of arrival.

In the illustrated example of FIG. 24, at block 2414, the DPN circuitry 102 configures the UE for aperiodic reference signal transmission in other channels of the bandwidth of the UE. For example, at block 2414, the private network configuration circuitry 230 configures the UE for aperiodic reference signal (e.g., SRS) transmission in other channels of the bandwidth of the UE. At block 2416, the DPN circuitry 102 triggers aperiodic reference signal transmission in the other channels of the bandwidth of the UE. For example, at block 2416, the private network configuration circuitry 230 triggers aperiodic reference signal transmission in the other channels of the bandwidth of the UE. As such, the DPN circuitry 102 causes the UE to aperiodically transmit reference signals in the other channels of the bandwidth of the UE.

In the illustrated example of FIG. 24, at block 2418, the DPN circuitry 102 measures second respective characteristics of second detected reference signals from the UE. For example, at block 2418, the location determination circuitry 270 measures second respective SRS-RSRPs and second respective SRS-RSRQs based on the SRS transmissions collected by the receiver circuitry 210. At block 2420, the DPN circuitry 102, based on the second respective characteristics, the DPN circuitry 102 identifies a second channel of the bandwidth of the UE to utilize to determine a second location of the UE. For example, at block 2420, based on the second respective powers and the second respective qualities, the location determination circuitry 270 identifies a second channel of the bandwidth of the UE to utilize to determine a second location of the UE based on time of arrival.

In the illustrated example of FIG. 24, at block 2422, the DPN circuitry 102 determines whether to continue monitoring the UE. For example, at block 2422, the private network management circuitry 240 determines whether to continue monitoring the UE. If, at block 2422, the DPN circuitry 102 determines to continue monitoring the UE, control returns to block 2402, otherwise (e.g., if the DPN circuitry 102 determines not to continue monitoring the UE) the example machine readable instructions and/or the example operations 2400 of FIG. 24 conclude. As illustrated in the examples of FIGS. 23 and 24, the DPN circuitry 102 obtains the locations of UEs prior to an system information (SIB) attachment to the private network and consistently and/or iteratively searches for the strongest channel within the bandwidth of each UE so that the DPN circuitry 102 can get the most precise positioning of the UEs as possible in terms of latency and/or accuracy.

Figure 25:
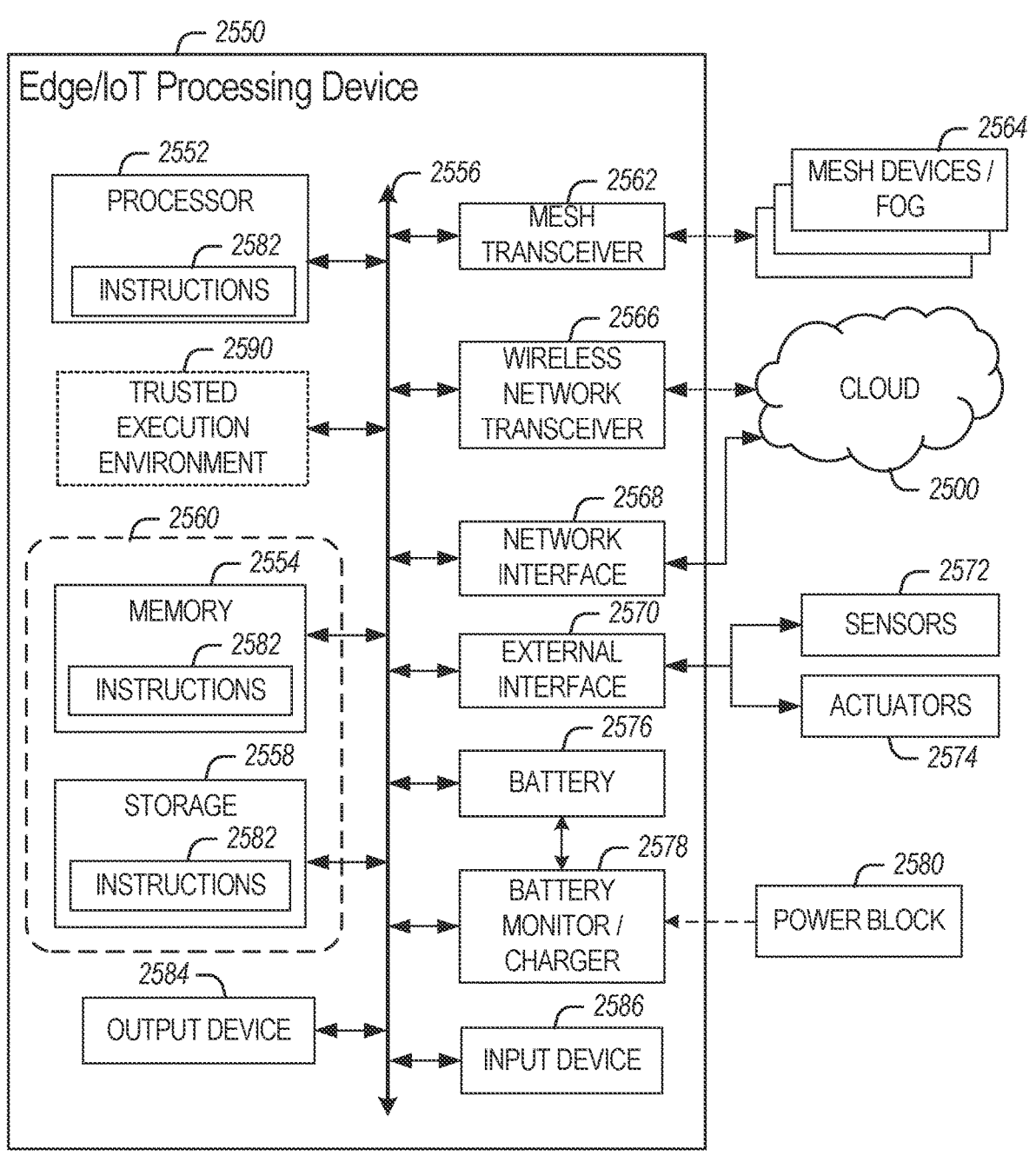
FIG. 25 illustrates a block diagram for an example IoT processing system architecture upon which any one or more of the techniques (e.g., operations, processes, methods, and methodologies) discussed herein may be performed, according to an example.

FIG. 25 is a block diagram of an example of components that may be present in an IoT device 2550 for implementing the techniques described herein. In some examples, the IoT device 2550 may implement the DPN circuitry 102 of FIGS. 1 and/or 2. The IoT device 2550 may include any combinations of the components shown in the example or referenced in the disclosure above. The components may be implemented as ICs, portions thereof, discrete electronic devices, or other modules, logic, hardware, software, firmware, or a combination thereof adapted in the IoT device 2550, or as components otherwise incorporated within a chassis of a larger system. Additionally, the block diagram of FIG. 25 is intended to depict a high-level view of components of the IoT device 2550. However, some of the components shown may be omitted, additional components may be present, and different arrangement of the components shown may occur in other implementations.

The IoT device 2550 may include processor circuitry in the form of, for example, a processor 2552, which may be a microprocessor, a multi-core processor, a multithreaded processor, an ultra-low voltage processor, an embedded processor, or other known processing elements. The processor 2552 may be a part of a system on a chip (SoC) in which the processor 2552 and other components are formed into a single integrated circuit, or a single package, such as the Edison™ or Galileo™ SoC boards from Intel. As an example, the processor 2552 may include an Intel® Architecture Core™ based processor, such as a Quark™, an Atom™, an i3, an i5, an i7, or an microcontroller unit (MCU) class (MCU-class) processor, or another such processor available from Intel® Corporation, Santa Clara, CA. However, any number other processors may be used, such as available from Advanced Micro Devices, Inc. (AMD) of Sunnyvale, CA, a Microprocessor without Interlocked Pipelined Stages (MIPS) based (MIPS-based) design from MIPS Technologies, Inc. of Sunnyvale, CA, an ARM-based design licensed from ARM Holdings, Ltd. or customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc.

The processor 2552 may communicate with a system memory 2554 over an interconnect 2556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., low power DDR (LPDDR), LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 2558 may also couple to the processor 2552 via the interconnect 2556. In an example the storage 2558 may be implemented via a solid state disk drive (SSDD). Other devices that may be used for the storage 2558 include flash memory cards, such as SD cards, microSD cards, xD picture cards, and the like, and USB flash drives. In low power implementations, the storage 2558 may be on-die memory or registers associated with the processor 2552. However, in some examples, the storage 2558 may be implemented using a micro hard disk drive (HDD). Further, any number of new technologies may be used for the storage 2558 in addition to, or instead of, the technologies described, such as resistance change memories, phase change memories, holographic memories, or chemical memories, among others.

The components may communicate over the interconnect 2556. The interconnect 2556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 2556 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 2562, 2566, 2568, or 2570. Accordingly, in various examples, applicable means for communicating (e.g., receiving, transmitting, etc.) may be embodied by such communications circuitry.

The interconnect 2556 may couple the processor 2552 to a mesh transceiver 2562, for communications with other mesh devices 2564. The mesh transceiver 2562 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 2564. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a wireless WAN (WWAN) unit.

The mesh transceiver 2562 may communicate using multiple standards or radios for communications at different range. For example, the IoT device 2550 may communicate with close devices, e.g., within about 10 meters, using a local transceiver based on BLE, or another low power radio, to save power. More distant mesh devices 2564, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 2566 may be included to communicate with devices or services in the cloud 2500 via local or wide area network protocols. The wireless network transceiver 2566 may be a Low-Power Wide-Area (LPWA) transceiver that follows the IEEE 802.15.4, or IEEE 802.15.4g standards, among others. The IoT device 2550 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 2562 and wireless network transceiver 2566, as described herein. For example, the radio transceivers 2562 and 2566 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 2562 and 2566 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 2566, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 2568 may be included to provide a wired communication to the cloud 2500 or to other devices, such as the mesh devices 2564. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 2568 may be included to allow connect to a second network, for example, a NIC 2568 providing communications to the cloud over Ethernet, and a second NIC 2568 providing communications to other devices over another type of network.

The interconnect 2556 may couple the processor 2552 to an external interface 2570 that is used to connect external devices or subsystems. The external devices may include sensors 2572, such as accelerometers, level sensors, flow sensors, optical light sensors, camera sensors, temperature sensors, a global positioning system (GPS) sensors, pressure sensors, barometric pressure sensors, and the like. The external interface 2570 further may be used to connect the IoT device 2550 to actuators 2574, such as power switches, valve actuators, an audible sound generator, a visual warning device, and the like.

In some optional examples, various input/output (I/O) devices may be present within, or connected to, the IoT device 2550. For example, a display or other output device 2584 may be included to show information, such as sensor readings or actuator position. An input device 2586, such as a touch screen or keypad may be included to accept input. An output device 2586 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 2550.

A battery 2576 may power the IoT device 2550, although in examples in which the IoT device 2550 is mounted in a fixed location, it may have a power supply coupled to an electrical grid. The battery 2576 may be a lithium ion battery, or a metal-air battery, such as a zinc-air battery, an aluminum-air battery, a lithium-air battery, and the like.

A battery monitor/charger 2578 may be included in the IoT device 2550 to track the state of charge (SoCh) of the battery 2576. The battery monitor/charger 2578 may be used to monitor other parameters of the battery 2576 to provide failure predictions, such as the state of health (SoH) and the state of function (SoF) of the battery 2576. The battery monitor/charger 2578 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 2578 may communicate the information on the battery 2576 to the processor 2552 over the interconnect 2556. The battery monitor/charger 2578 may also include an analog-to-digital (ADC) convertor that allows the processor 2552 to directly monitor the voltage of the battery 2576 or the current flow from the battery 2576. The battery parameters may be used to determine actions that the IoT device 2550 may perform, such as transmission frequency, mesh network operation, sensing frequency, and the like.

A power block 2580, or other power supply coupled to a grid, may be coupled with the battery monitor/charger 2578 to charge the battery 2576. In some examples, the power block 2580 may be replaced with a wireless power receiver to obtain the power wirelessly, for example, through a loop antenna in the IoT device 2550. A wireless battery charging circuit, such as an LTC4020 chip from Linear Technologies of Milpitas, CA, among others, may be included in the battery monitor/charger 2578. The specific charging circuits chosen depends on the size of the battery 2576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 2558 may include instructions 2582 in the form of software, firmware, or hardware commands to implement the techniques described herein. Although such instructions 2582 are shown as code blocks included in the memory 2554 and the storage 2558, it may be understood that any of the code blocks may be replaced with hardwired circuits, for example, built into an application specific integrated circuit (ASIC).

In an example, the instructions 2582 provided via the memory 2554, the storage 2558, or the processor 2552 may be embodied as a non-transitory, machine readable medium including code to direct the processor 2552 to perform electronic operations in the IoT device 2550. The processor 2552 may access the non-transitory, machine readable medium over the interconnect 2556. For instance, the non-transitory, machine readable medium may be embodied by devices described for the storage 2558 of FIG. 25 or may include specific storage units such as optical disks, flash drives, or any number of other hardware devices. The non-transitory, machine readable medium may include instructions to direct the processor 2552 to perform a specific sequence or flow of actions, for example, as described with respect to the flowchart(s) and block diagram(s) of operations and functionality depicted above.

Also in a specific example, the instructions 2582 on the processor 2552 (separately, or in combination with the instructions 2582 of the machine readable medium) may configure execution or operation of a trusted execution environment (TEE) 2590. In an example, the TEE 2590 operates as a protected area accessible to the processor 2552 for secure execution of instructions and secure access to data. Various implementations of the TEE 2590, and an accompanying secure area in the processor 2552 or the memory 2554 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the IoT device 2550 through the TEE 2590 and the processor 2552.

Figure 26:
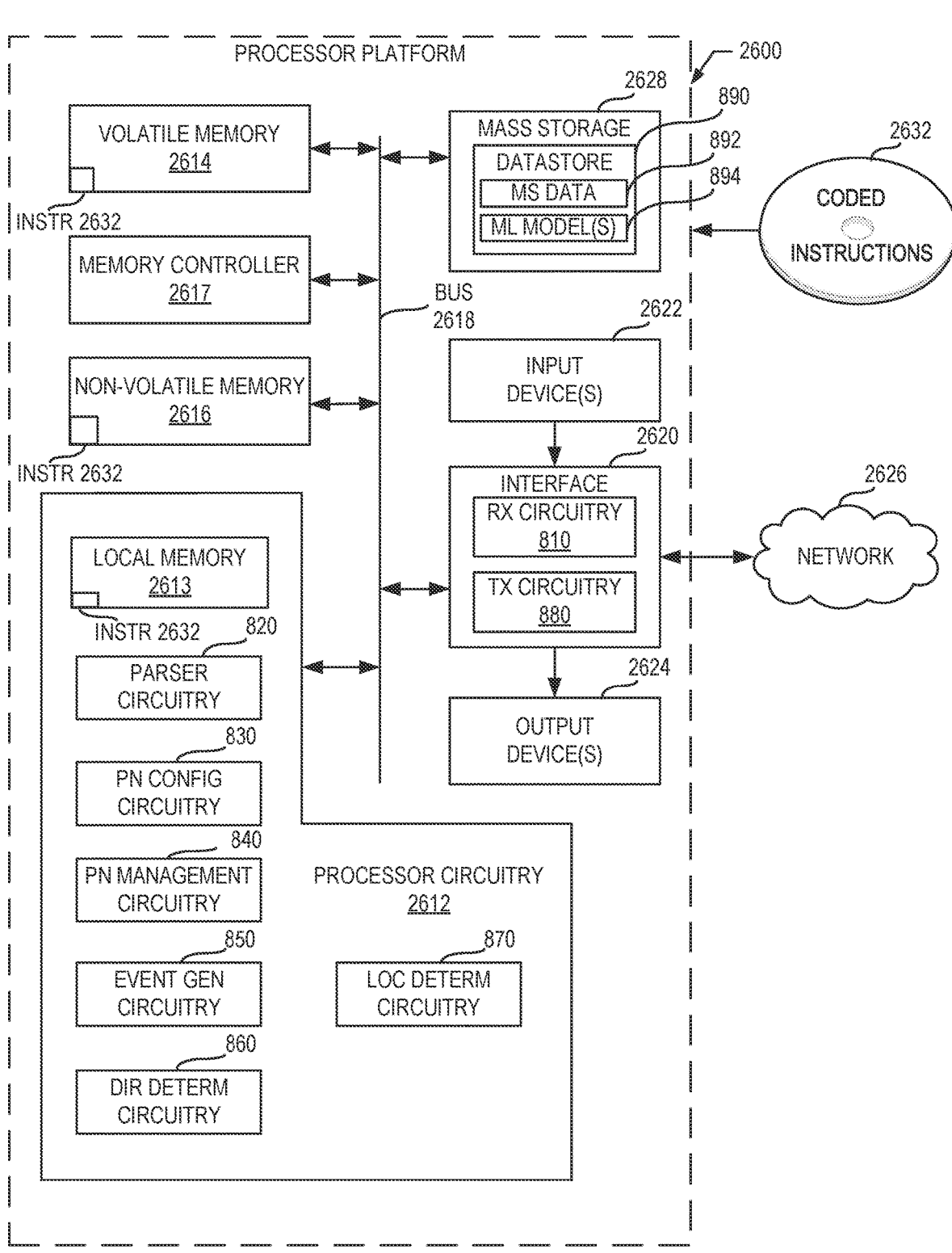
FIG. 26 is a block diagram of an example processing platform including processor circuitry structured to execute and/or instantiate the example machine-readable instructions and/or the example operations of FIGS. 22-24 to implement the example DPN circuitry of FIGS. 1 and/or 2.

FIG. 26 is a block diagram of an example processor platform 2600 structured to execute and/or instantiate the example machine readable instructions and/or the example operations of FIGS. 21-24 to implement the DPN circuitry 102 of FIG. 1. The processor platform 2600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 2600 of the illustrated example includes processor circuitry 2612. The processor circuitry 2612 of the illustrated example is hardware. For example, the processor circuitry 2612 can be implemented by one or more integrated circuits, logic circuits, FPGAs, microprocessors, CPUs, GPUs, DSPs, and/or microcontrollers from any desired family or manufacturer. The processor circuitry 2612 may be implemented by one or more semiconductor based (e.g., silicon based) devices. In this example, the processor circuitry 2612 implements the example parser circuitry 220, the example private network configuration circuitry 230 (identified by PN CONFIG CIRCUITRY), the example private network management circuitry 240 (identified by PN MANAGEMENT CIRCUITRY), the example event generation circuitry 250 (identified by EVENT GEN CIRCUITRY), the example direction determination circuitry 260 (identified by DIR DETERM CIRCUITRY), and the example location determination circuitry 270 (identified by LOC DETERM CIRCUITRY) of FIG. 2.

The processor circuitry 2612 of the illustrated example includes a local memory 2613 (e.g., a cache, registers, etc.). The processor circuitry 2612 of the illustrated example is in communication with a main memory including a volatile memory 2614 and a non-volatile memory 2616 by a bus 2618. In some examples, the bus 2618 can implement the bus 298 of FIG. 2. The volatile memory 2614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 2616 may be implemented by flash memory and/or any other desired type of memory device. Access to the main memory 2614, 2616 of the illustrated example is controlled by a memory controller 2617.

The processor platform 2600 of the illustrated example also includes interface circuitry 2620. The interface circuitry 2620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 2620 implements the example receiver circuitry 210 (identified by RX CIRCUITRY) and the transmitter circuitry 280 (identified by TX CIRCUITRY) of FIG. 2.

In the illustrated example, one or more input devices 2622 are connected to the interface circuitry 2620. The input device(s) 2622 permit(s) a user to enter data and/or commands into the processor circuitry 2612. The input device(s) 2622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 2624 are also connected to the interface circuitry 2620 of the illustrated example. The output device(s) 2624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 2620 of the illustrated example, thus, typically includes a graphics driver card, a graphics driver chip, and/or graphics processor circuitry such as a GPU.

The interface circuitry 2620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 2626. The communication can be by, for example, an Ethernet connection, a digital subscriber line (DSL) connection, a telephone line connection, a coaxial cable system, a satellite system, a line-of-sight wireless system, a cellular telephone system, an optical connection, etc.

The processor platform 2600 of the illustrated example also includes one or more mass storage devices 2628 to store software and/or data. Examples of such mass storage devices 2628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 2628 implement the example datastore 290 of FIG. 2, which includes the multi-spectrum data 292 (identified by MS DATA) and the example ML model(s) 294 of FIG. 2.

The machine readable instructions 2632, which may be implemented by the machine readable instructions of FIGS. 21-24, may be stored in the mass storage device 2628, in the volatile memory 2614, in the non-volatile memory 2616, and/or on a removable non-transitory computer readable storage medium such as a CD or DVD.

Figure 27:
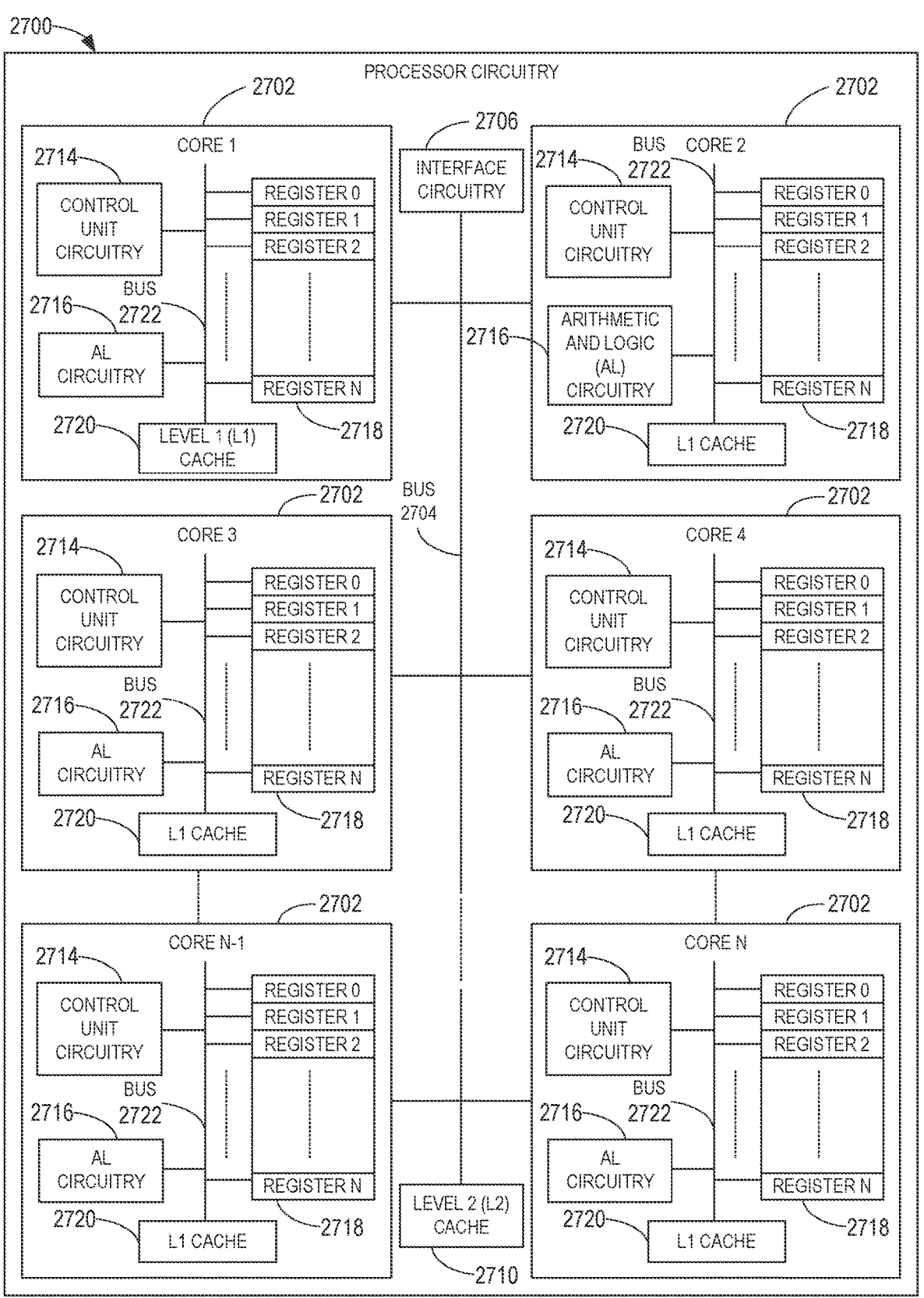
FIG. 27 is a block diagram of an example implementation of the processor circuitry of FIGS. 25 and/or 26.

FIG. 27 is a block diagram of an example implementation of the processor circuitry 2560 of FIG. 25 and/or the processor circuitry 2612 of FIG. 26. In this example, the processor circuitry 2560 of FIG. 25 and/or the processor circuitry 2612 of FIG. 26 is implemented by a microprocessor 2700. For example, the microprocessor 2700 may be a general purpose microprocessor (e.g., general purpose microprocessor circuitry). The microprocessor 2700 executes some or all of the machine readable instructions of the data flow diagrams and/or flowcharts of FIGS. 21-24 to effectively instantiate the DPN circuitry 102 of FIGS. 1 and/or 2 as logic circuits to perform the operations corresponding to those machine readable instructions. In some such examples, the DPN circuitry 102 of FIGS. 1 and/or 2 is instantiated by the hardware circuits of the microprocessor 2700 in combination with the instructions. For example, the microprocessor 2700 may be implemented by multi-core hardware circuitry such as a CPU, a DSP, a GPU, an XPU, etc. Although it may include any number of example cores 2702 (e.g., 1 core), the microprocessor 2700 of this example is a multi-core semiconductor device including N cores. The cores 2702 of the microprocessor 2700 may operate independently or may cooperate to execute machine readable instructions. For example, machine code corresponding to a firmware program, an embedded software program, or a software program may be executed by one of the cores 2702 or may be executed by multiple ones of the cores 2702 at the same or different times. In some examples, the machine code corresponding to the firmware program, the embedded software program, or the software program is split into threads and executed in parallel by two or more of the cores 2702. The software program may correspond to a portion or all of the machine readable instructions and/or operations represented by the data flow diagrams and/or flowcharts of FIGS. 21-24.

The cores 2702 may communicate by a first example bus 2704. In some examples, the first bus 2704 may be implemented by a communication bus to effectuate communication associated with one(s) of the cores 2702. For example, the first bus 2704 may be implemented by at least one of an Inter-Integrated Circuit (I2C) bus, a Serial Peripheral Interface (SPI) bus, a PCI bus, or a PCIe bus. Additionally or alternatively, the first bus 2704 may be implemented by any other type of computing or electrical bus. The cores 2702 may obtain data, instructions, and/or signals from one or more external devices by example interface circuitry 2706. The cores 2702 may output data, instructions, and/or signals to the one or more external devices by the interface circuitry 2706. Although the cores 2702 of this example include example local memory 2720 (e.g., Level 1 (L1) cache that may be split into an L1 data cache and an L1 instruction cache), the microprocessor 2700 also includes example shared memory 2710 that may be shared by the cores (e.g., Level 2 (L2 cache)) for high-speed access to data and/or instructions. Data and/or instructions may be transferred (e.g., shared) by writing to and/or reading from the shared memory 2710. The local memory 2720 of each of the cores 2702 and the shared memory 2710 may be part of a hierarchy of storage devices including multiple levels of cache memory and the main memory (e.g., the main memory 2614, 2616 of FIG. 26). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 2702 may be referred to as a CPU, DSP, GPU, etc., or any other type of hardware circuitry. Each core 2702 includes control unit circuitry 2714, arithmetic and logic (AL) circuitry (sometimes referred to as an ALU) 2716, a plurality of registers 2718, the local memory 2720, and a second example bus 2722. Other structures may be present.

For example, each core 2702 may include vector unit circuitry, single instruction multiple data (SIMD) unit circuitry, load/store unit (LSU) circuitry, branch/jump unit circuitry, floating-point unit (FPU) circuitry, etc. The control unit circuitry 2714 includes semiconductor-based circuits structured to control (e.g., coordinate) data movement within the corresponding core 2702. The AL circuitry 2716 includes semiconductor-based circuits structured to perform one or more mathematic and/or logic operations on the data within the corresponding core 2702. The AL circuitry 2716 of some examples performs integer based operations. In other examples, the AL circuitry 2716 also performs floating point operations. In yet other examples, the AL circuitry 2716 may include first AL circuitry that performs integer based operations and second AL circuitry that performs floating point operations. In some examples, the AL circuitry 2716 may be referred to as an Arithmetic Logic Unit (ALU). The registers 2718 are semiconductor-based structures to store data and/or instructions such as results of one or more of the operations performed by the AL circuitry 2716 of the corresponding core 2702. For example, the registers 2718 may include vector register(s), SIMD register(s), general purpose register(s), flag register(s), segment register(s), machine specific register(s), instruction pointer register(s), control register(s), debug register(s), memory management register(s), machine check register(s), etc. The registers 2718 may be arranged in a bank as shown in FIG. 27. Alternatively, the registers 2718 may be organized in any other arrangement, format, or structure including distributed throughout the core 2702 to shorten access time. The second bus 2722 may be implemented by at least one of an I2C bus, a SPI bus, a PCI bus, or a PCIe bus Each core 2702 and/or, more generally, the microprocessor 2700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 2700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 28:
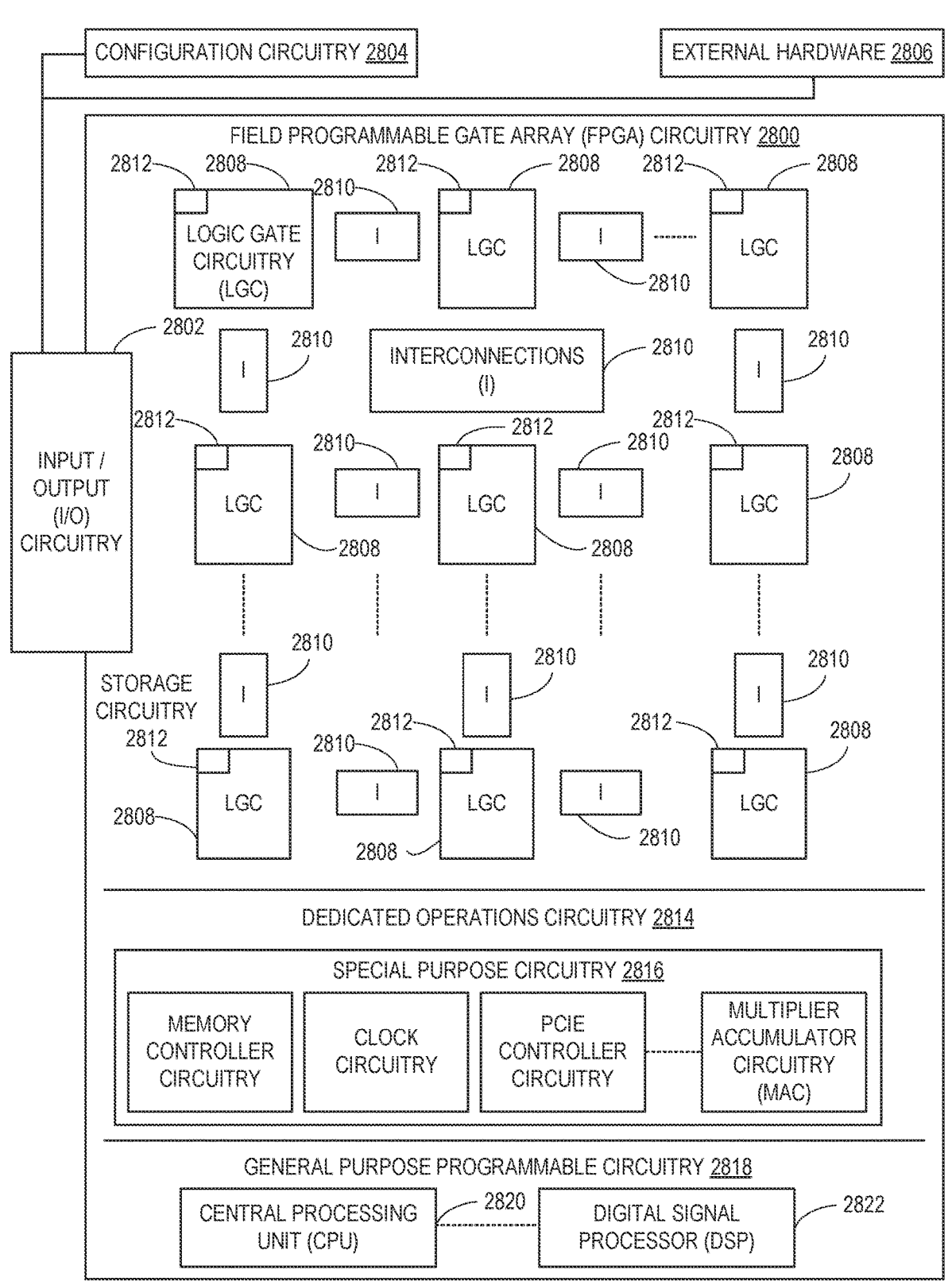
FIG. 28 is a block diagram of another example implementation of the processor circuitry of FIGS. 25 and/or 26.

FIG. 28 is a block diagram of another example implementation of the processor circuitry 2560 of FIG. 25 and/or the processor circuitry 2612 of FIG. 26. In this example, the processor circuitry 2560 of FIG. 25 and/or the processor circuitry 2612 of FIG. 26 is implemented by FPGA circuitry 2800. For example, the FPGA circuitry 2800 may be implemented by an FPGA. The FPGA circuitry 2800 can be used, for example, to perform operations that could otherwise be performed by the example microprocessor 2700 of FIG. 27 executing corresponding machine readable instructions. However, once configured, the FPGA circuitry 2800 instantiates the machine readable instructions in hardware and, thus, can often execute the operations faster than they could be performed by a general purpose microprocessor executing the corresponding software.

More specifically, in contrast to the microprocessor 2700 of FIG. 27 described above (which is a general purpose device that may be programmed to execute some or all of the machine readable instructions represented by the data flow diagrams and/or flowcharts of FIGS. 21-24 but whose interconnections and logic circuitry are fixed once fabricated), the FPGA circuitry 2800 of the example of FIG. 28 includes interconnections and logic circuitry that may be configured and/or interconnected in different ways after fabrication to instantiate, for example, some or all of the machine readable instructions represented by the data flow diagrams and/or flowcharts of FIGS. 21-24. In particular, the FPGA circuitry 2800 may be thought of as an array of logic gates, interconnections, and switches. The switches can be programmed to change how the logic gates are interconnected by the interconnections, effectively forming one or more dedicated logic circuits (unless and until the FPGA circuitry 2800 is reprogrammed). The configured logic circuits enable the logic gates to cooperate in different ways to perform different operations on data received by input circuitry. Those operations may correspond to some or all of the software represented by the data flow diagrams and/or flowcharts of FIGS. 21-24. As such, the FPGA circuitry 2800 may be structured to effectively instantiate some or all of the machine readable instructions of the data flow diagrams and/or flowcharts of FIGS. 21-24 as dedicated logic circuits to perform the operations corresponding to those software instructions in a dedicated manner analogous to an ASIC. Therefore, the FPGA circuitry 2800 may perform the operations corresponding to the some or all of the machine readable instructions of FIGS. 21-24 faster than the general purpose microprocessor can execute the same.

In the example of FIG. 28, the FPGA circuitry 2800 is structured to be programmed (and/or reprogrammed one or more times) by an end user by a hardware description language (HDL) such as Verilog. The FPGA circuitry 2800 of FIG. 28, includes example input/output (I/O) circuitry 2802 to obtain and/or output data to/from example configuration circuitry 2804 and/or external hardware 2806. For example, the configuration circuitry 2804 may be implemented by interface circuitry that may obtain machine readable instructions to configure the FPGA circuitry 2800, or portion(s) thereof. In some such examples, the configuration circuitry 2804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 2806 may be implemented by external hardware circuitry. For example, the external hardware 2806 may be implemented by the microprocessor 2700 of FIG. 27. The FPGA circuitry 2800 also includes an array of example logic gate circuitry 2808, a plurality of example configurable interconnections 2810, and example storage circuitry 2812. The logic gate circuitry 2808 and the configurable interconnections 2810 are configurable to instantiate one or more operations that may correspond to at least some of the machine readable instructions of FIGS. 21-24 and/or other desired operations. The logic gate circuitry 2808 shown in FIG. 28 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 2808 to enable configuration of the electrical structures and/or the logic gates to form circuits to perform desired operations. The logic gate circuitry 2808 may include other electrical structures such as look-up tables (LUTs), registers (e.g., flip-flops or latches), multiplexers, etc.

The configurable interconnections 2810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 2808 to program desired logic circuits.

The storage circuitry 2812 of the illustrated example is structured to store result(s) of the one or more of the operations performed by corresponding logic gates. The storage circuitry 2812 may be implemented by registers or the like. In the illustrated example, the storage circuitry 2812 is distributed amongst the logic gate circuitry 2808 to facilitate access and increase execution speed.

The example FPGA circuitry 2800 of FIG. 28 also includes example Dedicated Operations Circuitry 2814. In this example, the Dedicated Operations Circuitry 2814 includes special purpose circuitry 2816 that may be invoked to implement commonly used functions to avoid the need to program those functions in the field. Examples of such special purpose circuitry 2816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 2800 may also include example general purpose programmable circuitry 2818 such as an example CPU 2820 and/or an example DSP 2822. Other general purpose programmable circuitry 2818 may additionally or alternatively be present such as a GPU, an XPU, etc., that can be programmed to perform other operations.

Although FIGS. 27 and 28 illustrate two example implementations of the processor circuitry 2560 of FIG. 25 and/or the processor circuitry 2612 of FIG. 26, many other approaches are contemplated. For example, as mentioned above, modern FPGA circuitry may include an on-board CPU, such as one or more of the example CPU 2820 of FIG. 28. Therefore, the processor circuitry 2560 of FIG. 25 and/or the processor circuitry 2612 of FIG. 26 may additionally be implemented by combining the example microprocessor 2700 of FIG. 27 and the example FPGA circuitry 2800 of FIG. 28. In some such hybrid examples, a first portion of the machine readable instructions represented by the data flow diagrams and/or flowcharts of FIGS. 21-24 may be executed by one or more of the cores 2702 of FIG. 27, a second portion of the machine readable instructions represented by the data flow diagrams and/or flowcharts of FIGS. 21-24 may be executed by the FPGA circuitry 2800 of FIG. 28, and/or a third portion of the machine readable instructions represented by the data flow diagrams and/or flowcharts of FIGS. 21-24 may be executed by an ASIC. It should be understood that some or all of the DPN circuitry 102 of FIGS. 1 and/or 2 may, thus, be instantiated at the same or different times. Some or all of the circuitry may be instantiated, for example, in one or more threads executing concurrently and/or in series. Moreover, in some examples, some or all of the DPN circuitry 102 of FIGS. 1 and/or 2 may be implemented within one or more virtual machines and/or containers executing on the microprocessor.

In some examples, the processor circuitry 2560 of FIG. 25 and/or the processor circuitry 2612 of FIG. 26 may be in one or more packages. For example, the microprocessor 2700 of FIG. 27 and/or the FPGA circuitry 2800 of FIG. 28 may be in one or more packages. In some examples, an XPU may be implemented by the processor circuitry 2560 of FIG. 25 and/or the processor circuitry 2612 of FIG. 26, which may be in one or more packages. For example, the XPU may include a CPU in one package, a DSP in another package, a GPU in yet another package, and an FPGA in still yet another package.

Figure 29:
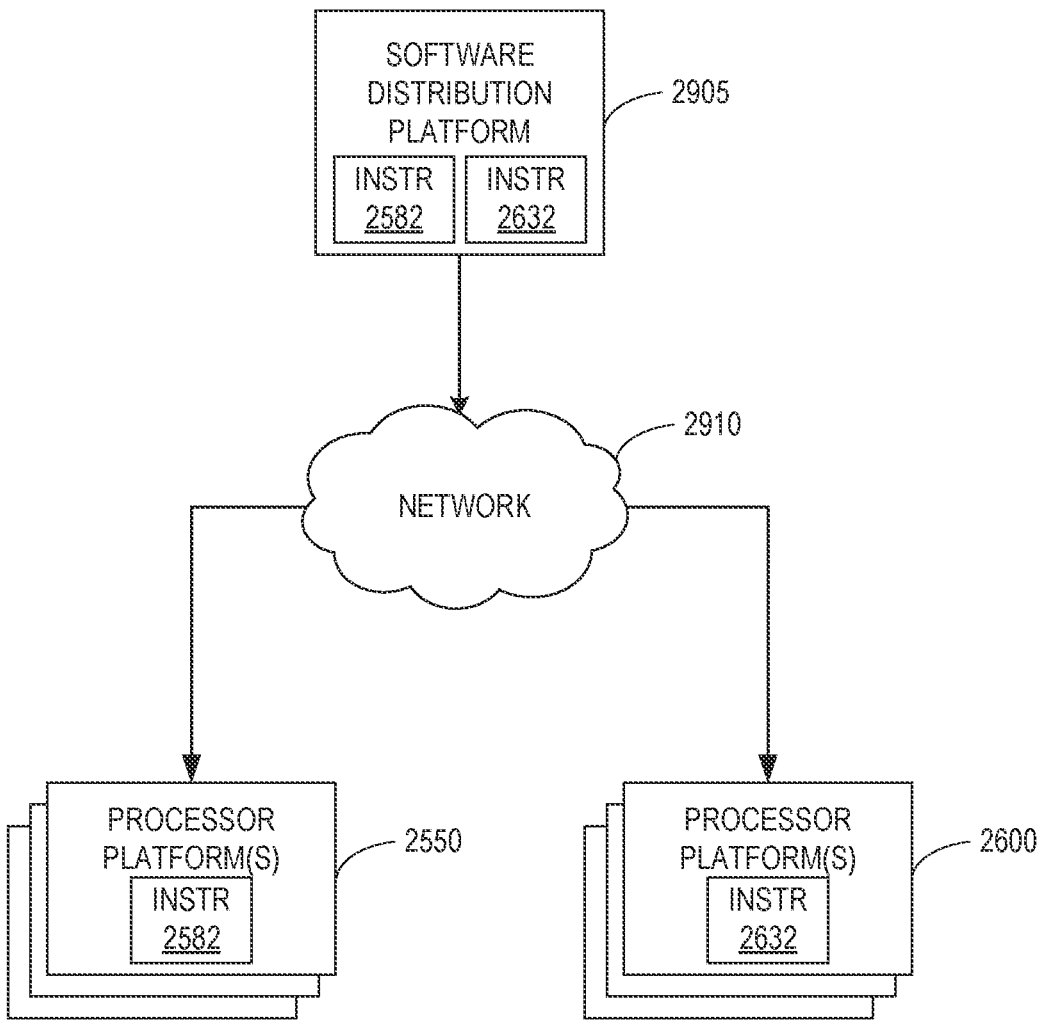
FIG. 29 is a block diagram of an example software distribution platform (e.g., one or more servers) to distribute software (e.g., software corresponding to the example machine readable instructions of FIGS. 22-24) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 2905 to distribute software such as the example machine readable instructions 2582 of FIG. 25 and/or the example machine readable instructions 2632 of FIG. 26 to hardware devices owned and/or operated by third parties is illustrated in FIG. 29. The example software distribution platform 2905 may be implemented by any computer server, data facility, cloud service, etc., capable of storing and transmitting software to other computing devices. The third parties may be customers of the entity owning and/or operating the software distribution platform 2905. For example, the entity that owns and/or operates the software distribution platform 2905 may be a developer, a seller, and/or a licensor of software such as the example machine readable instructions 2582 of FIG. 25 and/or the example machine readable instructions 2632 of FIG. 26. The third parties may be consumers, users, retailers, OEMs, etc., who purchase and/or license the software for use and/or re-sale and/or sub-licensing. In the illustrated example, the software distribution platform 2905 includes one or more servers and one or more storage devices. The storage devices store the machine readable instructions 2582 of FIG. 25, which may correspond to the example machine readable instructions 2100, 2200, 2300, 2400 of FIGS. 21-24, as described above. The storage devices store the machine readable instructions 2632 of FIG. 26, which may correspond to the example machine readable instructions 2100, 2200, 2300, 2400 of FIGS. 21-24, as described above. The one or more servers of the example software distribution platform 2905 are in communication with an example network 2910, which may correspond to any one or more of the Internet and/or any of the example networks 1510, 2500, 2626 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the example machine readable instructions 2582 of FIG. 25 and/or the example machine readable instructions 2632 of FIG. 26 from the software distribution platform 2905. For example, the software, which may correspond to the example machine readable instructions 2100, 2200, 2300, 2400 of FIGS. 21-24, may be downloaded to the example IoT device 2550, which is to execute the machine readable instructions 2582 to implement the DPN circuitry 102. In some examples, the software, which may correspond to the example machine readable instructions 2100, 2200, 2300, 2400 of FIGS. 21-24, may be downloaded to the example processor platform 2600, which is to execute the machine readable instructions 2632 to implement the DPN circuitry 102. In some examples, one or more servers of the software distribution platform 2905 periodically offer, transmit, and/or force updates to the software (e.g., the example machine readable instructions 2582 of FIG. 25 and/or the example machine readable instructions 2632 of FIG. 26) to ensure improvements, patches, updates, etc., are distributed and applied to the software at the end user devices.

From the foregoing, it will be appreciated that example systems, methods, apparatus, and articles of manufacture have been disclosed for private network mobility management. Disclosed systems, methods, apparatus, and articles of manufacture can support private network UE attached via terrestrial network (TN) and/or non-terrestrial network (NTN) RATs. Disclosed systems, methods, apparatus, and articles of manufacture can reduce complex calculations related to private network coverage and tracking areas (TAs). Disclosed systems, methods, apparatus, and articles of manufacture can leverage private network topology to improve and/or otherwise optimize location precision while reducing public network interference. Disclosed systems, methods, apparatus, and articles of manufacture can reduce and/or otherwise minimize UE attempts to register when not authorized. Disclosed systems, methods, apparatus, and articles of manufacture can reduce and/or otherwise minimize UE attempts to register during discontinuous coverage. Disclosed systems, methods, apparatus, and articles of manufacture can reduce complex calculations to determine coverage area. Disclosed systems, methods, apparatus, and articles of manufacture can solve 3GPP key issues related to UE location verification. Disclosed systems, methods, apparatus, and articles of manufacture can solve 3GPP key issues related to determining coverage area and access of UE without public land mobile network (PLMN) (for private network).

Disclosed systems, methods, apparatus, and articles of manufacture improve the efficiency of using a computing device by reducing complex calculations to determine coverage area of a private network. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for private network mobility management are disclosed herein. Further examples and combinations thereof include the following:

Example 1 is a method comprising determining a geographical area of a private network, generating a terrestrial network coverage grid associated with the geographical area, generating a non-terrestrial network coverage grid associated with the geographical area, activating private network terrestrial network nodes in alignment with the terrestrial network coverage grid, activating private network non-terrestrial network nodes in alignment with the non-terrestrial network coverage grid, and facilitating communication associated with devices using the private network.

In Example 2, the subject matter of Example 1 can optionally include parsing data obtained from the devices, and determining a time-of-arrival associated with the data.

In Example 3, the subject matter of Examples 1-2 can optionally include determining an angle-of-arrival associated with the data.

In Example 4, the subject matter of Examples 1-3 can optionally include determining a time-difference-of-arrival associated with the data.

In Example 5, the subject matter of Examples 1-4 can optionally include determining at least one of directions or locations of respective ones of the devices based on at least one of the time-of-arrival, the angle-of-arrival, or the time-difference-of-arrival associated with the data.

In Example 6, the subject matter of Examples 1-5 can optionally include determining the at least one of the directions or the locations of the respective ones of the devices using a machine-learning model.

In Example 7, the subject matter of Examples 1-6 can optionally include generating an event to cause an action based on the at least one of the directions or the locations.

In Example 8, the subject matter of Examples 1-7 can optionally include publishing the at least one of the directions or the locations of the respective ones of the devices to a datastore for application access.

In Example 9, the subject matter of Examples 1-8 can optionally include that the data is multi-spectrum data.

In Example 10, the subject matter of Examples 1-9 can optionally include generating motion vectors of the devices.

In Example 11, the subject matter of Examples 1-10 can optionally include that the data is at least one of Wi-Fi, Bluetooth, satellite, cellular, or sensor data.

In Example 12, the subject matter of Examples 1-11 can optionally include that the data from at least one of a radio access network, a Bluetooth beacon, a Wi-Fi access point, a GEO satellite, a LEO satellite, a MEO satellite, a HEO satellite, a GPS satellite, a camera, a light detection and ranging sensor, or a radiofrequency identification sensor.

In Example 13, the subject matter of Examples 1-12 can optionally include determining whether a location determination policy includes at least one of a location accuracy requirement, a latency requirement, a power consumption requirement, a QoS requirement, or a throughput requirement.

In Example 14, the subject matter of Examples 1-13 can optionally include initiating the devices to send sounding reference signal (SRS) data.

In Example 15, the subject matter of Examples 1-14 can optionally include initiating the devices to send sounding reference signal (SRS) data on a periodic basis.

In Example 16, the subject matter of Examples 1-15 can optionally include initiating the devices to send sounding reference signal (SRS) data on an aperiodic basis.

In Example 17, the subject matter of Examples 1-16 can optionally include enqueuing or dequeuing sounding reference signal (SRS) data with hardware queue management circuitry.

In Example 18, the subject matter of Examples 1-17 can optionally include configuring a programmable location data collector based on a policy, and, in response to a determination that a time period based on the policy to access cellular data has elapsed, access the cellular data.

In Example 19, the subject matter of Examples 1-18 can optionally include initializing the programmable location data collector.

In Example 20, the subject matter of Examples 1-19 can optionally include instantiating the programmable location data collector using dedicated private network circuitry.

In Example 21, the subject matter of Examples 1-20 can optionally include not accessing the data after a determination that the time period based on a policy has not elapsed.

In Example 22, the subject matter of Examples 1-21 can optionally include accessing the data by enqueueing the data with hardware queue management circuitry.

In Example 23, the subject matter of Examples 1-22 can optionally include that accessing the data includes storing the data for access by a logical entity in at least one of memory or a mass storage disc.

In Example 24, the subject matter of Examples 1-23 can optionally include that accessing the data includes dequeuing the data with the hardware queue management circuitry.

In Example 25, the subject matter of Examples 1-24 can optionally include that the data is fifth generation cellular (5G) Layer 1 (L1) data.

In Example 26, the subject matter of Examples 1-25 can optionally include that the fifth generation cellular (5G) Layer 1 (L1) data is sounding reference signal (SRS) data.

In Example 27, the subject matter of Examples 1-26 can optionally include that the access of the data is substantially simultaneous with a receipt of the data by interface circuitry.

Example 28 is a method comprising generating, by executing an instruction with programmable circuitry of a private network in a box, a first mesh associated with a geographical area of the private network and a second mesh associated with the geographical area, the first mesh based on multi-access terrestrial network (TN) nodes in communication with interface circuitry of the private network in a box, the second mesh based on non-terrestrial network (NTN) nodes in communication with the interface circuitry, initiating, by executing an instruction with the programmable circuitry, at least one of the multi-access TN nodes in alignment with the first mesh and at least one of the NTN nodes in alignment with the second mesh, and facilitating, by executing an instruction with the programmable circuitry, communication associated with at least one user equipment within at least one of the first mesh or the second mesh using the private network.

In Example 29, the subject matter of Example 28 can optionally include that the private network in a box is included in a single enclosure.

In Example 30, the subject matter of Examples 28-29 can optionally include generating the first mesh based on location data received from the multi-access TN nodes.

In Example 31, the subject matter of Examples 28-30 can optionally include determining a first quantity of the multi-access TN nodes to serve the at least one user equipment (UE) within the geographical area, and determining a second quantity of the NTN nodes to serve the at least one UE within the geographical area.

In Example 32, the subject matter of Examples 28-31 can optionally include predicting, with a machine learning model, a next location of the at least one UE within at least one of the first mesh or the second mesh based on location data associated with the at least one UE, and authorizing the at least one UE to communicate with at least one of a first TN node in alignment with the next location or a first NTN node in alignment with the next location.

In Example 33, the subject matter of Examples 28-32 can optionally include measuring respective characteristics of transmissions of reference signals, the transmissions detected in communication channels of the at least one user equipment (UE), and selecting, based on the respective characteristics, one of the communication channels to determine a location of the at least one UE.

In Example 34, the subject matter of Examples 33 can optionally include that the respective characteristics include respective powers and respective qualities of the transmissions of the reference signals in the communication channels.

In Example 35, the subject matter of Examples 33-34 can optionally include determining the location of the at least one UE while the at least one UE is in a state of connectivity with the private network that does not require communications related to a data plane or a control plane of the private network.

In Example 36, the subject matter of Examples 28-35 can optionally include determining a location of the at least one user equipment (UE) with increased resolution as a level of connectivity between the at least one UE and the private network increases.

Example 37 is at least one computer readable medium comprising instructions to perform the method of any of Examples 1-27 and/or the method of any of Examples 28-36.

Example 38 is edge server processor circuitry to perform the method of any of Examples 1-27 and/or the method of any of Examples 28-36.

Example 39 is an edge cloud processor circuitry to perform the method of any of Examples 1-27 and/or the method of any of Examples 28-36.

Example 40 is edge node processor circuitry to perform the method of any of Examples 1-27 and/or the method of any of Examples 28-36.

Example 41 is dedicated private network circuitry to perform the method of any of
Examples 1-27 and/or the method of any of Examples 28-36.

Example 42 is a programmable location data collector to perform the method of any of Examples 1-27 and/or the method of any of Examples 28-36.

Example 43 is an apparatus comprising processor circuitry to perform the method of any of Examples 1-27 and/or the method of any of Examples 28-36.

Example 44 is an apparatus comprising one or more edge gateways to perform the method of any of Examples 1-27 and/or the method of any of Examples 28-36.

Example 45 is an apparatus comprising one or more edge switches to perform the method of any of Examples 1-27 and/or the method of any of Examples 28-36.

Example 46 is an apparatus comprising at least one of one or more edge gateways or one or more edge switches to perform the method of any of Examples 1-27 and/or the method of any of Examples 28-36.

Example 47 is an apparatus comprising accelerator circuitry to perform the method of any of Examples 1-27 and/or the method of any of Examples 28-36.

Example 48 is an apparatus comprising one or more graphics processor units to perform the method of any of Examples 1-27 and/or the method of any of Examples 28-36.

Example 49 is an apparatus comprising one or more Artificial Intelligence processors to perform the method of any of Examples 1-27 and/or the method of any of Examples 28-36.

Example 50 is an apparatus comprising one or more machine learning processors to perform the method of any of Examples 1-27 and/or the method of any of Examples 28-36.

Example 51 is an apparatus comprising one or more neural network processors to perform the method of any of Examples 1-27 and/or the method of any of Examples 28-36.

Example 52 is an apparatus comprising one or more digital signal processors to perform the method of any of Examples 1-27 and/or the method of any of Examples 28-36.

Example 53 is an apparatus comprising one or more general purpose processors to perform the method of any of Examples 1-27 and/or the method of any of Examples 28-36.

Example 54 is an apparatus comprising network interface circuitry to perform the method of any of Examples 1-27 and/or the method of any of Examples 28-36.

Example 55 is an Infrastructure Processor Unit to perform the method of any of Examples 1-27 and/or the method of any of Examples 28-36.

Example 56 is hardware queue management circuitry to perform the method of any of Examples 1-27 and/or the method of any of Examples 28-36.

Example 57 is at least one of remote radio unit circuitry or radio access network circuitry to perform the method of any of Examples 1-27 and/or the method of any of Examples 28-36.

Example 58 is base station circuitry to perform the method of any of Examples 1-27 and/or the method of any of Examples 28-36.

Example 59 is user equipment circuitry to perform the method of any of Examples 1-27 and/or the method of any of Examples 28-36.

Example 60 is an Internet of Things device to perform the method of any of Examples 1-27 and/or the method of any of Examples 28-36.

Example 61 is a software distribution platform to distribute machine-readable instructions that, when executed by processor circuitry, cause the processor circuitry to perform the method of any of Examples 1-27 and/or the method of any of Examples 28-36.

Example 62 is edge cloud circuitry to perform the method of any of Examples 1-27 and/or the method of any of Examples 28-36.

Example 63 is distributed unit circuitry to perform the method of any of Examples 1-27 and/or the method of any of Examples 28-36.

Example 64 is control unit circuitry to perform the method of any of Examples 1-27 and/or the method of any of Examples 28-36.

Example 65 is core server circuitry to perform the method of any of Examples 1-27 and/or the method of any of Examples 28-36.

Example 66 is satellite circuitry to perform the method of any of Examples 1-27 and/or the method of any of Examples 28-36.

Example 67 is at least one of one more GEO satellites or one or more LEO satellites to perform the method of any of Examples 1-27 and/or the method of any of Examples 28-36.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A private network comprising:

interface circuitry to communicate with multi-access terrestrial network (TN) nodes which support a first communication access medium and non-terrestrial network (NTN) nodes which support a second communication access medium;

machine readable instructions; and at least one programmable circuit to be programmed by the machine readable instructions to:

generate a first grid for a first portion of a geographical area of the private network covered by the multi-access TN nodes and a second grid for a second portion of the geographical area covered by the NTN nodes;

based on a predicted location of a user equipment (UE) relative to the first grid and the second grid, predict respective likelihoods of providing a stable connection between the UE and the private network via the first and second communication access mediums; and authorize the UE to access the private network via one of the first or second communication access mediums that is predicted to have a highest likelihood.

2. The private network of claim 1, wherein the private network is included in a single enclosure.

3. The private network of claim 1, wherein one or more of the at least one programmable circuit is to generate the first grid based on location data received from the multi-access TN nodes.

4. The private network of claim 1, wherein one or more of the at least one programmable circuit is to:

determine a first quantity of the multi-access TN nodes to serve the UE within the geographical area; and determine a second quantity of the NTN nodes to serve the UE within the geographical area.

5. The private network of claim 1, wherein one or more of the at least one programmable circuit is to predict the predicted location of the UE based on a machine learning model, a motion vector of the UE, and a current location of the UE.

6. The private network of claim 5, wherein one or more of the at least one programmable circuit is to:

measure respective characteristics of transmissions of reference signals received from the UE via the first and second communication access mediums;

for each of the first and second communication access mediums, predict a likelihood of providing the stable connection between the UE and the private network based on (1) the predicted location of the UE relative to one of the first grid or the second grid and (2) the respective characteristics; and select the first communication access medium as the one of the first or second communication access mediums responsive to the first communication access medium having a larger likelihood than the second communication access medium.

7. The private network of claim 6, wherein the respective characteristics include respective powers and respective qualities of the transmissions of the reference signals in the first and second communication access mediums.

8. The private network of claim 5, wherein one or more of the at least one programmable circuit is to determine the current location of the UE while the UE is in a state of connectivity with the private network that does not require communications related to a data plane or a control plane of the private network.

9. The private network in a box of claim 1, wherein one or more of the at least one programmable circuit is to determine a location of the with increased resolution as a level of connectivity between the UE and the private network increases.

10. A non-transitory computer readable medium comprising instructions to cause at least one programmable circuit of a private network to:

cause interface circuitry of the private network to communicate with multi-access terrestrial network (TN) nodes which support a first communication access medium and non-terrestrial network (NTN) nodes which support a second communication access medium;

generate a first grid for a first portion of a geographical area of the private network covered by the multi-access TN nodes and a second grid for a second portion of the geographical area covered by the NTN nodes;

based on a predicted location of a user equipment (UE) relative to the first grid and the second grid, predict respective likelihoods of providing a stable connection between the UE and the private network via the first and second communication access mediums; and authorize the UE to access the private network via one of the first or second communication access mediums that is predicted to have a highest likelihood.

11. The non-transitory computer readable medium of claim 10, wherein the instructions cause one or more of the at least one programmable circuit to generate the first grid based on location data received from the multi-access TN nodes.

12. The non-transitory computer readable medium of claim 10, wherein the instructions cause one or more of the at least one programmable circuit to:

determine a first quantity of the multi-access TN nodes to serve the UE within the geographical area; and determine a second quantity of the NTN nodes to serve the UE within the geographical area.

13. The non-transitory computer readable medium of claim 10, wherein the instructions cause one or more of the at least one programmable circuit circuitry to predict the predicted location of the UE based on a machine learning model, a motion vector of the UE, and a current location of the UE.

14. The non-transitory computer readable medium of claim 10, wherein the instructions cause one or more of the at least one programmable circuit to:

measure respective characteristics of transmissions of reference signals received from the UE via the first and second communication access mediums;

for each of the first and second communication access mediums, predict a likelihood of providing the stable connection between the UE and the private network based on (1) the predicted location of the UE relative to one of the first grid or the second grid and (2) the respective characteristics; and select the first communication access medium as the one of the first or second communication access mediums responsive to the first communication access medium having a larger likelihood than the second communication access medium.

15. The non-transitory computer readable medium of claim 14, wherein the respective characteristics include respective powers and respective qualities of the transmissions of the reference signals in the first and second communication access mediums.

16. The non-transitory computer readable medium of claim 13, wherein the instructions cause one or more of the at least one programmable circuit circuitry-to determine the current location of the UE while the UE is in a state of connectivity with the private network that does not require communications related to a data plane or a control plane of the private network.

17. The non-transitory computer readable medium of claim 10, wherein the instructions cause one or more of the at least one programmable circuit to determine a location of the UE with increased resolution as a level of connectivity between the UE and the private network increases.

18. A method comprising:

generating, by executing an instruction with at least one programmable circuit of a private network in a box, a first grid for a first portion of a geographical area of the private network covered by multi-access terrestrial network (TN) nodes in communication with interface circuitry of the private network in a box via a first communication access medium and a second grid for a second portion of the geographical area of the private network covered by non-terrestrial network (NTN) nodes in communication with the interface circuitry via a second communication access medium;

based on a predicted location of a user equipment (UE) relative to the first grid and the second grid, predicting, by executing an instruction with one or more of the at least one programmable circuit, respective likelihoods of providing a stable connection between the UE and the private network via the first and second communication access mediums; and authorizing, by executing an instruction with one or more of the at least one programmable circuit, the UE to access the private network via one of the first or second communication access mediums that is predicted to have a highest likelihood.

19. The method of claim 18, further including predicting, the predicted location of the UE based on a machine learning model, a motion vector of the UE, and a current location of the UE.

20. The method of claim 18, further including:

measuring respective characteristics of transmissions of reference signals received from the UE via the first and second communication access mediums;

for each of the first and second communication access mediums, predicting a likelihood of providing the stable connection between the UE and the private network based on (1) the predicted location of the UE relative to one of the first grid or the second grid and (2) the respective characteristics; and selecting the first communication access medium as the one of the first or second communication access mediums responsive to the first communication access medium having a larger likelihood than the second communication access medium.

\* \* \* \* \*